(12) United States Patent
Nakamura et al.

(10) Patent No.: US 6,959,502 B2
(45) Date of Patent: Nov. 1, 2005

(54) DRYING APPARATUS AND WORKPIECE PROCESSING APPARATUS HAVING THE SAME

(75) Inventors: Shinichi Nakamura, Okaya (JP); Yoshiaki Yamada, Shinosuwa-machi (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/715,347

(22) Filed: Nov. 17, 2003

(65) Prior Publication Data

US 2004/0216324 A1 Nov. 4, 2004

(30) Foreign Application Priority Data

Nov. 18, 2002 (JP) .............................. 2002-334315
Jul. 31, 2003 (JP) .............................. 2003-204392

(51) Int. Cl.$^7$ ............................................. F26B 25/06
(52) U.S. Cl. ......................................... 34/233; 34/202
(58) Field of Search .................... 118/712, 46, 668; 101/115; 34/225, 233, 201, 202, 209

(56) References Cited

U.S. PATENT DOCUMENTS

| | | | | |
|---|---|---|---|---|
| 3,261,650 A | * | 7/1966 | Borje ........................ 312/236 |
| 4,043,048 A | * | 8/1977 | Veater ........................ 34/267 |
| 4,307,286 A | * | 12/1981 | Guibert ...................... 219/400 |
| 4,455,478 A | * | 6/1984 | Guibert ...................... 219/400 |
| 5,123,178 A | * | 6/1992 | Stein ............................. 34/88 |
| 6,059,196 A | * | 5/2000 | Miyazaki et al. ......... 236/44 A |

FOREIGN PATENT DOCUMENTS

| | | |
|---|---|---|
| JP | 03-079983 | 4/1991 |
| JP | 09-127330 | 5/1997 |

OTHER PUBLICATIONS

Communication from Chinese Patent Office regarding counterpart application (and English translation thereof).

* cited by examiner

Primary Examiner—Kenneth Rinehart
(74) Attorney, Agent, or Firm—Harness, Dickey & Pierce, P.L.C.

(57) ABSTRACT

A drying furnace contains therein hot plates which are disposed in a plurality of stages in a vertical direction, on each of which is seated a platelike workpiece. A gateway for the workpiece is disposed on a front side of the drying furnace and is normally left open to face the plurality of stages of hot plates. A chamber casing is disposed on a rear side of the drying furnace. An exhaust chamber is defined in the chamber casing and has a flow dividing plate which has formed therein a plurality of ventilation holes each facing a gap between the plurality of stages of hot plates. The exhaust chamber is forcibly exhausted by an exhaust blower.

10 Claims, 40 Drawing Sheets

STRIPE

MOSAIC

DELTA

F I G. 9
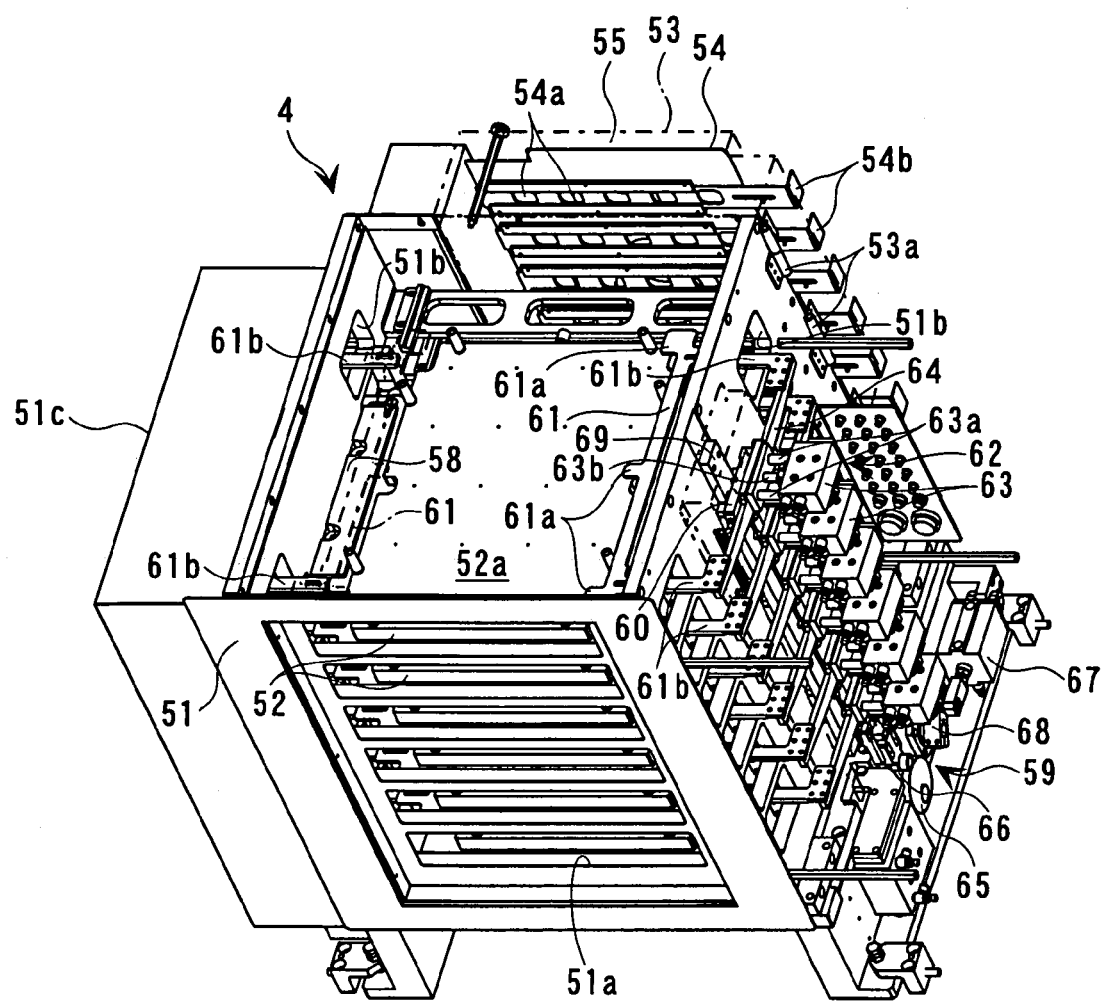

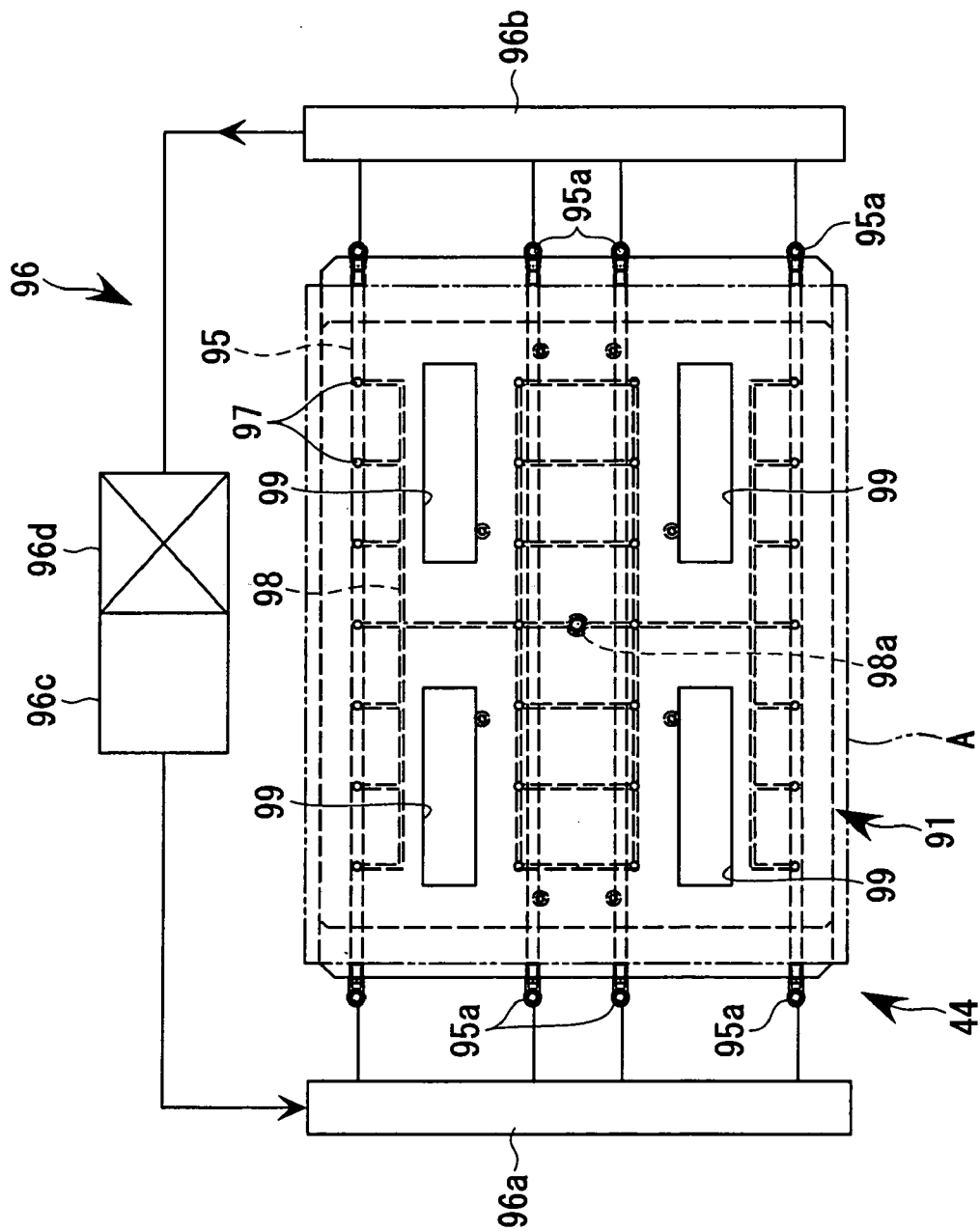

F I G. 1 4
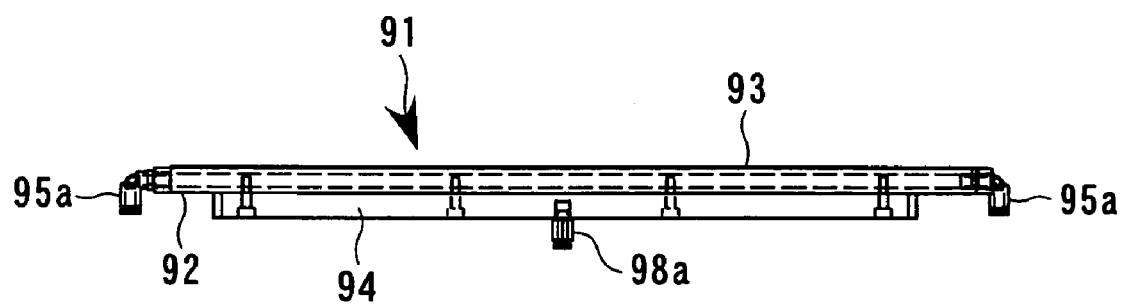

F I G. 1 5
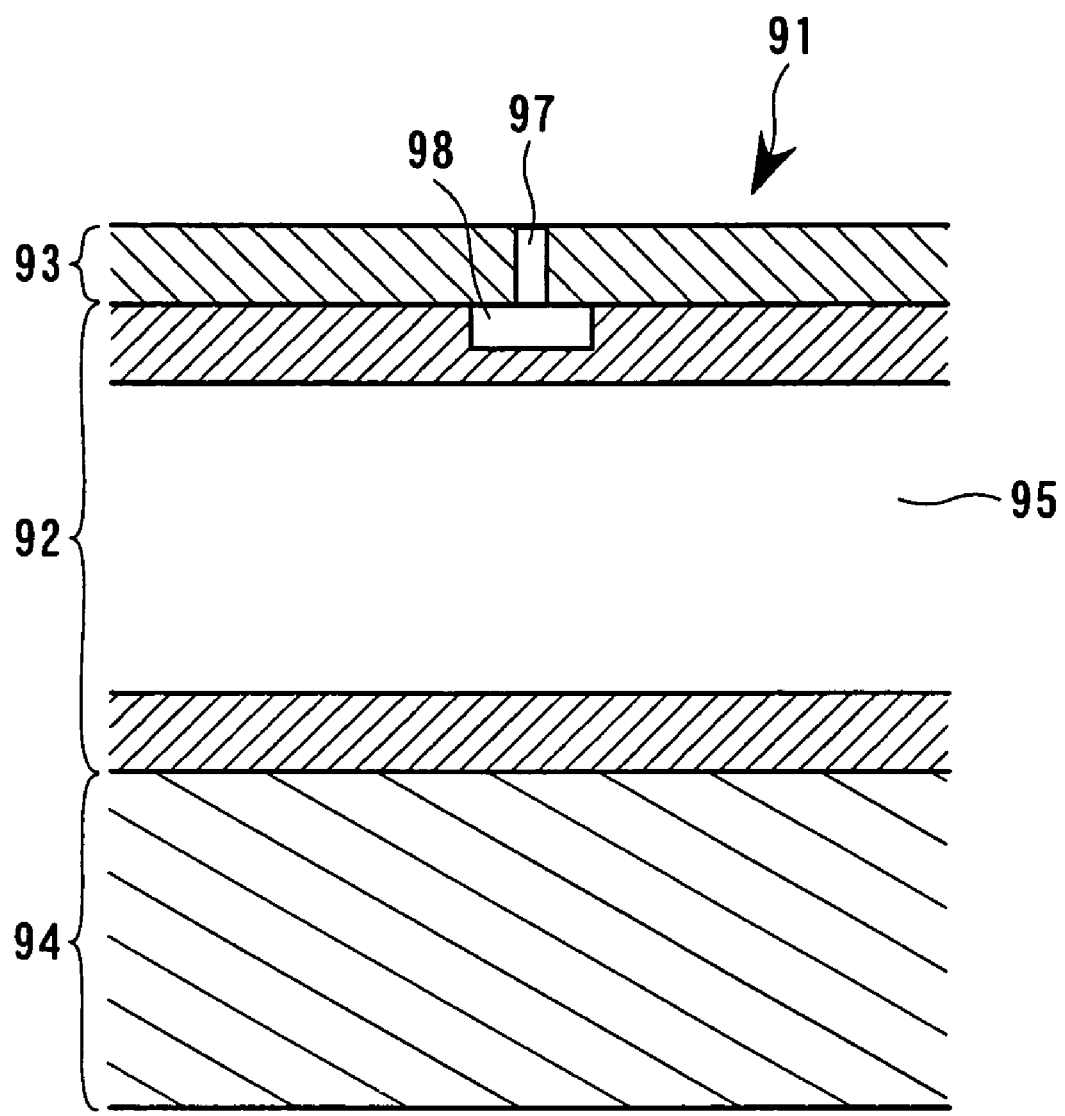

F I G. 1 7
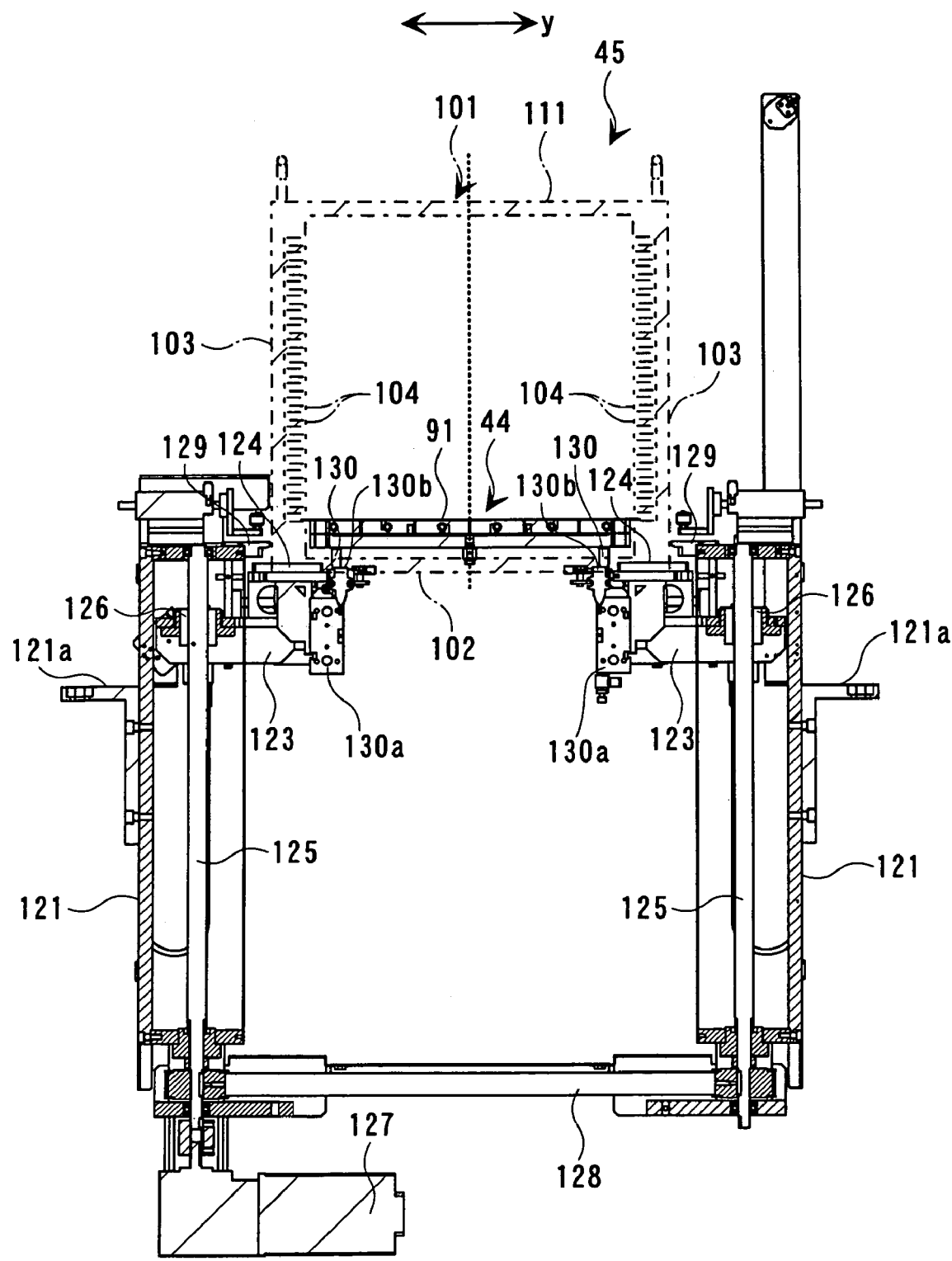

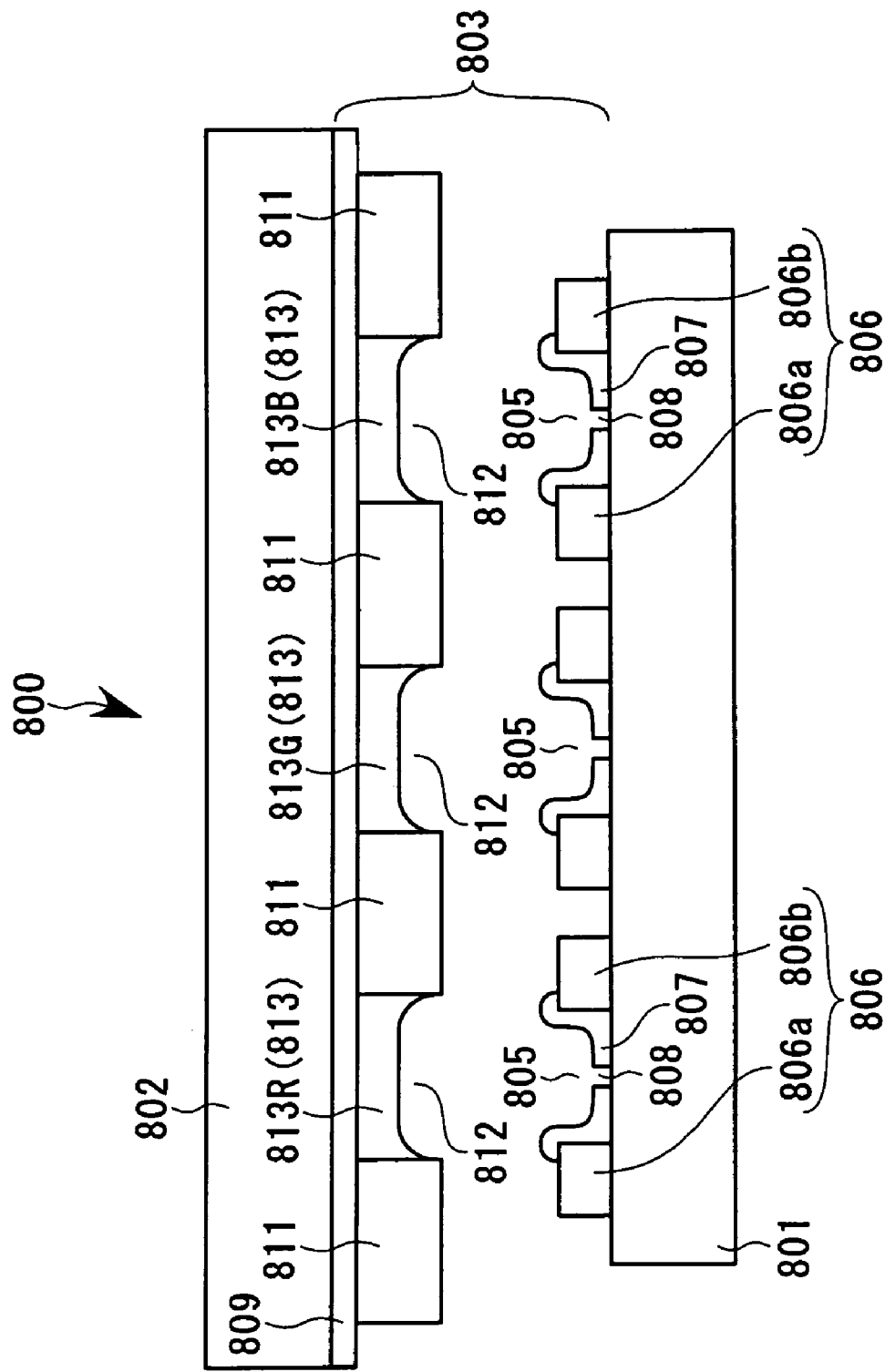

DRYING APPARATUS AND WORKPIECE PROCESSING APPARATUS HAVING THE SAME

BACKGROUND OF THE INVENTION

1. Field of the Invention

This invention relates to a drying apparatus which is used in drying liquid droplets coated on a platelike workpiece mainly by means of an imaging or picturing apparatus having liquid droplet ejection (or discharge) heads, and also relates to a workpiece processing apparatus having the drying apparatus.

2. Description of the Related Art

An attempt has conventionally been made to manufacture a color filter and an organic electroluminescence (EL) device by using an imaging apparatus which is provided with liquid droplet ejection heads as represented by ink jet heads. In the above-described imaging apparatus, the following steps are performed. Namely, a function liquid containing therein a filter material and a material with emitting (light-emitting) function is introduced into the liquid droplet ejection heads. Relative scanning is performed between a color filter substrate, an organic EL device substrate, or the like, as the platelike workpiece and the function liquid droplet ejection heads. A multiplicity of pixel regions on the substrate are coated with the function liquid which makes (or serves as) the filter element and the organic EL layer. The function liquid droplets are thereafter dried and solidified to thereby obtain the filter element or the organic EL function layer.

In order to improved the productivity, it is considered to use three imaging apparatuses to comply with the three colors of red (R), green (G), and blue (B), and feed the substrate in sequence into the imaging apparatus to thereby coat the substrate with the function liquid corresponding to each of the colors of red, green and blue. In this case, even if the final drying step for solidifying the function liquid droplets is performed in a subsequent step, the following becomes necessary to prevent the function liquid droplets that have been coated onto the substrate by means of each of the imaging apparatuses, from flowing or from being fluidized on the way of transporting the substrate to the imaging apparatus in the subsequent stage. Namely, a drying apparatus is disposed in parallel with each of the imaging apparatuses. The function liquid droplets that have been coated on the substrate are dried to such a degree as to lose the flowability. Thereafter, the substrate is transported to the imaging apparatus in the subsequent stage.

Although not relating to an arrangement in which the drying apparatus is disposed in parallel with the imaging apparatus, there is known an apparatus in which a hot plate is disposed inside a casing so that a workpiece is mounted in position on the hot plate (see, e.g., Published Unexamined Japanese Patent Application No. 127330/1997). In this apparatus, a plurality of casings each having housed therein a hot plate are held in stack so that a plurality of workpieces can be dried at the same time.

In case the drying apparatus is disposed in parallel with the imaging apparatus as described above, the time required for the drying work is longer by several times the one required in the imaging apparatus. As a result, it becomes necessary to be able to dry more than several workpieces (substrates) at the same time in the drying apparatus.

Here, in an arrangement in which the drying apparatus is made by holding in stack the plurality of casings having housed therein the hot plates as in the above-described conventional example, the apparatus becomes large. It is, therefore, desired to house the plurality of hot plates in a plurality of vertical stages within a single drying apparatus. In this case, however, a solvent to be evaporated from the function liquid droplets that have been coated on the workpiece is likely to stay or remain inside the drying apparatus. This brings about a problem in that the function liquid droplets cannot be dried efficiently.

SUMMARY OF THE INVENTION

In view of the above points, this invention has an advantage of providing a small-sized and simple workpiece processing apparatus which is capable of efficiently drying the plurality of workpieces at the same time, as well as of providing a workpiece processing apparatus which is provided with the drying apparatus.

In order to attain the above and other advantages, there is provided a drying apparatus comprising: a drying furnace containing therein hot plates, disposed in a plurality of stages in a vertical direction, on each of which is seated a platelike workpiece; a gateway for the workpiece, the gateway being disposed on a front side of the drying furnace and being normally left open to face the plurality of stages of hot plates; a chamber casing disposed on a rear side of the drying furnace; and an exhaust chamber defined in the chamber casing. The exhaust chamber comprises a flow dividing plate having formed therein a plurality of ventilation holes each facing a gap between the plurality of stages of hot plates. The exhaust chamber is forcibly exhausted by exhaust means.

According to this arrangement, a suction force of the exhaust means is operated on each of the ventilation holes in the flow dividing plate through the exhaust chamber. As a result, there is generated a ventilation flow which flows from the gateway on the front side of the drying furnace toward the ventilation holes through each of the gap between the plurality of stages of hot plates. Therefore, the solvent, or the like, evaporated in the course of drying is quickly ejected or discharged out of the drying furnace by means of the ventilation flow.

If the exhausting is made through only one point, the ventilation flow hardly flows through the clearance between the hot plates which are present away from the ventilation position. As a solution, preferably, the exhaust chamber comprises a plurality of exhaust ports which are disposed in vertical stages for connection to the exhaust means.

The hot plates are replaced depending on the size of the workpieces. In the front of the drying furnace there is disposed a transfer apparatus for the workpiece. It is therefore difficult to replace the hot plates through the gateway in the front. As s solution, preferably, the chamber casing is mounted on a rear side of the drying furnace so as to be capable of opening and closing such that each of the hot plates can be replaced through a rear opening of the drying furnace to be opened by opening the chamber casing. The drying apparatus preferably further comprises rail members fixed, in a plurality of vertical stages, to an inside of side walls of the drying furnace, the rail members being engageable with side edges of each of the hot plates such that the hot plates are slidable in a back and forth direction. Then, it becomes easy to move the hot plates into and out of the drying apparatus as well as to fix in position the hot plates.

In order to improve the workability of mounting and dismounting of the workpiece relative to the hot plates, it is desired to dispose a lifting mechanism which is capable of selectively moving up the workpiece from the plural stages of hot plates so that a clearance for transferring the workpiece can be formed between the hot plates and the workpiece. Namely, lifting pins which come into contact with the lower surface of the workpiece by penetrating through the hot plate are disposed so as to stand vertically on an elevating plate which is disposed on the lower side of the hot plate so as to be movable up and down. As a result of moving up of the elevating plate, the workpiece on the hot plate can thus be moved up through the lifting pins.

It is considered to employ this kind of lifting mechanism also in this invention. Then, it becomes necessary to secure, on the lower side of each of the hot plates, an elevating space for the elevating plate, resulting in a large height in the drying furnace. In order to solve this kind of disadvantage, preferably, the drying apparatus further comprises a lifting mechanism for supporting the plural stages of hot plates by selectively lifting a workpiece off from the plural stages of hot plates. The lifting mechanism comprises: a vertically elongated lifting member which is disposed on an outside of a side wall of the drying furnace so as to be movable up and down; engaging members which are disposed in a plurality of vertical stages on an inside of the side wall so as to be engageable with a lower surface of side edges of the workpiece, the side edges being protruding beyond a workpiece seating surface of each of the hot plates; and a reciprocating mechanism which connects the engaging members to the lifting member so as to be independently movable back and forth between an operating position falling inside a vertical projected area of the side edges of the workpiece and a retracted position outside of the projected area.

According to this arrangement, when the workpiece is attached to, and detached from, any one of the hot plates, the elevating member is moved up in a state in which only the corresponding engaging member is advanced to the operating position. By this operation, the workpiece on the corresponding hot plate can be selectively pushed up. Further, in this arrangement, it is not necessary to secure, on the lower side of each of the hot plates, an elevating space for the lifting mechanism. The height of the drying furnace thus need not be increased.

Further, preferably, the workpiece processing apparatus comprises a plurality of processing units each comprising: an imaging apparatus for coating a platelike workpiece with liquid droplets by using a liquid droplet ejection head; a drying apparatus for drying the liquid droplets coated on the workpiece; and a workpiece transport apparatus interposed between respective pair of the processing units so that the workpiece processed in each of the processing units is sequentially sent to a subsequent processing unit through the workpiece transport apparatus, wherein the drying apparatus as set forth hereinabove is used as the drying apparatus. The productivity can thus be improved.

Preferably, the workpiece is a substrate for a color filter, and the imaging apparatus introduces a function liquid containing therein a filter material into the liquid droplet ejection head and coats a multiplicity of pixel element regions on the substrate with function liquid droplets which form filter elements. Otherwise, preferably, the workpiece is a substrate for an organic EL device, and the imaging apparatus introduces a function liquid containing therein an emitting function material into the liquid droplet ejection head and coats a multiplicity of pixel element regions on the substrate with function liquid droplets which form EL function layers. In this manner, the color filter and the organic EL device can be efficiently manufactured.

In a similar manner, preferably, the workpiece is a substrate for a plasma display device, and the imaging apparatus introduces a function liquid containing therein a metallic wiring material into the liquid droplet ejection head and coats a multiplicity of pixel element regions on the substrate with function liquid droplets which form element electrode layers. Or else, preferably, the workpiece is a substrate for a plasma display device, and the imaging apparatus introduces a function liquid containing therein a fluorescent function material into the liquid droplet ejection head and coats a multiplicity of pixel element regions on the substrate with function liquid droplets which form fluorescent function layers. Further, preferably, the workpiece is a substrate for an electron emission device, and the imaging apparatus introduces a function liquid containing therein an electrically conductive function material into the liquid droplet ejection head and coats a multiplicity of pixel element regions on the substrate with function liquid droplets which form electrically conductive function layers. In this manner, the plasma display device (PDP device) and the electron emission device (FED device, SED device) can be efficiently manufactured.

Further, preferably, the workpiece processing apparatus further comprises buffer means for temporarily keeping in stock the workpieces in the workiece transport apparatus, and the workpiece is discharged from the drying apparatus when the drying time in the drying apparatus for the workpiece has lapsed a predetermined time. In this arrangement, the workpiece can be discharged from the drying apparatus even if the feeding of the workpiece into the imaging apparatus of the processing unit in the subsequent stage is stopped due, e.g., to the cleaning work of the liquid droplet ejection head. The workpieces can thus be held in stock by the buffer means in the workpiece transport apparatus.

Here, the substrate for the color filter, organic EL device, or the like, is subjected to a pre-processing of giving liquid affinity (i.e., characteristics showing an affinity to liquid) to the pixel regions, and of giving a liquid repellency (i.e., characteristic showing repellency to liquid) to the regions around the pixel regions in order to prevent the color mixing and color dropping. However, if the temperature of heating the workpiece in the drying apparatus is low, the solvent remains in the regions around the pixel regions, giving rise to the occurrence of color mixing and color dropping in the imaging apparatus of the subsequent-stage processing unit. Further, due to the variation in drying time, the film thickness becomes non-uniform in the course in which the function liquid droplets get dried and shrunk.

In the above-described arrangement of this invention, however, even during the time when the feeding of the workpiece into the imaging apparatus of the post-stage processing unit, the workpiece can be fed out from the drying apparatus of the pre-stage processing unit. Therefore, when the drying time in the drying apparatus for the workpiece has reached a predetermined time, the workpiece can be taken out of the drying apparatus to thereby keep the drying time of the workpiece uniform. The film thickness can thus be prevented from becoming non-uniform.

BRIEF DESCRIPTION OF THE DRAWINGS

The above and other objects and the attendant features of this invention will become readily apparent by reference to the following detailed description when considered in conjunction with the accompanying drawings wherein:

FIG. 9 is a perspective view of the drying apparatus in a state in which the ceiling portion has been shown removed;

FIG. 13 is a plan view of a cooling plate of this invention;

FIG. 14 is a side view thereof;

FIG. 15 is a partial enlarged sectional view thereof;

FIG. 17 is a sectional view taken along the lines XVII–XVII in FIG. 18;

FIG. 39 is a sectional view of an important portion of the display device which is an electron emission device (FED device) of this invention.

DETAILED DESCRIPTION OF THE PREFERRED EMBODIMENTS

A description will now be made about the preferred embodiments of this invention with reference to the accompanying drawings.

Figure 1:
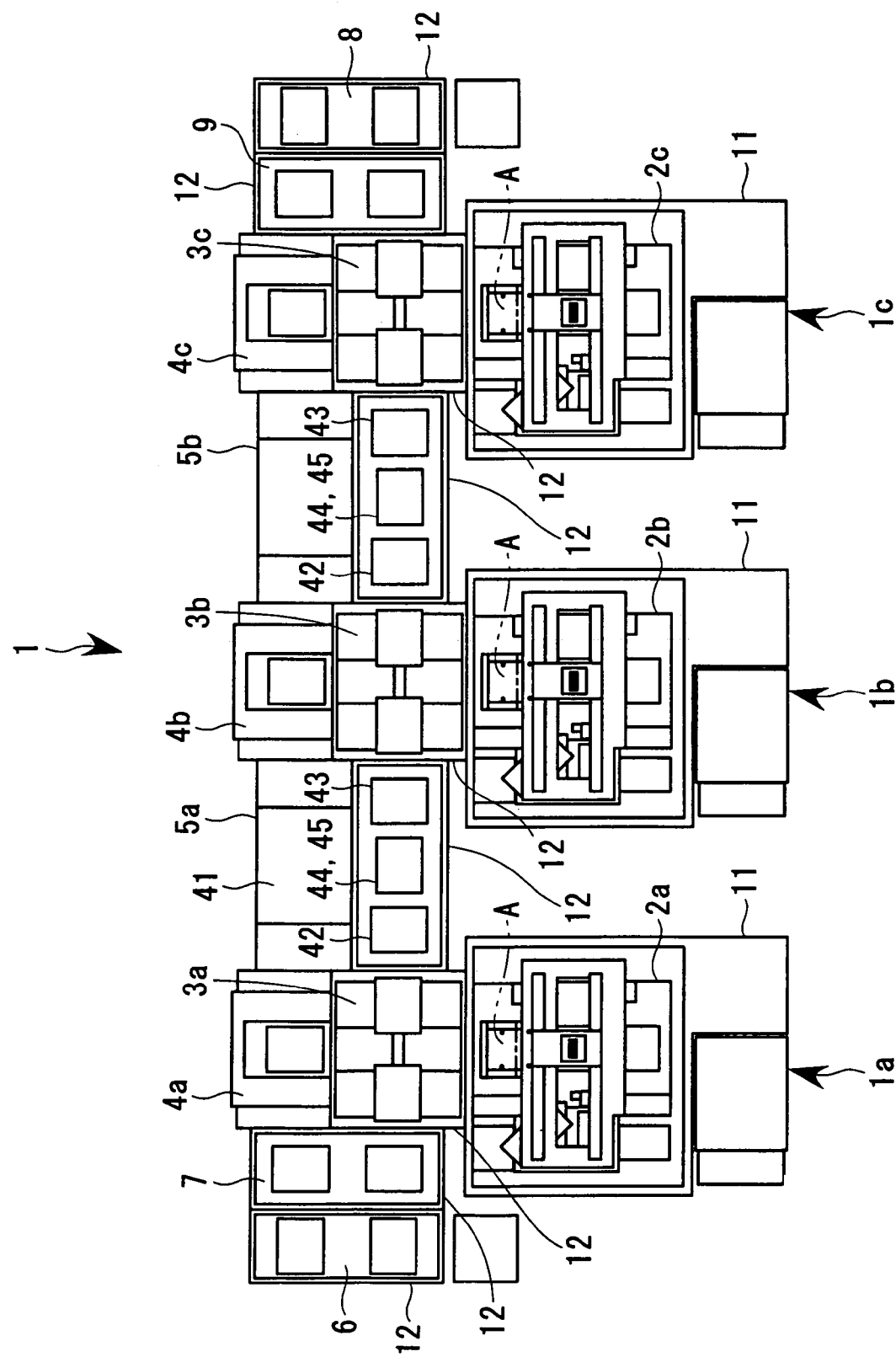
FIG. 1 is a plan view showing an overall arrangement of a line of manufacturing an emitting function layer according to an embodiment of this invention.

FIG. 1 shows an emitting function layer manufacturing line (workpiece processing line) which constitutes a part of an organic electroluminescence (EL) manufacturing line. In this emitting function layer manufacturing line, substrates (glass substrates) on which circuit elements, banks and pixel electrodes have been formed in preceding steps are introduced, and emitting layers of red (R), green (G) and blue (B) as well as a hole injection layer (organic EL function layer) are formed in a so-called ink jet system. Since oxygen and moisture must be kept away from the organic EL, the processing of the substrate in this emitting function layer is all performed in an inert gas atmosphere (nitrogen gas).

As shown in the figure, in this emitting function layer manufacturing line 1, the left side constitutes an inlet or entrance for taking or bringing in an article, and the right side constitutes an outlet or exit for taking or carrying out the processed article. The substrate (workpiece) A is transported one way from the inlet side to the outlet side by passing through each of processing apparatuses. Main processing apparatuses in the emitting function layer manufacturing line 1 are made up of: a blue-color imaging apparatus 2a which is located on the inlet side and which is for forming a blue-color emitting layer; a red-color imaging apparatus 2b which is located in an intermediate position and which is for forming a red-color emitting layer; and a green-color imaging apparatus 2c which is located on the outlet side and which is for forming a green-color emitting layer. In the figure, an imaging apparatus for forming a hole injection layer is not illustrated.

Corresponding to the blue-color imaging apparatus 2a, there is provided a blue-color drying apparatus 4a in a position to sandwich a blue-color transfer apparatus 3a so that these apparatuses 2a, 3a, 4a constitute a blue-color processing unit 1a. Corresponding to the red-color imaging apparatus 2b, there is provided a red-color drying apparatus 4b in a position to sandwich a red-color transfer apparatus 3b so that these apparatuses 2b, 3b, 4b constitute a red-color processing unit 1b. Corresponding to the green-color imaging apparatus 2c, there is provided a green-color drying apparatus 4c in a position to sandwich a green-color transfer apparatus 3c so that these apparatuses 2c, 3c, 4c constitute a green-color processing unit 1c. Between the blue-color processing unit 1a and the red-color processing unit 1b, there is provided a first transport apparatus 5a which transports the substrate A processed in the blue-color processing unit 1a to the red-color processing unit 1b. Similarly, between the red-color processing unit 1b and the green-color processing unit 1c, there is provided a second transport apparatus 5b which transports the substrate A processed in the red-color processing unit 1b to the green-color processing unit 1c.

On the inlet side, there are disposed: an inlet-side magazine loader 6 which sends out or feeds a non-processed substrates A held in stock; and an inlet-side transfer apparatus 7 which receives the substrates A from the inlet-side magazine loader 6 and places them before the blue-color transfer apparatus 3a. On the outlet side, there are similarly disposed: an outlet-side magazine loader 8 which holds in stock the processed substrates A; and an outlet-side transfer apparatus 9 which receives the substrates A from the green-color transfer apparatus 3c and send them to the outlet-side magazine loader 8.

Figure 6:
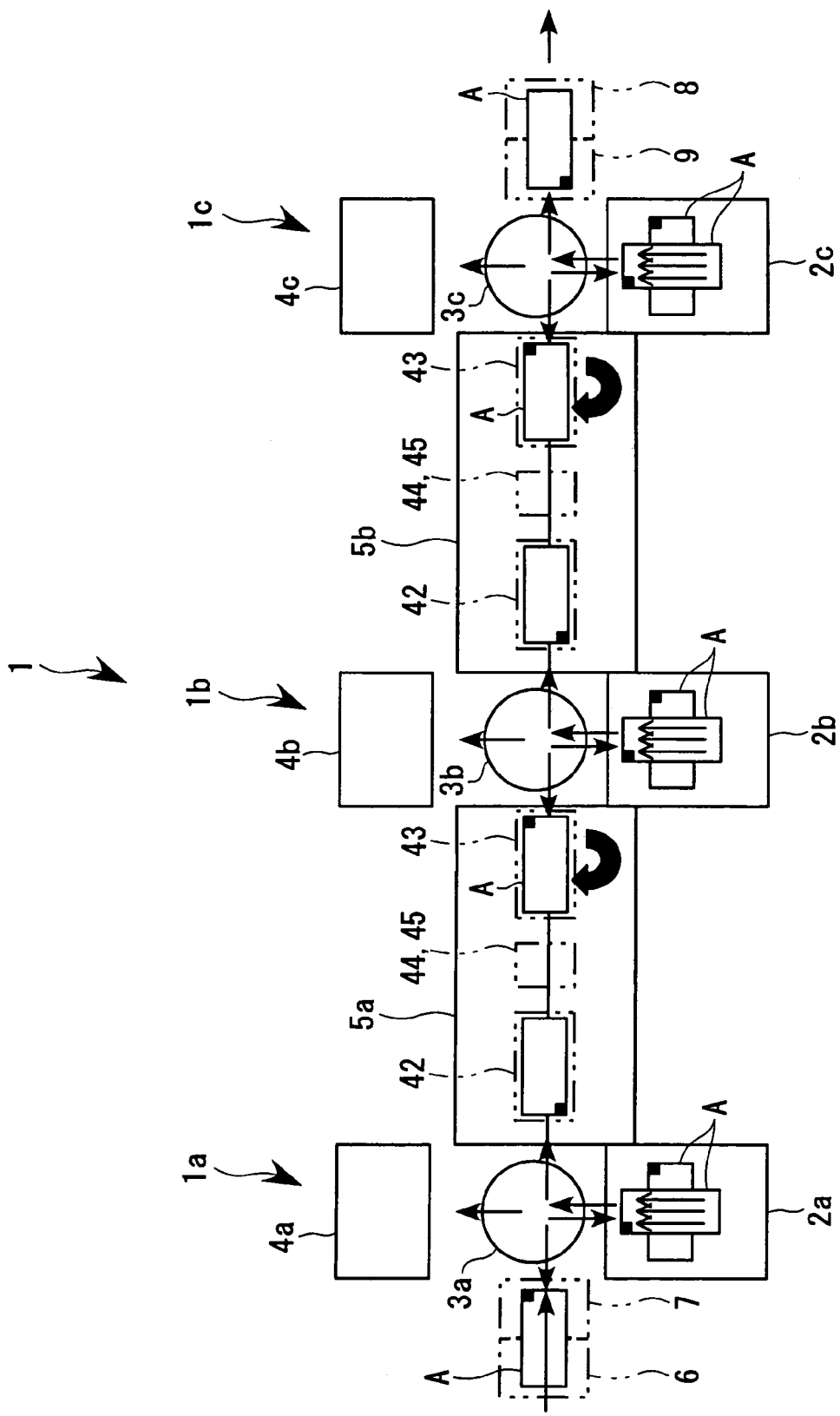
FIG. 6 is a schematic plan view showing a mode of transporting a substrate in the line of manufacturing the emitting layer of this invention.

In this embodiment, there are two kinds of substrates A, one kind being fed into the imaging apparatus 2 (2a, 2b, 2c) in a longitudinal direction and the other kind being fed thereinto in a lateral direction which is at right angles to the longitudinal direction (see FIG. 6). In order to cope with this arrangement, the inlet-side transfer apparatus 7 is provided with a rotation mechanism (not illustrated) for rotating the substrate A by 90 degrees while maintaining the horizontal posture so as to cause the substrate A to face the blue-color transfer apparatus 3a. Similarly, the outlet-side transfer apparatus 9 is also provided with a rotation mechanism (not illustrated) for rotating the substrate A by 90 degrees while maintaining the horizontal posture before feeding the substrate A into the outlet-side magazine loader 8.

In order to process the substrate A in an inert gas atmosphere, each of the imaging apparatuses 2a, 2b, 2c for red-color, green-color, and blue-color, respectively, is housed inside a main chamber 11, 11, 11 which is constructed in the form of a clean room. Similarly, in order to transfer the substrate A in an inert gas atmosphere, each of the transfer apparatuses 3a, 3b, 3c, 7, 9 and the first and second transport apparatuses 5a, 5b, or the like, is provided with a sub-chamber 12 in the form of a cover case. Each of the drying apparatuses 4a, 4b, 4c is arranged such that the front portion thereof lying to face each of the transfer apparatuses 3a, 3b, 3c is inserted into the respective sub-chambers 12 so as to place the inside of the transfer apparatuses within the inert gas atmosphere. The plurality of main chambers 11 and the plurality of sub-chambers 12 are connected to each other in a tunnel-like manner trough a shutter (not illustrated) disposed at a border portion.

Figure 2:
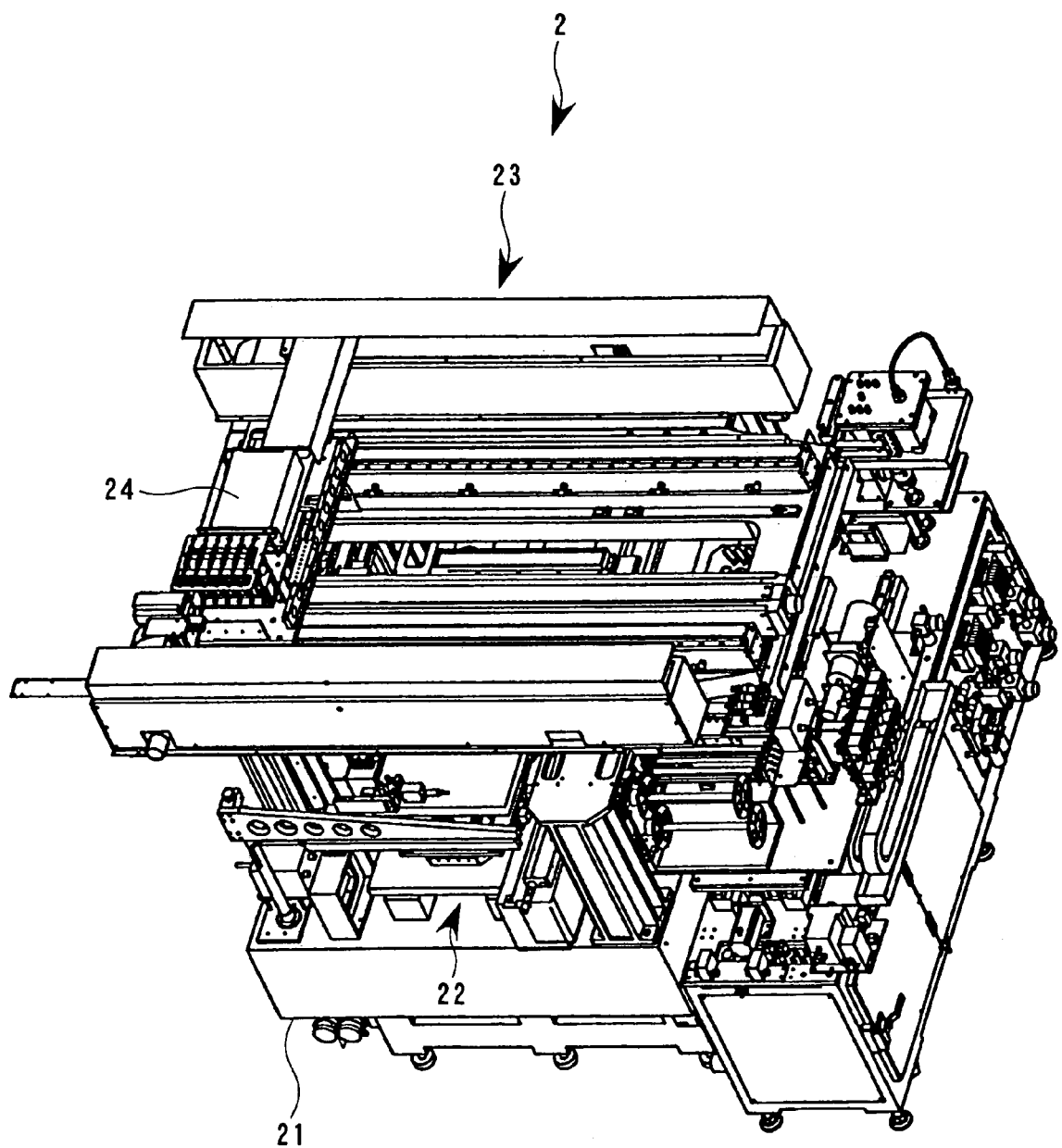
FIG. 2 is an overall perspective view thereof.
Figure 3:
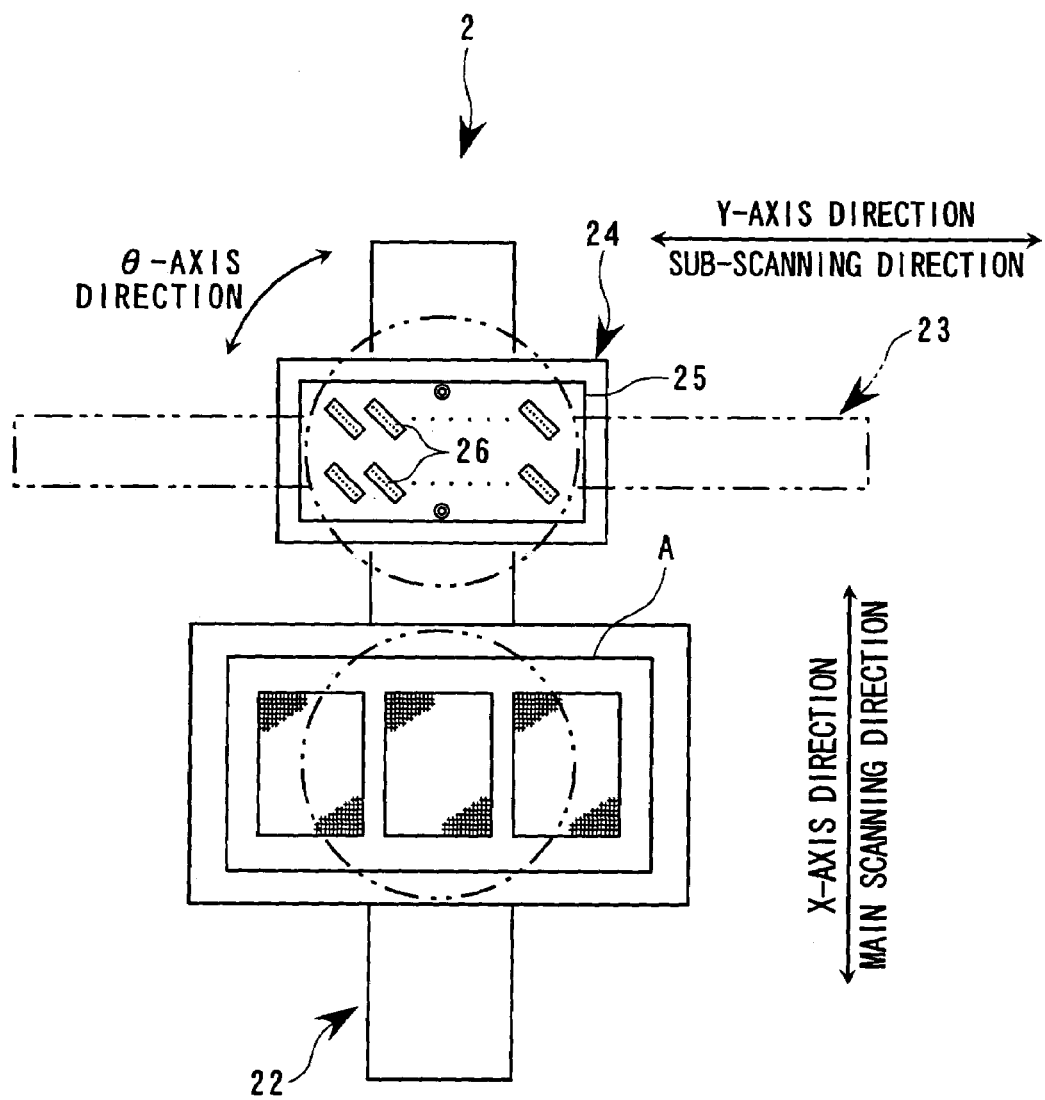
FIG. 3 is a schematic view showing the operation of the imaging apparatus of this invention.

As shown in FIGS. 2 and 3, the imaging apparatuses 2 of each color are to eject the emitting function liquids in an ink jet method and is provided with: an X-axis table 22 which is disposed on a machine base 21; a Y-axis table 23 which crosses the X-axis table at right angles; and a main carriage 24 which is provided so as to be suspended from the Y-axis table 23. At a lower portion of the main carriage 24, there are disposed a plurality of liquid droplet ejection heads 26 through a sub-carriage 25 (see FIG. 3). The substrate A is set in position on the X-axis table 22.

As shown in FIG. 3, the imaging apparatus 2 is arranged such that the substrate A is moved in synchronism with the driving (selective ejection of the emitting function liquids) of the liquid droplet ejection heads 26. The so-called main scanning of the liquid droplet ejection heads 26 is performed in both the back and forth movements of the X-axis table 22 in the X-axis direction. The so-called sub-scanning, on the other hand, is performed by the Y-axis table 23 in the forward movement in the Y-axis direction of the liquid droplet ejection heads 26. In other words, the liquid droplet ejection heads 26 having introduced therein the emitting function liquids are subjected to relative scanning in the X-axis direction and in the Y-axis direction relative to the substrate A. The function liquids containing therein the emitting function materials are thus selectively ejected to thereby form an emitting layer in a multiplicity of pixel regions on the substrate A.

In this case, though the details are given hereinafter, as the function liquid to form the hole injection layer out of the emitting layer, there can be used a composition in which a hole injection layer forming material is held in solution in a non-polar solvent. As the function liquid to form the emitting layer, there can be used a composition in which the emitting layer forming material is held in solution in a non-polar solvent.

Figure 4A:
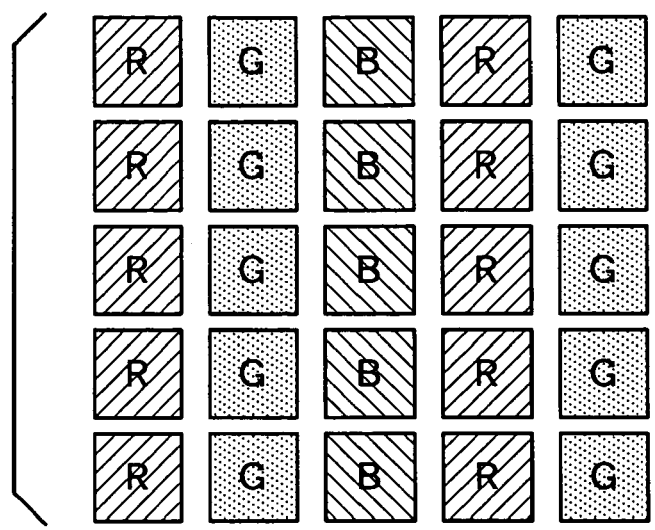
FIGS. 4A through 4C are enlarged plan view showing ejection patterns of an emitting function liquid by the imaging apparatus of this invention.
Figure 4B:
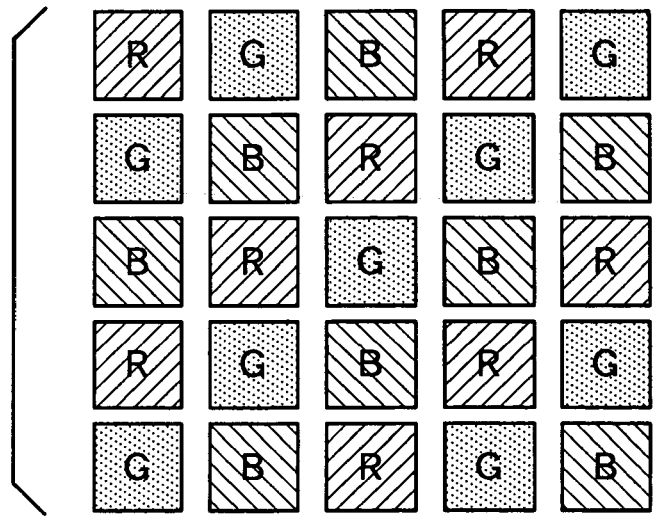
Figure 4C:
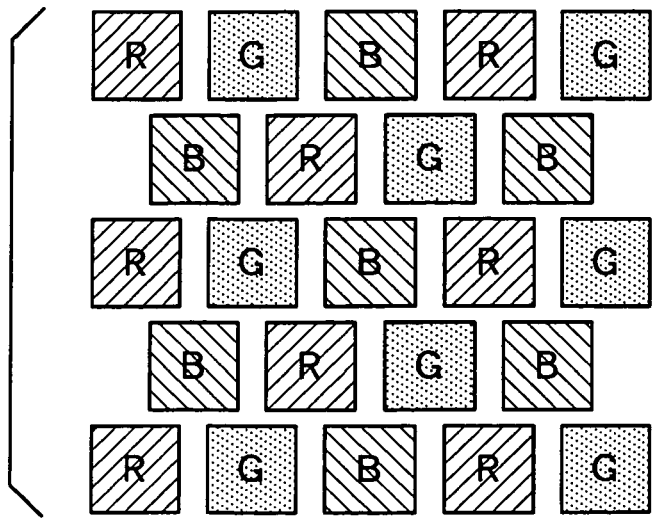

As shown in FIGS. 4A through 4C, as the arrangement of the pixel regions for each of the colors of red, green and blue to form the emitting layer, there are used a stripe arrangement, mosaic arrangement, and a delta arrangement. The substrate A is subjected to a pre-treatment so that each of the pixel regions has an affinity to the emitting function liquid and that peripheral region of each of the pixel regions has a liquid repellency (i.e., characteristic to be repellent against a liquid).

Figure 5A:
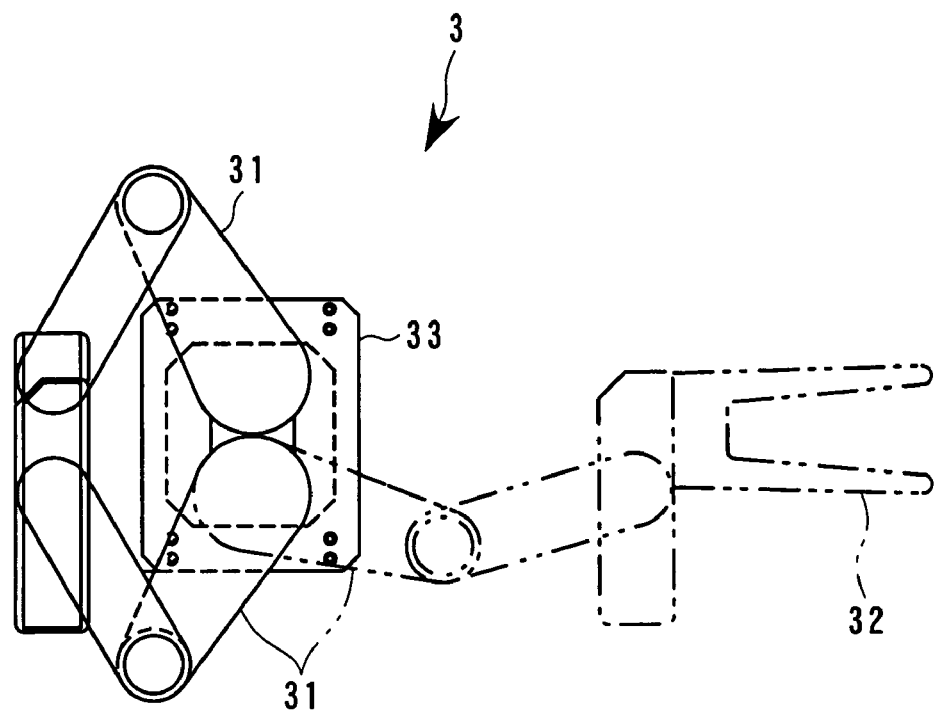
FIGS. 5A and 5B are construction figures of a transfer apparatus (transfer robot) of this invention.
Figure 5B:
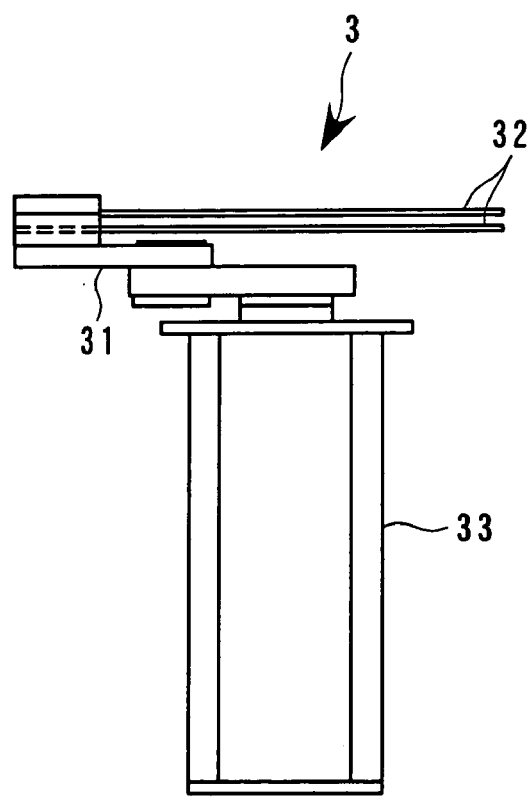

As shown in FIGS. 5A and 5B, each of the transfer apparatuses 3 for red color, green color, and blue color is constituted by a transfer robot having a pair of robot arms 31, 31 which are capable of rotation as well as extension and contraction. By means of a fork-shaped robot hand made of a thin plate which is disposed on a front end of each of the robot arms 31, the substrate A is held in a manner to place it thereon for further performing the transfer operation. The stand portion 33 which supports the pair of robot arms 31, 31 has housed therein an elevating apparatus (not illustrated). It is thus so arranged that the pair of robot arms 31, 31 can be adequately moved up and down so as to receive (by moving up) and hand over (by moving down) the substrate A.

For example, in the intermediate red-color transfer apparatus 3b, one 31 of the robot arms is driven to swivel (or turn) the substrate A that has been received from the first transport apparatus 5a, while maintaining the substrate A in a horizontal posture. The substrate A is then rotated by 90 degrees in the horizontal plane for feeding it onto the X-axis table 22 of the red-color imaging apparatus 2b. Regarding the substrate A that has been processed in the red-color imaging apparatus 2b, the other robot arm 31 is driven to thereby receive the substrate A from the X-axis table 22. The substrate A is then largely turn by 180 degrees in the horizontal plane for feeding it into the red-color drying apparatus 4b. In case the substrate A is of a laterally oriented one, it is once transferred to a 90-degree rotation apparatus 42, which is described hereinafter, of the second transport apparatus 5b and is then rotated by 90 degrees there and is received again for further feeding into the red-color drying apparatus 4b. Regarding the substrate A that has been processed in the red-color drying apparatus 4b, the other robot arm 31 is driven to thereby receive the substrate A from the red-color drying apparatus 4b. The substrate A is then rotated by 90 degrees in the horizontal plane for further feeding into the second transport apparatus 5b (see FIG. 6).

Figure 7:
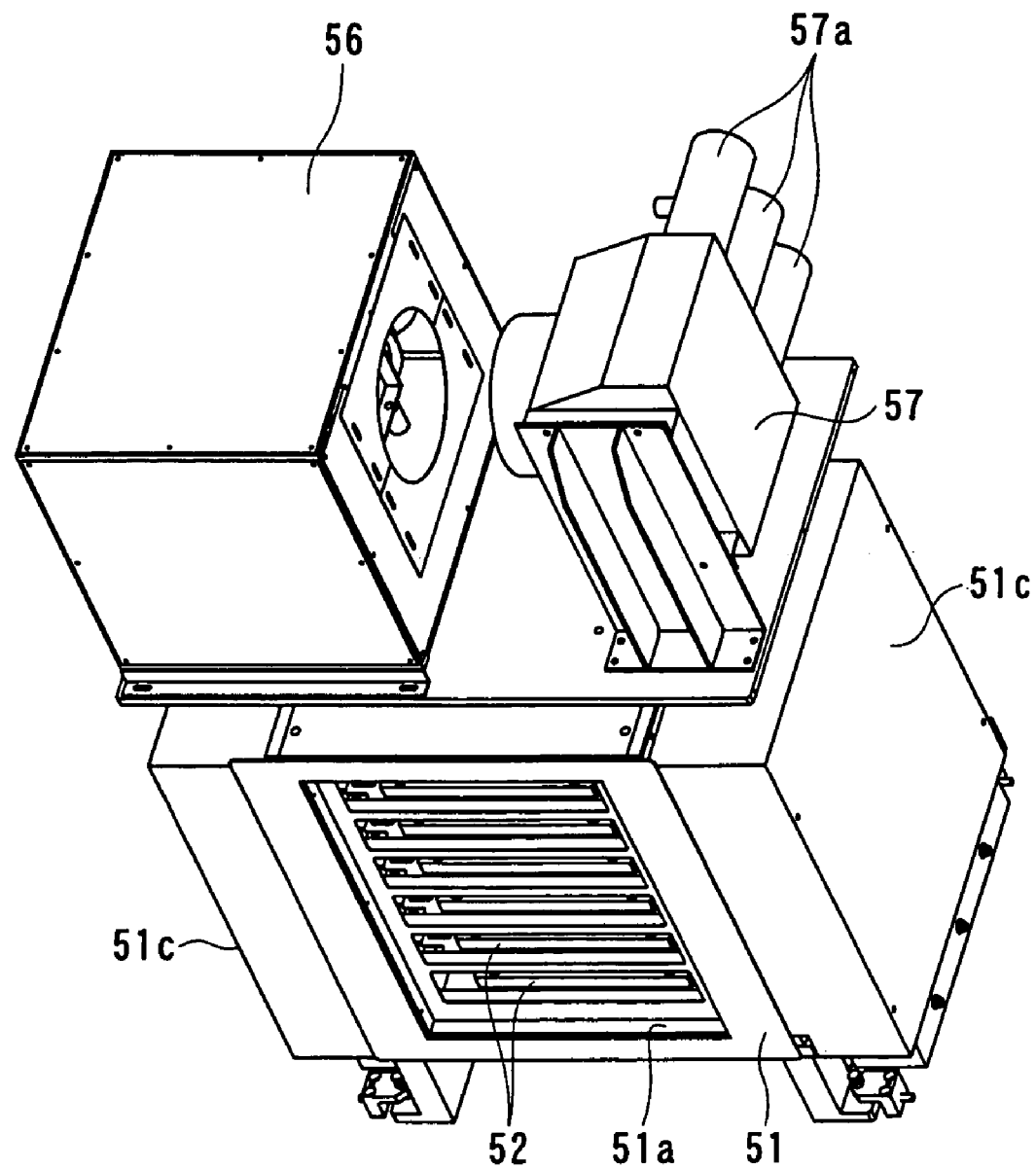
FIG. 7 is an overall perspective view of a drying apparatus of this invention.
Figure 8:
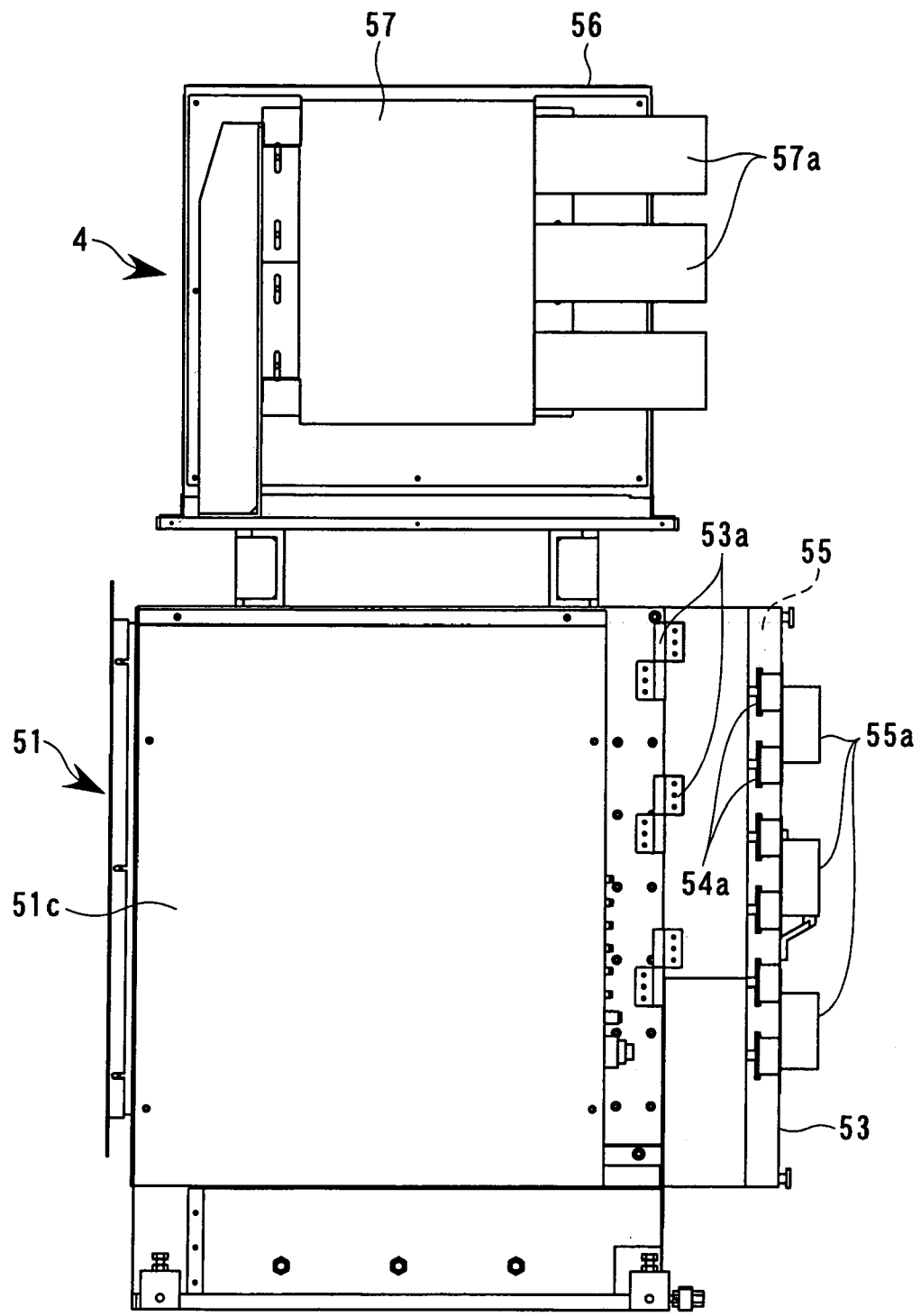
FIG. 8 is a side view thereof.

Each of the drying apparatuses 4 (4a, 4b, 4c) for red color, green color, and blue color is, as shown in FIGS. 7 through 9, is to house a plurality of hot plates 52 (six stages in the illustrated example) in a single drying furnace 51. The plurality of hot plates are disposed in vertical stages or disposed in a direction to form upper and lower stages. The substrate A is seated on each of these hot plates 52 so that the drying of a plurality of substrates can be performed at the same time. Each of these drying apparatuses 4 is provided for the purpose of provisionally drying to such an extent that the function liquid loses flowability to prevent the following: i.e., to prevent the function liquid droplets coated on the substrate A from flowing during transportation of the substrate A, giving rise to the color mixture; and to prevent the film thickness from becoming irregular due to sudden evaporation of the solvent. Final drying in which the function liquid droplets are solidified to form the emitting layer is performed in the latter steps of the illustrated manufacturing line. The temperature to heat the substrate A in the drying apparatus 4 is preferably 40±2□ through 200±2□.

The drying furnace 51 has at its front surface a gateway (inlet and outlet) 51a which faces the plural stages of hot plates 52. The gateway 51a is normally left open so that the substrates A can be fed into, or taken out of, the respective hot plates 52 through the gateway 51a.

The drying furnace 51 has at its rear surface a chamber casing (or case) 53 mounted in a manner to be opened and closed through hinges 53a. In a depth-wise intermediate portion of the chamber casing 53, there is provided a flow dividing plate (or flow distribution plate) 54 having formed therein a plurality of ventilation holes 54a in a manner to face the clearance between each of the plural stages of hot plates 52. In a space between the flow diving plate 54 and the rear surface of the chamber casing 53, there is defined an exhaust chamber 55 which is in fluid flow communication with the space inside the furnace through the flow diving plate 54. A plurality of vertically disposed (three in the illustrated example) exhaust ports 55a which are in communication with the exhaust chamber 55 are provided. These exhaust ports 55a are connected to an exhaust blower 56 (exhaust means) which is disposed on top of the drying furnace 51 through a confluence chamber 57 having a plurality of inlet side connection ports 57a. The exhaust ports 55a, the confluence chamber 57, and the exhaust blower 56 are connected to each other through exhaust pipes (not illustrated).

According to this arrangement, the suction force of the exhaust blower 56 operates on each of the ventilation holes 54a in the flow dividing plate 54 through the exhaust chamber 55. As a result, the inert gas inside the sub-chamber 12 flows into the furnace 51 through the gateway 51a in the front of the furnace 51. There is thus generated a ventilation gas flow by the inert gas which flows through the gap or clearance between each of the plural stages of the hot plates 52 toward the ventilation holes 54a. Therefore, that solvent, or the like, within the function liquids which has evaporated in the course of drying is quickly discharged out of the drying furnace 51 by taking advantage of the ventilation gas flow. In addition, since the exhaust ports 55a are disposed in a plurality of vertical positions, a suction force is evenly operated on any one of the vertically disposed exhaust ports 55a. It follows that a uniform ventilation gas flow is caused to take place through the gap between each of the hot plates 52, whereby drying is performed on any one of the hot plates 52.

Furthermore, in this example, relatively large four ventilation holes 54a are formed in a lateral row for each clearance between respective stages of the hot plates 52. In addition, the flow dividing plate 54 is further provided with sliding type of adjusting plates 54b for adjusting the opening area of each of the ventilation holes 54a so that the amount of ventilation can be adjusted. Alternatively, it may be so arranged that a plurality of ventilation holes of small diameter are formed in the flow dividing plate 54 in a scattered manner over the entire surface thereof.

Figure 10:
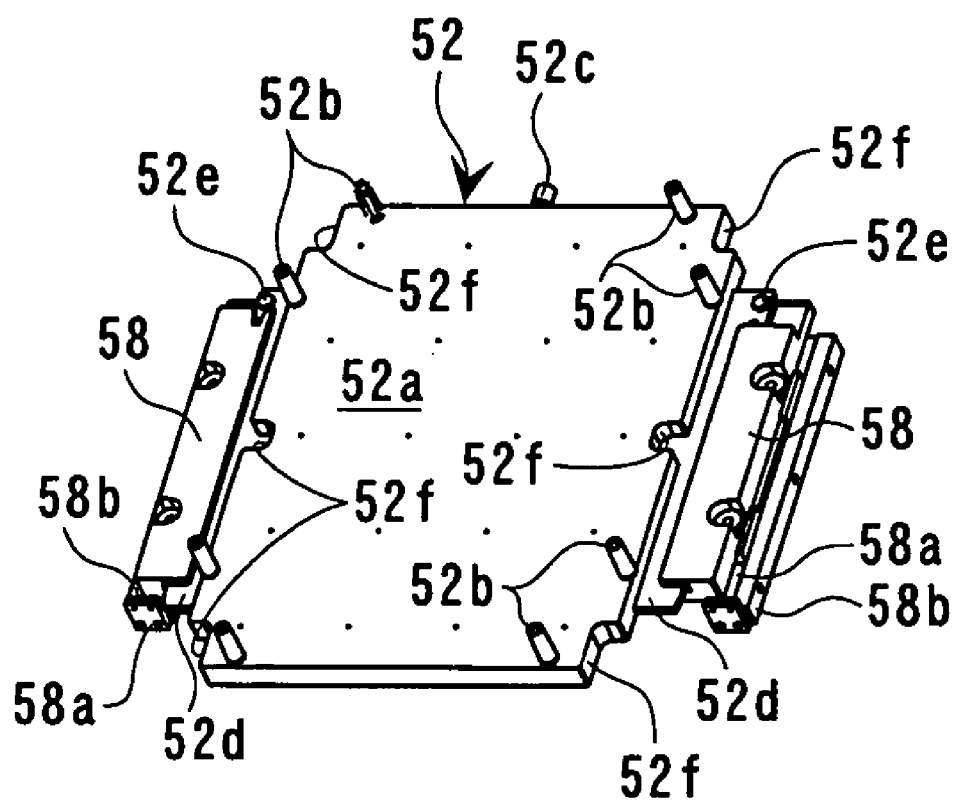
FIG. 10 is a perspective view of a hot plate which is to be used in the drying apparatus of this invention.

Each of the hot plates 52 is provided, as shown in FIG. 10, with: a plurality of positioning pins 52b which position the substrate A relative to the upper surface thereof which serves as a workpiece seating surface 52a; and a power supply connector 52c which is disposed on a rear end of the hot plate 52 so as to supply electric power to an electric heater inside the hot plate. Each of the hot plates 52 is further provided at its side edge portions with ear pieces 52d which extend sidewise with a downward step relative to the workpiece seating surface 52a. There are disposed groove-shaped rail members 58 which are engaged with the ear pieces 52d in a manner to be slidable in the back and forth direction. The rail members 58 are fixed to an inner wall surface of the drying furnace 51 in a plurality of vertical stages through thermal insulation material 58a and fixing members 58b. By removing a fixing screw 52e which is disposed at a rear end of each ear piece 52d, each of the hot plates 52 is arranged to be movable (or slidable) for insertion into, and withdrawal from, each of the rail members 58, i.e., the drying furnace 51. When the chamber casing 53 is opened, the drying furnace 51 is left open at its rear surface. Therefore, when the kind or type of the substrate A is changed, the hot plates 52 can be easily changed from the rear surface side of the drying furnace 51 for the ones to suit the size of the substrate A.

In order to secure that gap or clearance between each of the hot plates 52 and the substrate A into which the robot hand 32 can be inserted when the substrate A is handed over between each of the hot plates 52 and the transfer apparatus 3, the drying furnace 51 has built therein a lifting mechanism 59 which selectively lifts and supports a substrate A out of plural stages of hot plates 52. The lifting mechanism 59 is made up of: an elevating member 60 which is disposed on an outside surface of the drying furnace 51 and which is elongated in the vertical direction; engaging members 61 which are disposed in plural vertical stages on an inner side surface of the drying furnace 51 and which are engageable with the lower surface of the side edge portion of the substrate A extending beyond the workpiece seating surface 52a of each of the hot plate 52; and a back-and-forth moving mechanism (or a reciprocating mechanism) 62 which connects these engaging members 61 with the elevating member 60 in a manner to independently move between an operating position which falls within a vertical projected area of the side edge portions of the substrate A and a retreated position outside the projected area.

In this example, as shown in FIG. 10, there are formed three notched portions 52f in the back and forth direction along each side of the hot plate 52. The engaging members 61 are provided with claws 61a in three portions in the back and forth direction so as to engage with those side edge portions of the substrate A which project from the workpiece seating surface 52a toward the notched portions 52f.

The back-and-forth moving mechanism 62 is made up of: cylinders 63 which are provided with guides 63a and which are mounted on the elevating member 60 in plural vertical stages; and movable arms 64 which are elongated in the back-and-forth direction and which are connected to a piston rod 63b of each of the cylinders 63 so as to move laterally back and forth. To both ends of each of the movable arms 64 are connected connection pieces 61b which are fixed to both back and forth end of each of the engaging members 61 by passing through penetrating holes 51b formed in the side wall of the drying furnace 51. It is thus so arranged that, by selectively operating the plurality of cylinders 63, the corresponding engaging members 61 selectively move forward to the operating position.

On a lower end of the elevating member 60, there is rotatably mounted a cam follower 66 which comes into abutment with an eccentric cam 65 which is disposed in a lower portion of the drying furnace 51. By rotating the eccentric cam 65 with a cylinder 67 which is disposed in a lower portion of the drying furnace 51 through a crank 68 and gears (not illustrated), the elevating member 60 is moved up and down along a rail 69 which is fixed to an outer surface of a side wall of the drying furnace 51. The side wall of the drying furnace 51 has mounted thereon a cover 51c in a manner to cover the lifting mechanism 59.

According to the above arrangement, when the substrate A is mounted on, or dismounted from, any of the hot plate 52, the elevating member 60 is moved up and down in a state in which only the corresponding engaging member 61 is advanced to the operating position. The substrate A on the corresponding hot plate 52 can thus be selectively moved up by the engaging member 61. Further, in this arrangement, it is not necessary to secure an elevating space for the lifting mechanism under each of the hot plates 52. Therefore, the height of the drying furnace 51 need not be increased.

Figure 11:
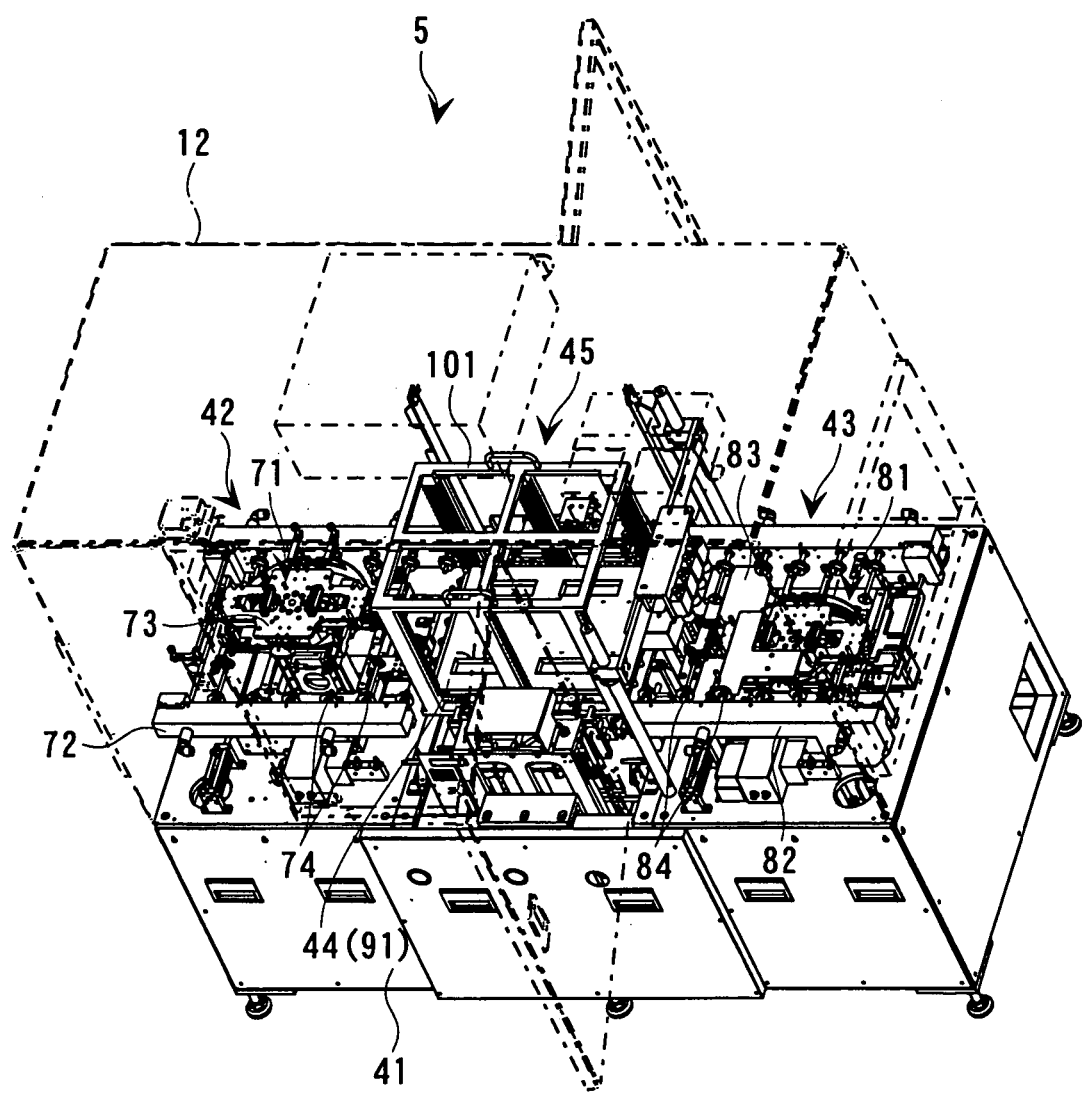
FIG. 11 is an overall perspective view of a workpiece transport apparatus of this invention.
Figure 12:
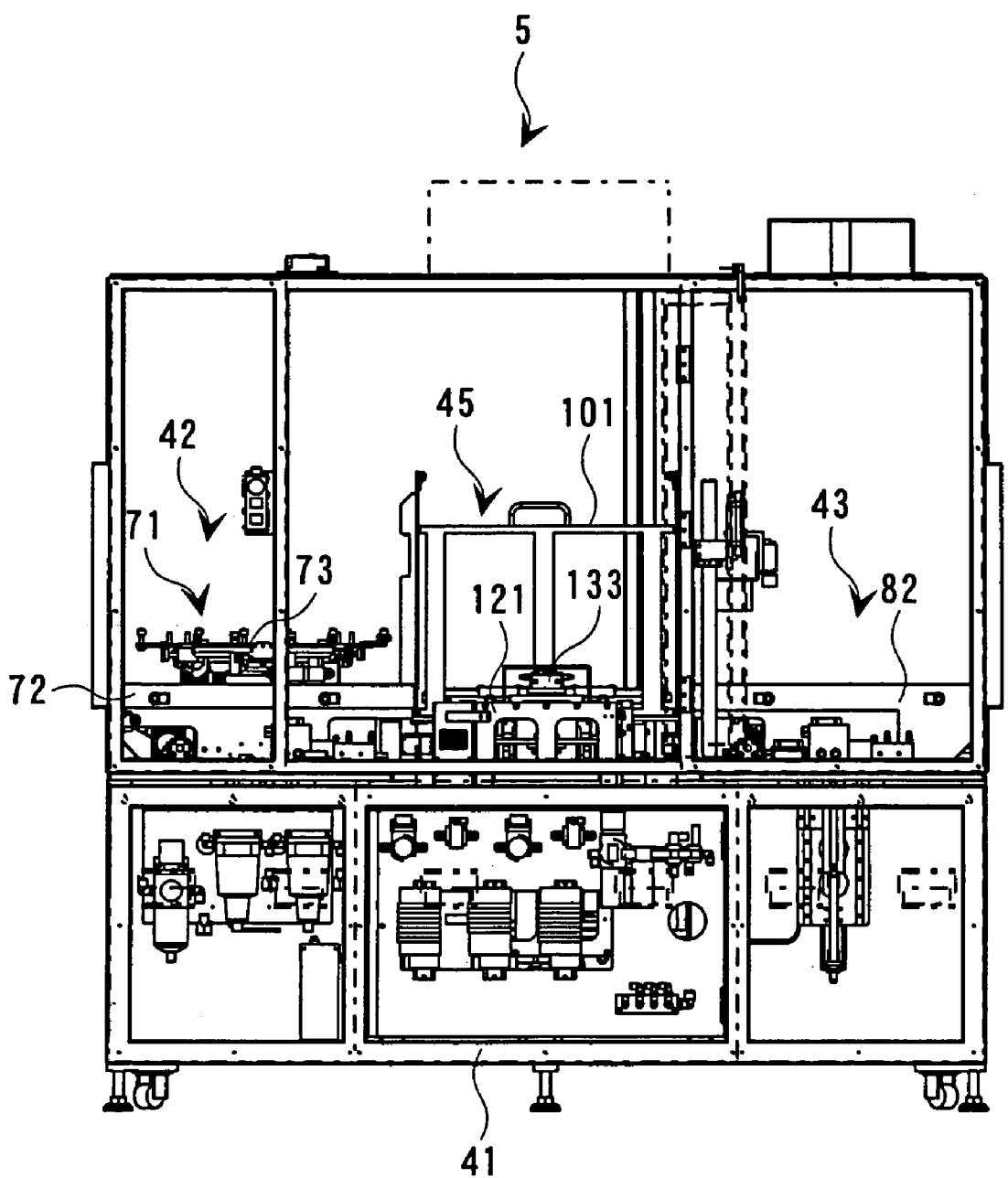
FIG. 12 is an overall front view of the workpiece transport apparatus of this invention.

As shown in FIGS. 11 and 12, the workpiece transport apparatus 5 which is used as each of the first and second transport apparatuses 5a, 5b, is made up of the following constituting elements which are disposed on a cabinet-type common machine base 41. The constituting elements in question are: a 90-degree rotating apparatus 42 which rotates the substrate A by 90 degrees on a horizontal plane; a 180-degree rotating apparatus 43 which is located downstream of the 90-degree rotating apparatus 42 and which rotates the substrate A by 180 degrees on a horizontal plane; cooling means 44 which is disposed between both the rotating apparatuses 42, 43 and which cools the substrate A; and buffer means 45 which keeps the substrates A in stock to wait for the processing thereof.

As described above, since the 90-degree rotating apparatus 42 appropriately feeds the substrate A to each of the drying apparatuses 4, the laterally-orientated substrate A is rotated to direct in the longitudinal direction. Further, the substrate A received from the drying apparatus 4 through the transfer apparatus 3 is fed to the cooling means 44. The buffer apparatus 45 keeps in stock the substrates A cooled by the cooling means 44 so that the substrates A are kept waiting on the transport apparatus 5 when the feeding of the substrate A to the next imaging apparatus 2 is suspended due to cleaning of the liquid droplet ejection heads 26, or the like. The 180-degree rotating apparatus 43 rotates the substrate A by 180 degrees to return the change in posture of the substrate A based on the transfer mode of each of the transfer apparatuses 3 back to the original posture so that the substrate A can be fed to each of the imaging apparatuses 2 of red color, green color, and blue color in all the same posture.

With reference to FIGS. 1 and 6, a brief description will now be made about the transporting and processing procedures of the substrate A in the emitting function layer manufacturing line of this embodiment.

When the transfer apparatus 7 on the inlet side places the substrate A that has been received from the magazine loader 6 on the inlet side in a manner to face the blue-color transfer apparatus 3a, one 31 of the robot arms of the blue-color transfer apparatus 3a receives the substrate A and feeds it to the blue-color imaging apparatus 2a. In the blue-color imaging apparatus 2a, the received substrate A is relatively moved in the X-axis direction and the Y-axis direction, and the blue-color emitting function liquid droplets are selectively ejected thereto. The other 31 of the robot arms of the blue-color transfer apparatus 3a approaches the substrate A that has been returned to the home position after completion of the ejection operation and receives it to thereafter feed it to the blue-color drying apparatus 4a.

Once the drying of the substrate A has been finished, the other 31 of the robot arms receives it and transfers it to the 90-degree rotation apparatus 42 of the first transport apparatus 5a. The substrate A is then fed from the 90-degree rotation apparatus 42 to the cooling means 44. The substrate A that has been cooled by the cooling means 44 is fed to the buffer means 45. Then, depending on the processing state of the substrate A in the red-color imaging apparatus 2b, the substrate A is fed from the buffer means 45 to the 180-degree rotation apparatus 43. The substrate A is then rotated by 180 degrees to cause it to face the red-color transfer apparatus 3.

Thereafter, in the same manner as above, the transferring of the substrate A by the red-color transfer apparatus 3b, and the processing of the substrate A by the red-color imaging apparatus 2b and by the red-color drying apparatus are performed. Further, the substrate that has been transferred from the red-color drying apparatus 4b to the second transfer apparatus 5b is appropriately fed to the green-color imaging apparatus 2c and the green-color drying apparatus 4c from the second transport apparatus 5b through the green-color transfer apparatus 3c. The substrate A on which the emitting layer has been formed in the manner as described above is finally transferred from the green-color drying apparatus 4c to the outlet-side transfer apparatus 9 through the green-color transfer apparatus 3c, and is further fed to the magazine loader 8 on the outlet side.

The 90-degree rotation apparatus 42 and the 180-degree rotation apparatus 43 have the similar arrangements and is made up of: rotation parts 71, 82 which rotate the substrate A on the horizontal plane; and transport parts 72, 82 which perform the taking in and taking out of the substrate A. The rotation parts 71, 81 are provided with work tables 73, 83 which have assembled therein a centering mechanism which performs centering of the substrate A such that the work tables 73, 83 are rotatable and movable up and down. In case the substrate A is transferred from the transfer apparatus 3 to the 90-degree rotation apparatus 42, the substrate A is transferred to the work table 73 in a state in which the work table 73 is lifted above the transport part 72.

In case the substrate A is rotated by 90 degrees, the substrate A is subjected to centering into the center of rotation by the centering mechanism before rotating the work table 73. In case the substrate A is taken out of the 90-degree rotation apparatus 42, the work table 73 is lowered, and the substrate A is handed over to a plurality of feed rollers 74 which are disposed in the transport part 72.

Thereafter, by the rotation feeding of the feed rollers 74, the substrate A is sent out to the cooling means 44.

In case the substrate A is sent out from the buffer means 45 to the 180-degree rotation apparatus 43, the substrate A is taken in to a position right above the work table 83 by the plurality of feed rollers 83 in the transport part 82 in a state in which the work table 83 is lowered. Thereafter, the work table 83 is lifted, and the substrate A is handed over to the work table 83. Then, the substrate A is subjected to centering into the center of rotation by the centering mechanism. The work table 83 is then rotated by 180 degrees, and the substrate A is handed over to the transfer apparatus 3.

The cooling means 44 is provided for the purpose of cooling the substrate A that was heated in the drying apparatus 4 of the processing unit in the preceding stage, down to a set control temperature (e.g., 20□) of the imaging apparatus 2 so as to prevent the occurrence of deterioration in the positioning accuracy and in the coating positioning accuracy of the liquid droplets due to the thermal expansion of the substrate A. The cooling means 44 of this example is constituted by a cooling plate 91 which is forcibly cooled by a refrigerant. The cooling plate 91 is supported in suspension in an intermediate portion of the common machine base 41 by means of supporting columns (not illustrated) which are vertically disposed inside the common machine base 41. It is thus so arranged that the substrate A sent from the 90-degree rotation apparatus 42 is seated on the cooling plate 41, thereby cooling it.

The cooling plate 91, whose details are as shown in FIGS. 13 through 15, is made up of: a thick plate main body 92; a thin upper plate 93 which is adhered to the upper surface of the plate main body 92; and a base 94 which is adhered to the lower surface of the plate main body 92. The plate main body 92 has formed therein a plurality of parallel refrigerant passages 95 for causing the refrigerant to flow therethrough. These refrigerant passages 95 are connected to a refrigerant circulation circuit 96 through header pipes 96a, 96b on the inlet side and on the outlet side, respectively.

As the refrigerant, water may be used but, in this example, air is used. A circulation fan 96c and a cooler 96d are disposed in the refrigerant circulation circuit 96. Quick-action joints 95a are disposed on both end portions of the plate main body 92 so as to connect each of the refrigerant passages 95 to the header pipes 96a, 96b. In this example, the refrigerant passages 95 are formed by drilling into the plate main body 92. Alternatively, the pipes to serve as the refrigerant passages may be cast into the plate main body 92.

The upper plate 93 has formed therein a large number of suction holes 97. On an upper surface of the plate main body 92, there are formed meshed grooves 98 which are in fluid flow communication with the suction holes 97. The grooves 98 are connected to a negative-pressure source (not illustrated) through a joint 98a which is attached to the base 94. In this manner, air suction is performed from the suction holes 97 with the grooves 98 serving as the air suction passages. The substrate A is sucked to the upper plate 93, whereby the substrate A is efficiently cooled.

The cooling plate 91 is formed slightly smaller in width than the substrate A, and has formed therein clearance holes 99 relative to a transport member 144 as described hereinafter.

Figure 16:
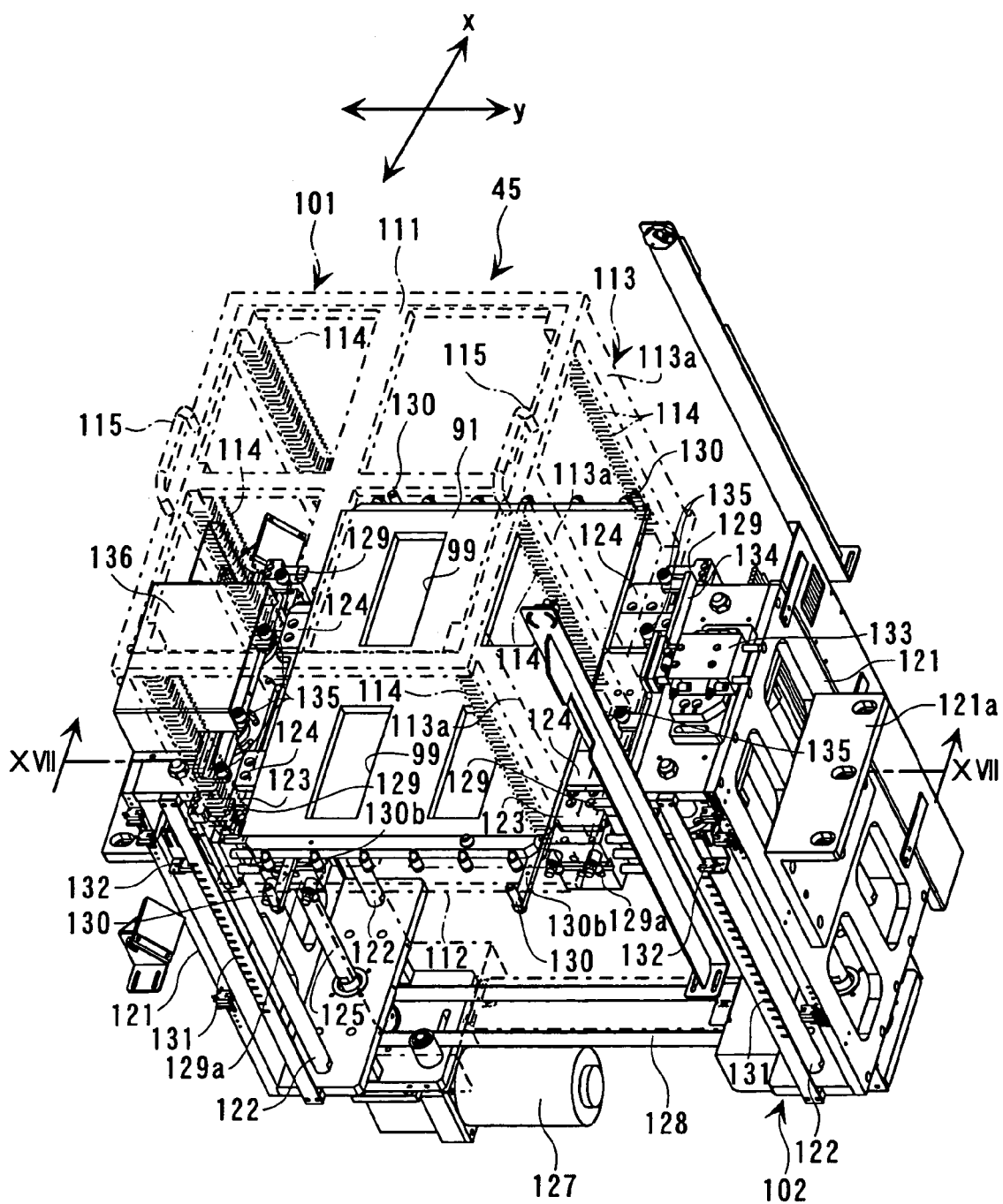
FIG. 16 is an overall perspective view of buffer means of this invention.

The buffer means 45 is made up, as shown in FIGS. 16 and 17, of: a magazine rack 101 which is capable of supporting the substrates A in a plurality of vertical stages; and an elevating mechanism 102 for moving up and down the magazine rack 101. The magazine rack 101 is formed into a vacant box shape by: an upper frame 111; a lower frame 112; and both side frames which are each made up of three frame members 113a which are elongated in the vertical direction so as to connect the upper frame 111 and the lower frame 112 together. The frame members 113a on each side are respectively provided with a plurality of claw-shaped workpiece receiving members 114 which are engaged with the lower surface of the side edges of the substrate A to thereby support the substrate A. The magazine rack 101 is made for exclusive use depending on the size of the substrates A, and is provided with a handle 115 on both sides of the upper frame 111 to facilitate the carrying of the magazine rack 101 at the time of replacing. The cooling plate 91 is also made for exclusive use depending on the size of the substrates A, and is replaced together with the magazine rack 101.

Both side frames 113, 113 of the magazine rack 101 are positioned on both sides as seen in a y-axis direction of the cooling plate 91, where the direction of transporting the substrate A is defined as an x-axis direction and the direction which crosses the x-axis direction at right angles is defined as the y-axis direction. The magazine rack 101 supported by the elevating mechanism 102 in a state in which the lower frame 112 is located below the cooling plate 91. In other words, the cooling plate 91 is arranged so as to be housed in that space inside the rack which lies between both the side frames 113, 113. In this arrangement, by the upward movement of the magazine rack 101, the workpiece receiving members 114 are engaged with the lower surface of the side edge portions which project from the cooling plate 91 of the substrate A which is seated on the cooling plate 91. The substrate A is thus moved up above the cooling plate 91 to thereby keep the substrate A in stock in that state.

According to the above arrangement, the space above the cooling plate 91 can be effectively utilized as the space for keeping the substrates A in stock by the buffer means 45. Therefore, it becomes possible to dispose the cooling means 44 and the buffer means 45 in a space-efficient manner in an overlapped manner in the same place, resulting in a size reduction of the workpiece transport apparatus 5. The magazine rack 101 keeps in stock the substrates A from the upper workpiece receiving member 114 toward the lower workpiece receiving member 114 in sequence.

The elevating mechanism 102 is made up of: a pair of supporting frames 121, 121 which are fixed at a distance from each other in the y-axis direction; and an elevating frame 123 which is supported on each of the supporting frames 121 in a manner to be movable up and down through a pair of guide bars 122, 122. The lower frame 112 of the magazine rack 101 is seated on a receiving seat 124 on the elevating frame 123. The outer side surface of the supporting frame 121 has fixed thereto a bracket 121a for fixing thereof to the inside of the common machine base 41.

The elevating frame 123 has fixed thereto a nut 126 which is engaged in a screwed manner with a ball screw 125 which is rotatably supported on the supporting frame 121. As a result of rotation of the ball screw 125, the elevating frame 123 is moved up and down. The ball screw 125 which is rotatably supported on one 121 of the supporting frames is directly coupled to a geared motor 127 which is fixed to the lower end of the supporting frame 121. The ball screw 125 which is rotatably supported by the other 121 of the supporting frames is coupled to the geared motor 127 through a belt 128. Those elevating frames 123, 123 on both sides in the y-axis direction which are supported by both the supporting frames 121, 121 are moved up and down in synchronism by the geared motor 127, whereby the magazine rack 101 can be moved up and down while keeping a horizontal posture.

Each of the elevating frames 123 is provided with a pair of positioning pins 130, 130 which are moved back and forth in the x-axis direction through an arm 130b by means of a cylinder 130a. By pinching the lower frame 112 of the magazine rack 101 with both the positioning pins 130, 130 from both sides in the x-axis direction, the magazine rack 101 can be positioned in the x-axis direction. At the same time, by moving downward the lower frame 112 of the magazine rack 101 while pinching it with the holding claws 129, 129 of both the elevating frames 123, 123 from both sides in the y-axis direction, the magazine rack 101 can be fixed to the elevating frame 123 in a state of being positioned in the y-axis direction.

In one end portion in the x-axis direction of each of the supporting frames 121, there is fixed a vertically elongated slit 131. An optical sensor 132 for reading the notches in the slit 131 is mounted on each of the elevating frames 123. The vertical position of the magazine rack 101 can thus be recognized with a signal from the optical sensor 132.

Each of the supporting frames 121 is provided at an upper end portion thereof with a movable frame 134 which is movable back and forth in the y-axis direction by means of a cylinder 133. The movable frame 134 is provided with a plurality of guide rollers 135 which face the framed clearances of the side frame 113 of the magazine rack 101. When the substrate A is transported by a transport mechanism (to be described hereinafter) in the space within the rack, the guide roller 135 is advanced into the space within the rack through the framed clearances of the side frame 113 of the guide rollers 135. The side edges of the substrate A are guided by the guide rollers 135, whereby the substrate A is prevented from running askew at the time of transportation. As shown in the left-side supporting frames 121 as shown in FIGS. 16 and 17, the cylinder 133 is covered by a cover 136 on the supporting frame 121.

Figure 18:
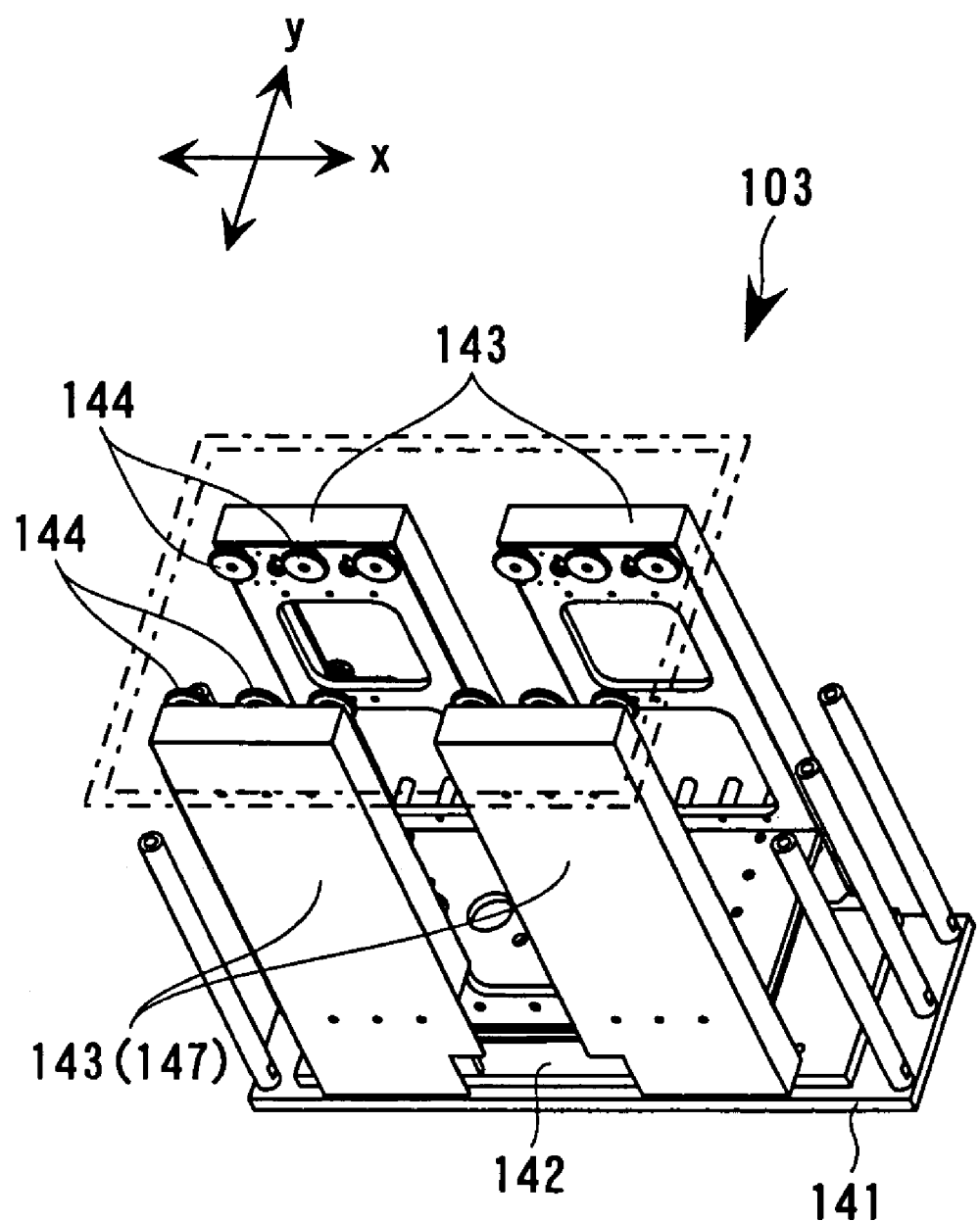
FIG. 18 is an overall perspective view of a transport apparatus for the buffer means of this invention.
Figure 19:
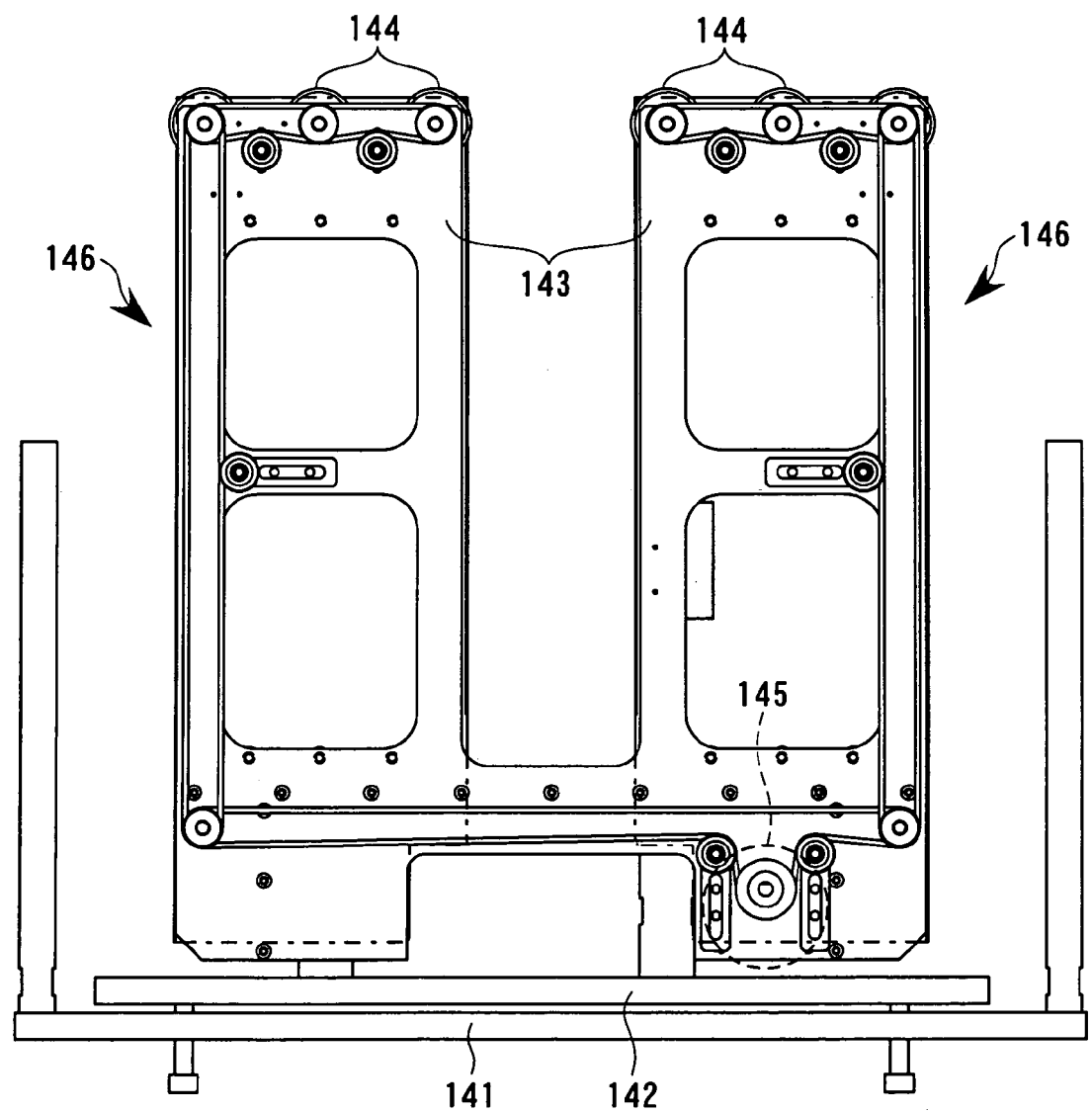
FIG. 19 is a side view of the transport apparatus for the buffer means in a state in which the cover has been taken away.

Although not illustrated in FIGS. 16 and 17, the space between both the supporting frames 121, 121 is provided with a transport mechanism 103 which is shown in FIGS. 18 and 19 and which performs transportation of the substrate A in the space within the rack. The transport member 103 is provided with a conveyor frame 142 which is mounted on an elevating base 141 to be moved up and down by a cylinder (not illustrated). On both sides of the conveyor frame 142, there are disposed a pair of rising frames 143, 143, erected to stand vertically, at a distance from each other in the x-axis direction. On an inner side surface at an upper end portion of each of these rising frames 143, there are rotatably disposed a plurality of (three in the illustrated example) feeding rollers 144 which serve as the transport members. These feeding rollers 144 are rotated by an electric motor 145 which is mounted on a lower part of the conveyor frame 142, through a belt-type of power transmission mechanism 146. The power transmission mechanism 146 is covered with a cover 147 on an outside of the rising frames 147, 147.

The rising frames 143 and the feeding rollers 144 lie opposite to the clearance holes 99 which are formed in the cooling plate 91. With the upward movement of the elevating base 141, the feeding roller 144 protrude beyond the upper surface of the cooling plate 91 through the clearance holes 99, whereby the transportation of the substrate A within the space of the rack is performed at a predetermined transportation height above the upper surface of the cooling plate 91. This transportation height is set to be of the same level as the transportation height by the transport parts 72, 82 of the 90-degree rotation apparatus 42 and the 180-degree rotating part 43.

Figure 20A:
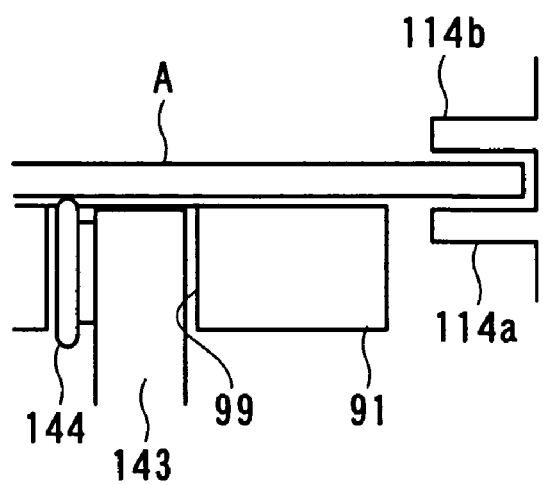
FIGS. 20A through 20C are schematic views explaining the seating operation of the substrate onto the cooling plate of this invention.

In this example, the transportation height is set as follows as shown in FIG. 20A. Namely, in a state in which, out of the plural stages of workpiece receiving members on the magazine rack 101, the workpiece receiving member 114a to support the substrate A next is positioned slightly lower than the upper surface of the cooling plate 91, the height is such that the substrate A present at the transportation height can be housed or contained inside the clearance between the workpiece receiving member 114a and the workpiece receiving member 114b that is present in the next upper stage.

Figure 20B:
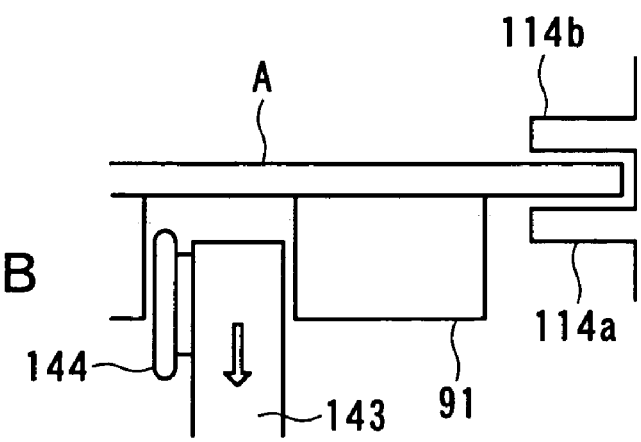
Figure 20C:
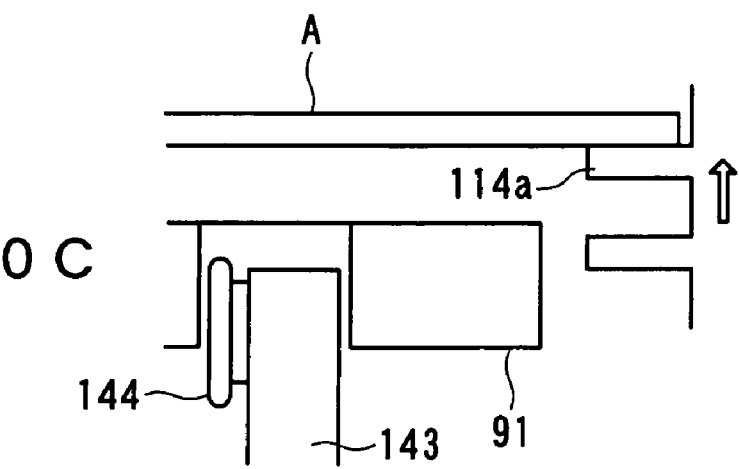

After the substrate A to be sent out from the transport part 72 of the rotation apparatus 42 has been transported into the space within the rack, the feeding rollers 144 are lowered below the upper surface of the cooling plate 91 as shown in FIG. 20B, the substrate A is allowed to be seated on the upper surface of the cooling plate 91 to thereby cool the substrate A. When the substrate A is judged to have been cooled to a predetermined temperature as a result of a direct detection of the temperature of the substrate A, the magazine rack 101 is moved up. As shown in FIG. 20C, the substrate A is supported on the workpiece receiving member 114a and, in this state, the substrate A is lifted off from the cooling plate 91.

In case the substrate A held in stock on the magazine rack 101 is sent out in this manner to the 180-degree apparatus 43, the magazine rack 101 is lowered to the position shown in FIG. 20A in a state in which the feeding rollers 144 are projected above the cooling plate 91. The substrate A is then put on the feeding rollers 144 to thereby send it out to the transport part 82 of the 180-degree rotation apparatus 43.

As described above, by disposing the buffer means 45, even if the feeding of the substrate A to the imaging apparatus 2 in the processing unit of the downstream or latter stage is suspended due to the cleaning operation, or the like, of the liquid droplet ejection heads 26, the workpiece can be fed from the drying apparatus 4 in the processing unit of the upstream or former stage to thereby keep it in stock in the buffer means 45. Here, if the heating temperature of the substrate A in the drying apparatus 4 is low, the solvent will remain in the peripheries of the pixel regions, giving rise to the occurrence of color mixture and color dropping in the imaging apparatus 2 in the latter stage. Further, due to the deviation in the drying time, the film thickness becomes non-uniform in the stage (or in the course) in which the function liquid droplets get dried and shrunk. As a solution, in this example, the following arrangement is made. Namely, even during the time in which the feeding of the substrate A to the imaging apparatus 2 of the processing unit in the latter stage is suspended, the substrate A is discharged or fed out from drying apparatus 4 at the time when the drying time of the substrate A in the drying apparatus 4 in the processing unit of the former stage has reached a predetermined time to thereby keep the substrate A in stock in the buffer means 45.

Figure 22:
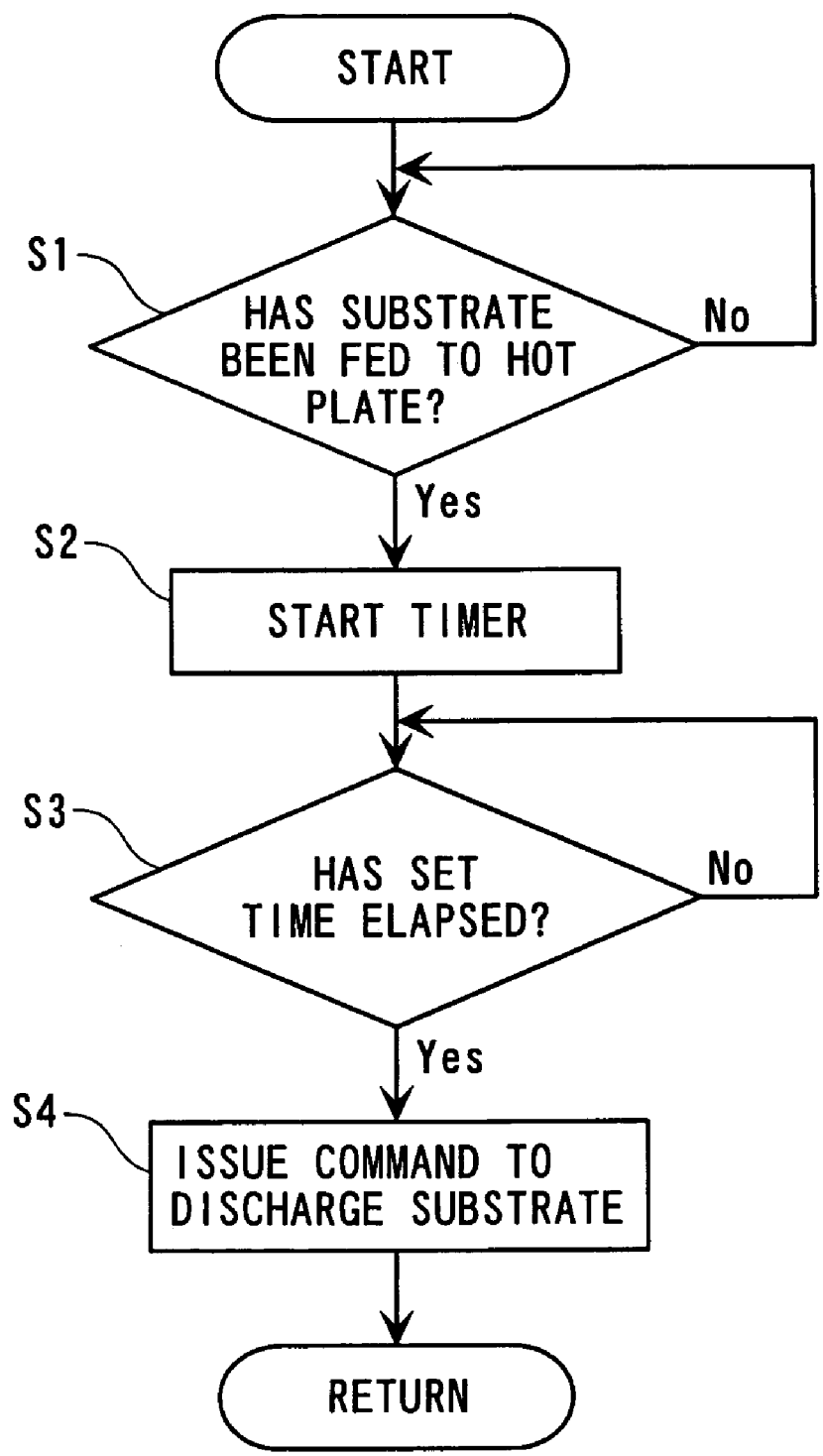
FIG. 22 is a flow chart showing the control processing of the drying time of this invention.

In concrete, the control means (not illustrated) contains a built-in timer which corresponds to each of the plural stages of the hot plates 52 in the drying apparatus 4. Then, the following arrangement is made as shown in FIG. 22. Namely, when a substrate A has been fed to any one of the hot plates 52 (S1), counting of timer corresponding to this hot plate 52 is started (S2). When the set time from the point of time of feeding the substrate has elapsed (S3), a command is issued (S4) to the transfer apparatus 3 to discharge the substrate A from the above-described hot plate 52. In this manner, the drying time of the substrate A can be kept uniform to thereby prevent the film thickness from becoming non-uniform.

Figure 21A:
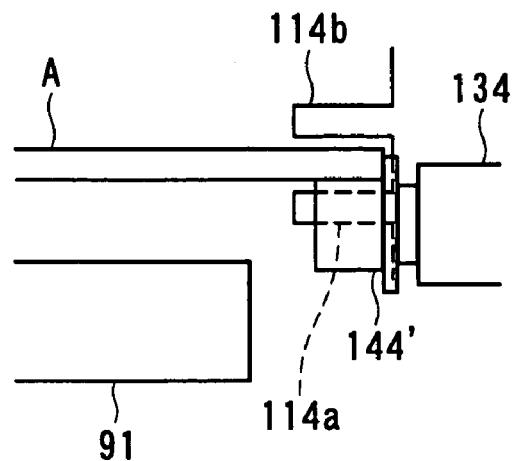
FIGS. 21A through 21C are schematic views explaining the seating operation of the substrate onto the cooling plate according to another embodiment of this invention.

In the above-described example, since the cooling plate 92 is provided with clearance holes 99 to prevent the interference with the feeding rollers 144, the cooling efficiency of the substrate A lowers to a certain degree. As a solution, the following arrangement may be employed. Namely, the movable frame 134 which is disposed on the elevating frame 123 may be provided with a feeding roller 144' as shown in FIGS. 21A through 21C in place of the guide rollers 135 so that the substrate A can be transported in the space inside the rack.

The feeding roller 144' is arranged to be capable of retracting outward in the space inside the rack by the movement of the movable frame 134. Even if the height of transport of the substrate A in the space inside the rack is set, as shown in FIG. 21A, to be of such a position in which the substrate A lying in a position corresponding to the height of the transport can be contained or housed in a clearance between the workpiece receiving member 114a and the upper-stage workpiece receiving member 114b, the substrate A can be seated on the cooling plate 91 by the following operations.

Figure 21B:
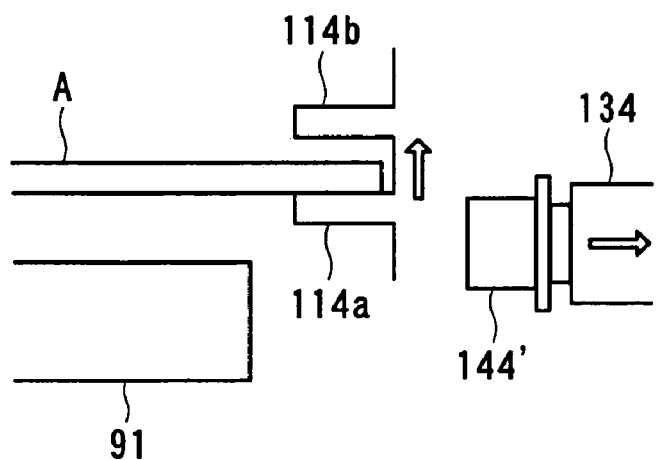
Figure 21C:
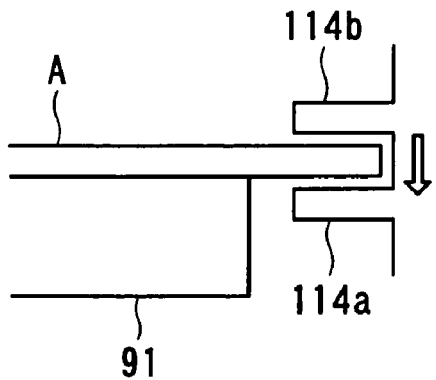

Namely, first, after the substrate A has been fed into the space inside the rack at the above-described height of transport, the magazine rack 101 is moved up, as shown in FIG. 21B, so that the workpiece receiving member 114a, which is to subsequently support the workpiece, supports the substrate A in the above-described height of transport. Thereafter, in a state in which the feeding roller 144' is retracted outside beyond the space inside the rack, the magazine rack 101 is lowered as shown in FIG. 21C to thereby cause the substrate A to be seated on the cooling plate 91. After the substrate A has been cooled, the magazine rack 101 is moved up once again. In a state in which the substrate A is supported on the workpiece receiver 114a in the same manner as in the above example, the substrate A is lifted off from the cooling plate 91.

As described above, by using the feeding roller 144' which is retractable outside beyond the space inside the rack as the transport member to transport the substrate A in the space inside the rack, the cooling plate 91 need not be provided with the clearance holes 99. The efficiency of cooling the substrate A can thus be improved.

In the above-described example in which the feeding rollers 144 which are movable up and down are employed, the substrate A can be seated onto the cooling plate 91 in the following manner. Namely, the position of transport height is set as shown in FIG. 21A, and the magazine rack 101 is moved up after having fed the substrate to thereby support the substrate A on the workpiece receiving member 114a. Thereafter, the feeding rollers 144 are moved down and the rack 101 is also moved down to thereby cause the substrate A to be seated on the cooling plate 91. It is however more efficient to arrange, as in the above example, such that the substrate A can be seated on the cooling plate 91 only by lowering the feeding rollers after the substrate has been fed.

It is possible to manufacture various eletrooptic devices (flat panel displays) by using the line 1 of manufacturing an emitting function layer according to this embodiment. Therefore, a description will now be made about the construction (structure) of, and the method of manufacturing, an eletrooptic device (flat panel display) in the form of a color filter, a liquid crystal display device, an organic electroluminescence (EL) device, a plasma display panel (PDP) device, an electron emission device (FED device, SED device), or the like. Here, the electron emission device is a concept inclusive of a field emission display (FED) device and a surface conduction electron emitter (SED) display.

Figure 23:
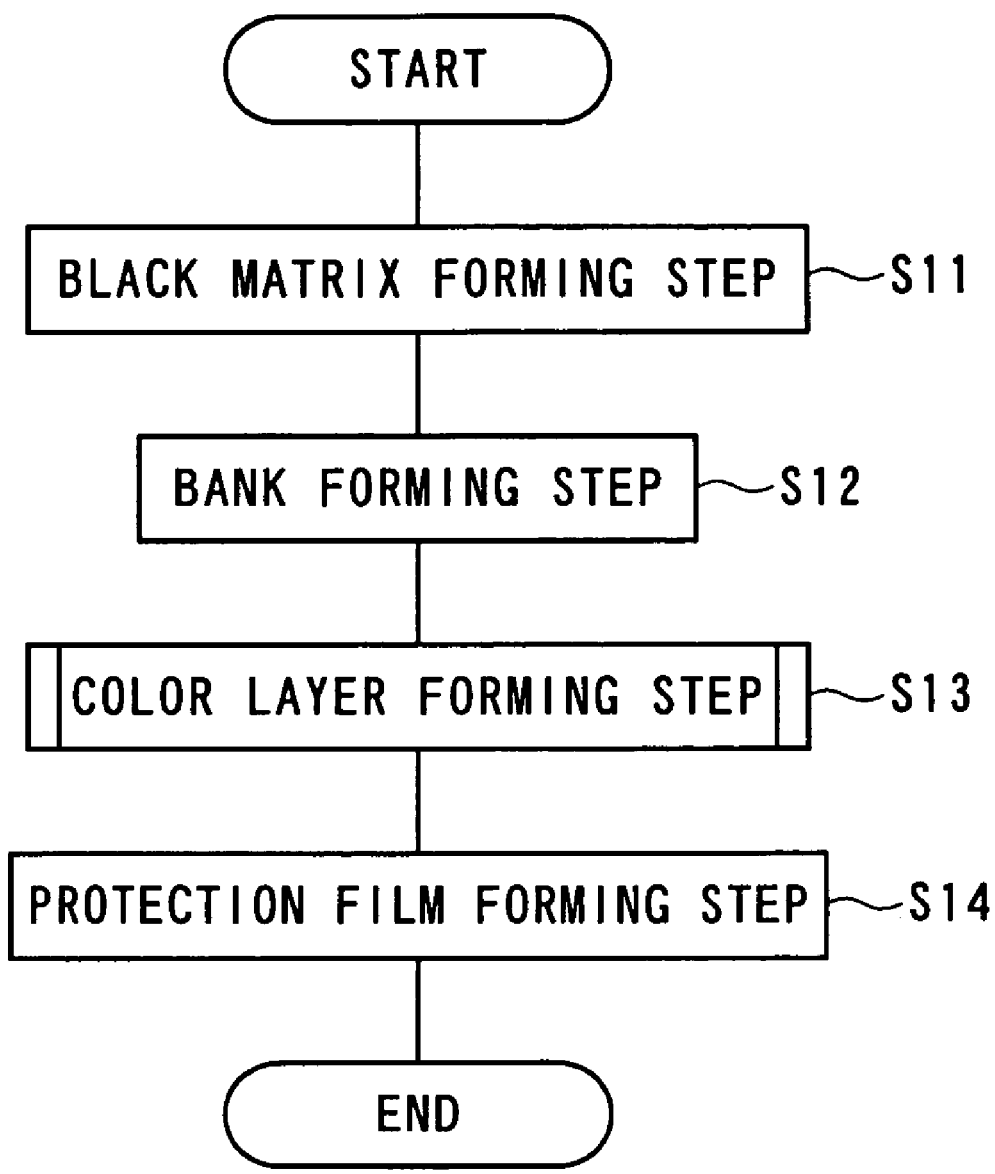
FIG. 23 is a flow chart explaining the manufacturing steps of a color filter of this invention.

First, an explanation will be made about the method of manufacturing a color filter which is built or assembled in a liquid crystal display device, an organic EL device, or the like. FIG. 23 is a flow chart showing the manufacturing steps of the color filter, and FIGS. 24A through 24E are schematic cross-sectional views showing the color filter 500 (filter base member 500A) of this embodiment, as shown in the order of manufacturing steps.

Figure 24A:
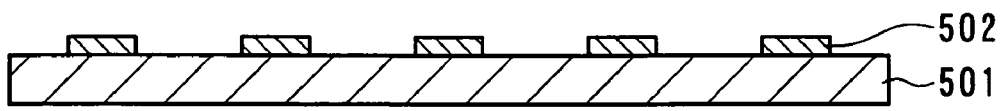
FIGS. 24A–24E are schematic sectional views of a color filter shown in the order of manufacturing steps.

First, at the black matrix forming step (S11), as shown in FIG. 24A, a black matrix 502 is formed on a substrate (W) 501. The black matrix 502 is formed of metallic chrome, a laminated member of metallic chrome and chrome oxide, or of resin black, or the like. In order to form the black matrix 502 made of a metallic thin film, a sputtering method, vapor deposition method, or the like, may be used. In addition, in case the black matrix 502 made of a resin thin film is formed, a gravure printing method, photo-resist method, thermal transfer method, or the like, may be used.

Figure 24B:
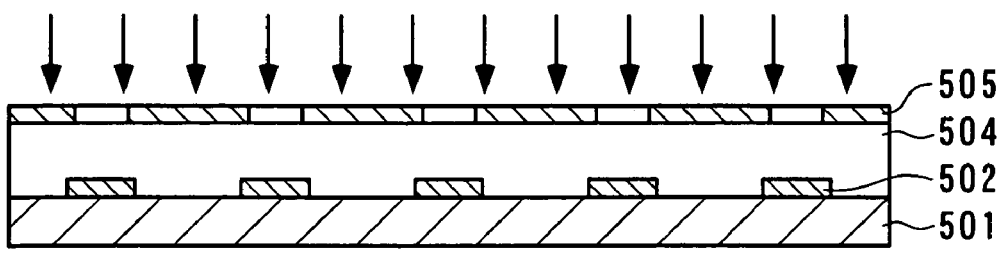

Then, at a bank forming step (S12), a bank 503 is formed in a state of being superposed on the black matrix 502. In other words, as shown in FIG. 24B, there is formed a resist layer 504 which is made of a negative type of transparent photosensitive resin so as to cover the substrate 501 and the black matrix 502. Then, the upper surface thereof is subjected to exposure processing in a state of being coated with a mask film 505 which is formed in a shape of a matrix pattern.

Figure 24C:
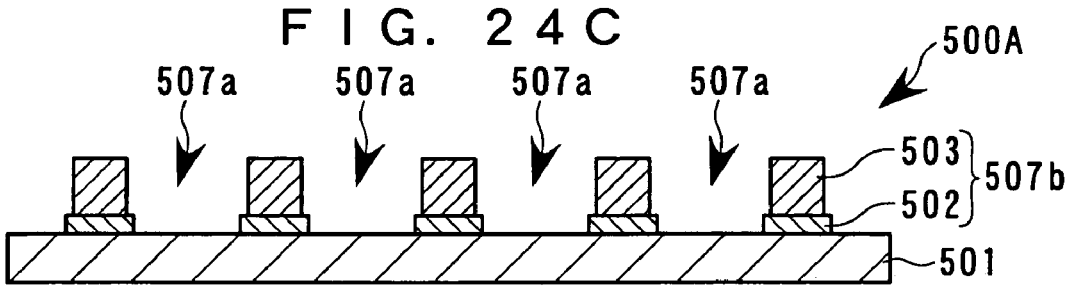

As shown in FIG. 24C, the un-exposed portion of the resist layer 504 is subjected to etching processing to perform patterning of the resist layer 504, whereby a bank 503 is formed. In case the black matrix is formed by the resin black, it becomes possible to commonly use the black matrix and the bank.

The bank 503 and the black matrix 502 thereunder become a partition wall portion 507b which partitions each of pixel regions 507a, thereby defining a shooting or firing region by the function liquid droplet (i.e., a region in which the function liquid droplet hits the target) at the subsequent color layer forming step to form the color layers (film forming layers) 508R, 508G, 508B.

By performing the above-described black matrix forming step and the bank forming step, the above-described filter base member 500A can be obtained.

As the material for the bank 503, there is used in this embodiment a resin material whose surface of coated film becomes liquid-repellent (water-repellent). Since the surface of the substrate (glass substrate) 501 has a liquid-affinity (affinity to water), the accuracy of shooting the liquid droplet into each of the pixel regions 507a enclosed by the bank 503 (partition wall portion 507b) is improved at a color layer forming step which is described hereinafter.

Figure 24D:
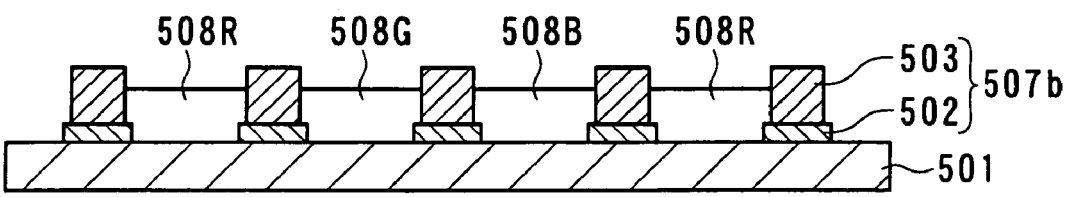

Then, at a color layer forming step (S13), as shown in FIG. 24D, the function liquid droplet is ejected by the function liquid droplet ejection head 26 to thereby cause the liquid droplet to be shot or fired into each of the pixel regions 507a enclosed by the partition wall portion 507b. In this case, by using the liquid droplet ejection heads 26, three colors of red (R), green (G), and blue (B) function liquids (filter materials) are respectively introduced to thereby eject the function liquid droplets.

Figure 24E:
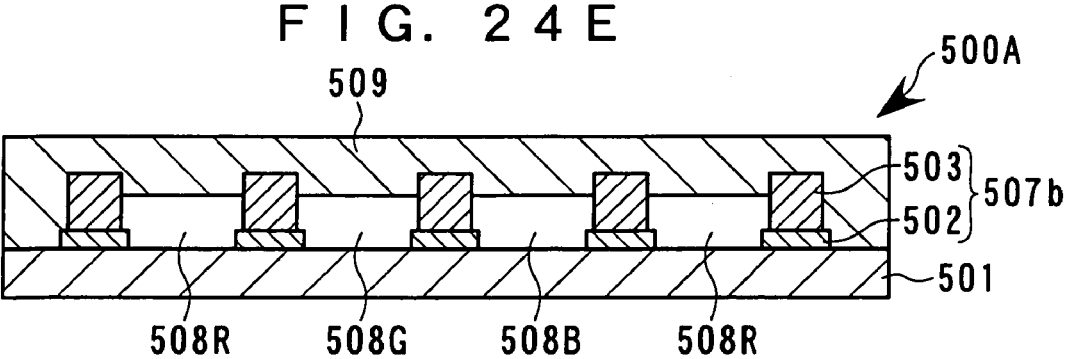

Thereafter, after drying processing (processing of heating, or the like), the function liquid is caused to be fixed to thereby form color layers 508R, 508G, 508B of three colors. Once the color layers have been formed, the step transfers to a protection film forming step (S14). As shown in FIG. 24E, a protection film 509 is formed to cover the upper surfaces of the substrate 501, the partition wall portion 507b, and color layers 508R, 508G, 508B.

In other words, after having ejected the protection film coating liquid over that entire surface of the substrate 501 on which the color layers 508R, 508B, 508G are formed, the protection film 509 is formed through the drying step.

After having formed the protection film 509, the substrate 501 is cut into respective effective pixel regions to thereby obtain the color filter 500.

Figure 25:
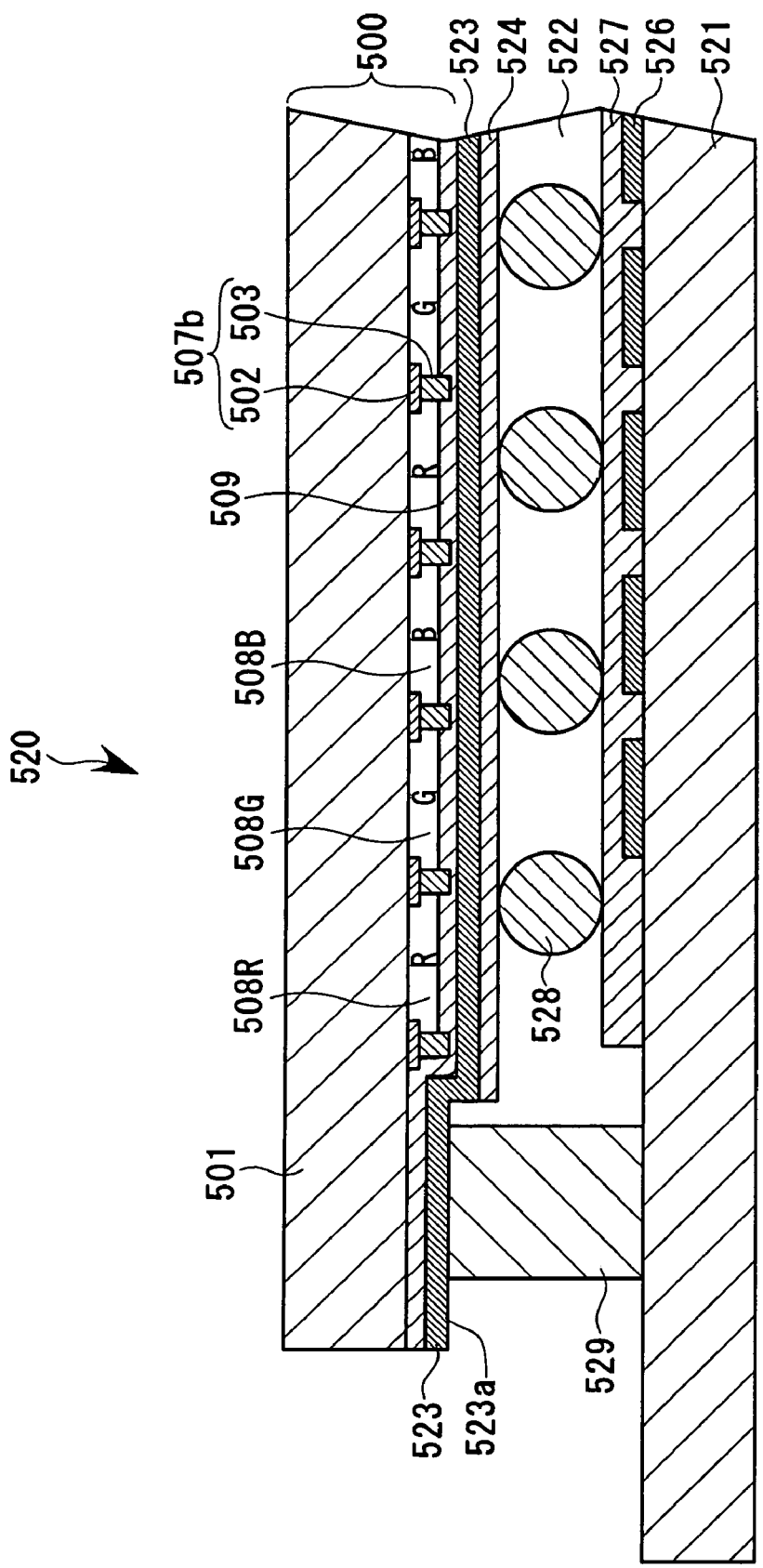
FIG. 25 is a sectional view of an important portion showing a general arrangement of a liquid crystal device using a color filter to which this invention is applied.

FIG. 25 is a sectional view of an important portion showing a general structure of passive matrix type of liquid crystal device (liquid crystal device) as an example of a liquid crystal display device employing the above-described color filter 500. By mounting auxiliary elements such as a liquid crystal driving integrated circuit (IC), backlight, supporting member, or the like, on this liquid crystal device 520, there is obtained a transmission liquid crystal display device as a final product. The color filter 500 is the same as that shown in FIGS. 24A through 24E. Therefore, the same reference numerals are affixed to the corresponding parts/portions and the explanation thereabout is omitted.

This liquid crystal device 520 is made up substantially of: a color filter 500; an opposite substrate 521 made of a glass substrate, or the like; and a liquid crystal layer 522 which is made up of a super twisted nematic (STN) liquid crystal composition interposed therebetween. The color filter 500 is disposed on an upper side as seen in the figure (i.e., on a side from which the viewer looks at the color filter).

Although not illustrated, on an outside surface of the opposite substrate 521 and of the color filter 500 (i.e., the surface which is opposite to the liquid crystal layer 522), there is respectively disposed a polarizer. On an outside of the polarizer which is positioned on the side of the opposite electrode 521, there is disposed a backlight.

On the protection film 509 (on the side of the liquid crystal) of the color filter 500, there are disposed a plurality of rectangular first electrodes 523 which are elongated in the left and right direction as seen in FIG. 25. A first alignment layer 524 is formed so as to cover that side of the first electrode 523 which is opposite to the color filter 500.

On that surface of the opposite substrate 521 which lies opposite to the color filter 500, a plurality of second electrodes 526 are formed at a given distance to one another in a direction at right angles to the first electrode 523 of the color filter 500. A second alignment layer 527 is formed so as to cover that surface of the second electrode 526 which is on the side of the liquid crystal layer 522. The first electrode 523 and the second electrode 526 are formed by a transparent conductive material such as indium thin oxide (ITO), or the like.

The spacer 528 which is provided inside the liquid crystal layer 522 is a material to keep the thickness of the liquid crystal layer 522 (cell gap) constant. The sealing material 529 is a material to prevent the liquid crystal composition inside the liquid crystal layer 522 from leaking outside. One end of the first electrode 523 is extended to the outside of the sealing material 529 as a running cable 523a.

The crossing portions between the first electrode 523 and the second electrode 526 form the pixels. It is thus so arranged that the color layers 508R, 508G, 508B of the color filter 500 are positioned in these portions which form the pixels.

At the ordinary manufacturing steps, the color filter 500 is coated with the patterning of the first electrode 523 and the first alignment layer 524, to thereby form the portion on the side of the color filter 500. Aside from the above, the opposite substrate 521 is coated with the patterning of the second electrode 526 and the second alignment layer 527, to thereby form the portion on the side of the opposite substrate 521. Thereafter, the spacer 528 and the sealing material 529 are formed into the portion on the side of the opposite substrate 521, and the portion on the side of the color filter 500 is adhered to the above-described portion in that state. Then, the liquid crystal which forms the liquid crystal layer 522 is filled from an inlet port of the sealing material 529, and the inlet port is closed thereafter. Then, both the polarizers and the backlight are laminated.

In the liquid droplet ejection apparatus 2 of this embodiment, the spacer material (function liquid) which forms, e.g., the cell gap is coated. Further, before the portion on the side of the color filter 500 is adhered to the portion on the side of the opposite substrate 521, the liquid crystal (function liquid) is uniformly coated on the region enclosed by the sealing material 529. In addition, the coating of both the first and second alignment layers 524, 527 may alternatively be performed by the function liquid droplet ejection heads 26.

Figure 26:
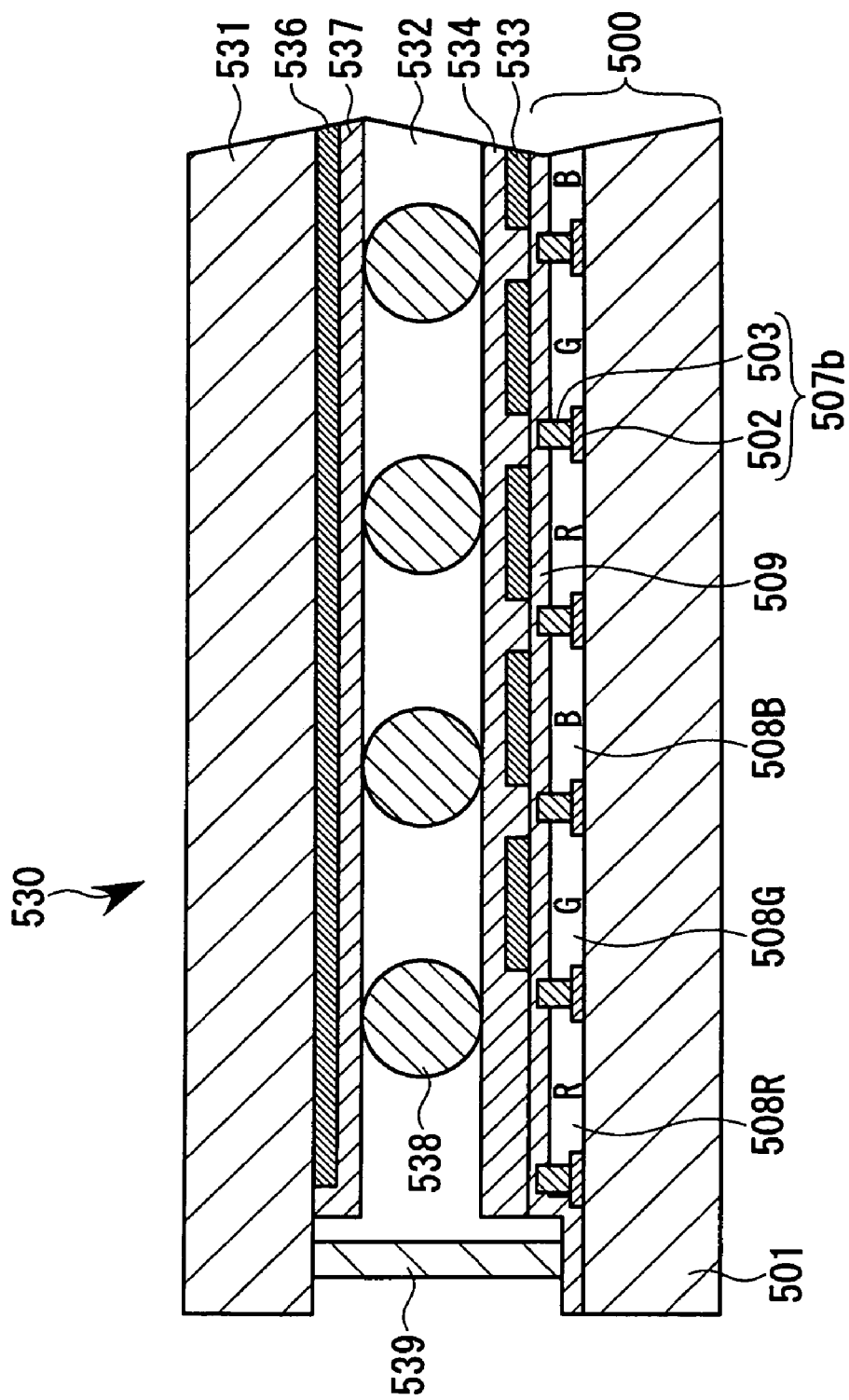
FIG. 26 is a sectional view of an important portion showing a general arrangement of a second example of a liquid crystal device using a color filter to which this invention is applied.

FIG. 26 is a sectional view of an important portion showing a general structure of a liquid crystal device using a color filter 500 manufactured in this embodiment.

What this liquid crystal device 530 is largely different from the above-described liquid crystal device 520 is that the color filter 500 is disposed on the lower side as seen in the figure (i.e., on the side opposite to the side from which the viewer looks at the device).

This liquid crystal device 530 is constructed such that a liquid crystal layer 532 which is made of an STN liquid crystal is sandwiched between the color filter 500 and the opposite substrate 531 which is made of a glass substrate, or the like. Though not illustrated, a polarizer, or the like, is disposed on an outside surface of the opposite substrate 531 and the color filter 500, respectively.

On the protection film 509 (on the side of the liquid crystal layer 532) of the color filter 500, there are formed a plurality of rectangular first electrodes 533 which are elongated in a direction at right angles to the surface plane of FIG. 26. A first alignment layer 534 is formed so as to cover that side of the first electrode 533 which is on the side of the liquid crystal layer 532.

On that surface of the opposite substrate 531 which lies opposite to the color filter 500, a plurality of second electrodes 536 are formed at a given distance to one another in a direction at right angles to the first electrode 533. A second alignment layer 537 is formed so as to cover that surface of the second electrode 536 which is on the side of the liquid crystal layer 532.

The liquid crystal layer 532 is provided with a spacer 538 to keep the thickness of the liquid crystal layer 532 constant, and a sealing material 539 to prevent the liquid crystal composition inside the liquid crystal 532 layer from leaking outside.

In the same manner as in the above-described liquid crystal device 520, the crossing portions between the first electrode 533 and the second electrode 536 form the pixels. It is thus so arranged that the color layers 508R, 508G, 508B of the color filter 500 are positioned in these portions which form the pixels.

Figure 27:
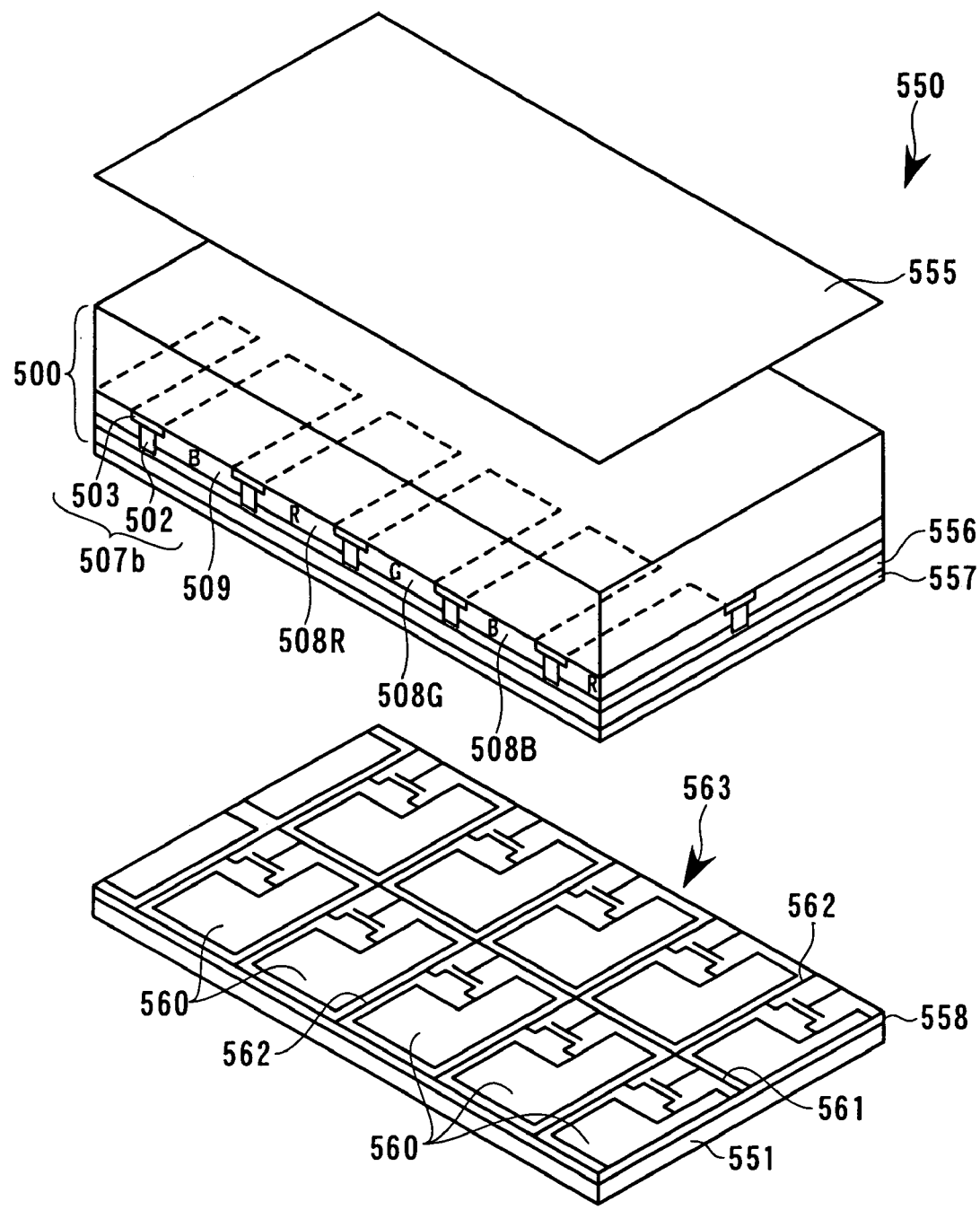
FIG. 27 is an exploded perspective view of an important portion showing a general arrangement of a third example of a liquid crystal device using a color filter to which this invention is applied.

FIG. 27 is an exploded perspective view of an important portion showing a general structure of a transmission thin film transistor (TFT) type of liquid crystal device using a color filter 500 to which this invention is applied.

This liquid crystal device 550 has a construction in which the color filter 500 is disposed on an upper side as seen in the figure (i.e., on the side of the viewer).

This liquid crystal device 550 is made up of: a color filter 500; an opposite substrate 551 which is disposed to lie opposite to the color filter 500; a liquid crystal layer which is sandwiched therebetween; a polarizer 555 which is disposed on an upper side (on the side of the viewer) of the color filter 500; and a polarizer (not illustrated) which is disposed on the lower side of the opposite electrode 551.

On the surface (i.e., the surface on the side of the opposite substrate 551) of the protection film 509 of the color filter 500, there is formed an electrode 556 for the liquid crystal driving. This electrode 556 is made of a transparent conductive material such as ITO, or the like, and is formed into an entire-surface electrode which covers the entire region in which the pixel electrodes 560 (to be described later) are formed. An alignment layer 557 is disposed in a state of covering the opposite surface of this pixel electrodes 560 of the electrode 556.

On that surface of the opposite substrate 551 which lies opposite to the color filter 500, there is formed an insulating layer 558. On this insulating layer 558 there are formed scanning lines 561 and signal lines 562 in a state of crossing each other at right angles. Pixel electrodes 560 are formed inside the regions enclosed by the scanning lines 561 and the signal lines 562. In the actual liquid crystal device, there will be disposed an alignment layer (not illustrated) on the pixel electrode 560.

In the portion enclosed by the notched portion of the pixel electrode 560, the scanning line 561, and the signal line 562, there are built in or assembled a thin film transistor which is provided with a source electrode, a drain electrode, a semiconductor, and a gate electrode. By charging signals to the scanning line 561 and the signal line 562, the thin film transistor 563 can be switched on and off so as to control the supply of electric current to the pixel electrode 560.

Although the above-described liquid crystal devices 520, 530, 550 of each of the above examples is constituted into a transmission type, it may also be constituted into a reflective type of liquid crystal device or into a translucent reflective type of liquid crystal device by providing a reflective layer or a translucent reflective layer, respectively.

Figure 28:
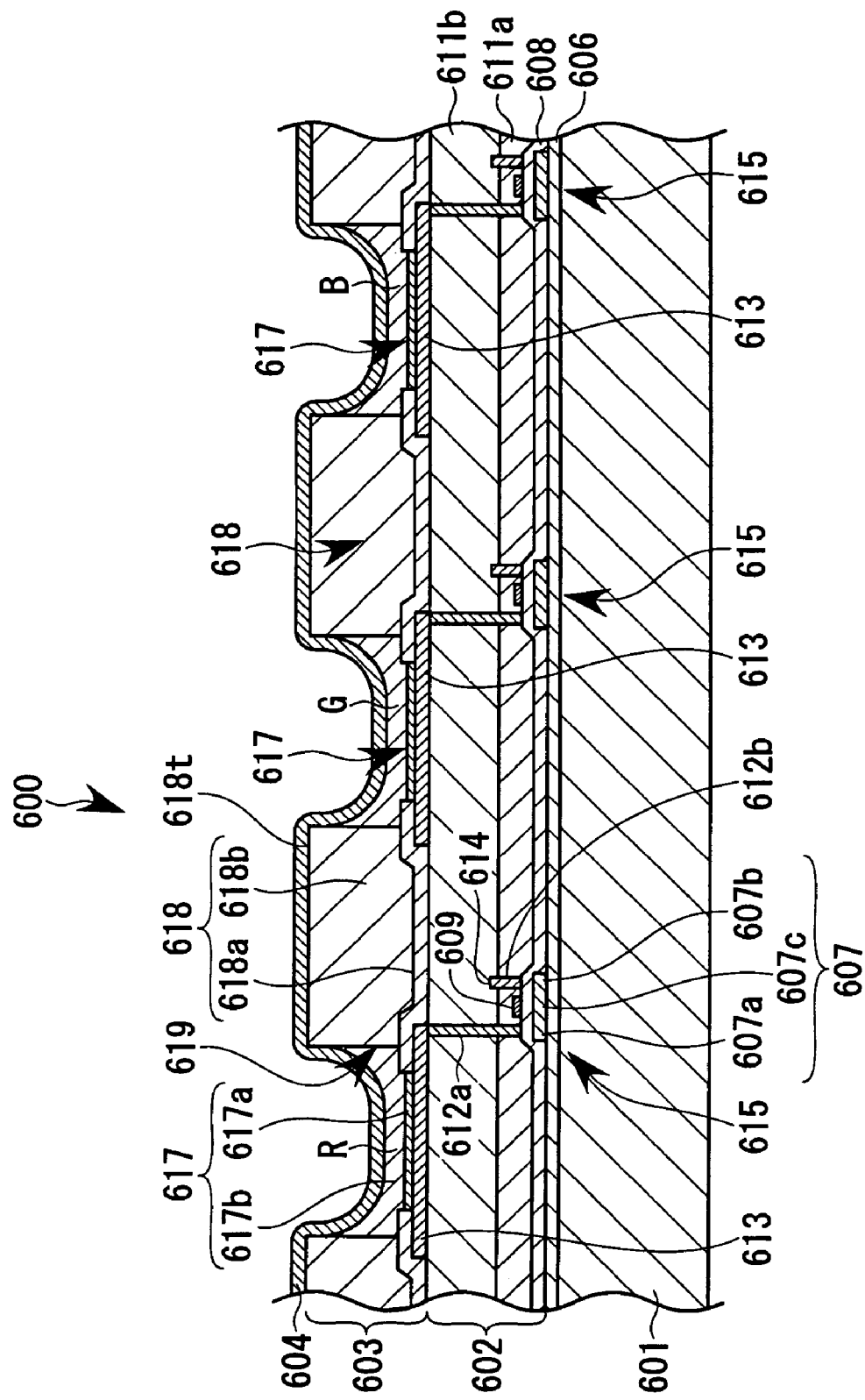
FIG. 28 is a sectional view of an important portion of a display device according to a second embodiment of this invention.

FIG. 28 is a sectional view of an important part of a display region of an organic EL device (hereinafter referred to as a display device 600).

This display device 600 is substantially constituted by a substrate 601 (W), and on this substrate are laminated a circuit element part 602, emitting element part 603 and a cathode 604.

In this display device 600, the light emitted from the emitting element part 603 toward the substrate 601 is transmitted through the circuit element part 602 and the substrate 601. The light emitted from the emitting element part 603 toward the side opposite to the substrate 601 is reflected by the cathode 604 and passes through the circuit element part 602 and the substrate 601 for ejection toward the viewer.

Between the circuit element part 602 and the substrate 601, there is formed a base protection film 606 which is made of a silicon oxide film. On top of this base protection film 606 (on the side of the emitting element 603), there is formed an island-shaped semiconductor film 607 which is made of polycrystalline silicon. In the left and right regions of this semiconductor film 607, there are respectively formed a source region 607a and a drain region 607b by high-concentration anion implantation. The central portion which is free from anion implantation becomes a channel region 607c.

In the circuit element part 602, there is formed a transparent gate insulation film 608 which covers the base protection film 606 and the semiconductor film 607. In that position on this gate insulation film 608 which corresponds to the channel region 607c of the semiconductor film 607, there is formed a gate electrode 609 which is made up of Al, Mo, Ta, Ti, W, or the like. On top of this gate electrode 609 and the gate insulation film 608, there are formed a transparent first interlayer insulator (interlayer dielectric film) 611a and a second interlayer insulator 611b. Through the first and second interlayer insulators 611a, 611b, there are formed contact holes 612a, 612b which are in communication with the source region 607a and the drain region 607b, respectively, of the semiconductor film 607.

On top of the second interlayer insulator 611b, there is formed, by patterning, a transparent pixel electrode 613 which is made of ITO, or the like. This pixel electrode 613 is connected to the source region 607a through the contact hole 612a.

On top of the first interlayer insulator 611a, there is formed an electric power source wiring 614, which is connected to the drain region 607b through the contact hole 612b.

As described hereinabove, the circuit element part 602 has formed therein a driving thin film transistor 615 which is connected to each of the pixel electrodes 613.

The above-described emitting element part 603 is made up of: a function layer 617 which is laminated on each of the plurality of pixel electrodes 613; and a bank part 618 which is provided between each of the pixel electrodes 613 and the function layers 617 to thereby partition each of the function layers 617.

The emitting element is constituted by these pixel electrodes 613, the function layer 617, and the cathode 604 which is disposed on the function layer 617. The pixel electrode 613 is formed into a substantial rectangle as seen in plan view, and the bank part 618 is formed between each of the pixel electrodes 613.

The bank part 618 is made up of: an inorganic-matter bank layer 618a (first bank layer) which is formed by inorganic materials such as SiO, $SiO_2$, $TiO_2$, or the like; and an organic-matter bank layer 618b (second bank layer) which is laminated on the inorganic-matter bank layer 618a, which is trapezoidal in cross section, and which is formed by a resist superior in heat-resistance and solvent-resistance such as an acrylic resin, a polyimide resin, or the like. Part of this bank part 618 is formed in a state of being overlapped with the peripheral portion of the pixel electrode 613.

Between each of the bank parts 618, there is formed an opening part 619 which gradually enlarges towards an upward.

The function layer 617 is made up of: a hole injection/transport layer 617a which is formed inside the opening part 619 in a state of being laminated on the pixel electrode 613; and an emitting layer 617b which is formed on this hole injection/transport layer 617a. It may be so arranged that other function layers having other functions are further formed adjacent to the emitting layer 617b. For example, an electron transport layer may be formed.

The hole injection/transport layer 617a has a function of transporting holes from the pixel electrode 613 side for injection into the emitting layer 617b. This hole injection/transport layer 617a is formed by ejecting the first composition of matter (function liquid) containing therein the hole injection/transport layer forming material. As the hole injection/transport layer forming material, there may be used a mixture of a polythiophene derivative such as polyethylenedioxythiophene and polystyrenesulfonoc acid, or the like.

The emitting layer 617b emits light of red (R), green (G) or blue (B), and is formed by ejecting the second composition of matter (function liquid) containing the emitting layer forming material (emitting material). The solvent (non-polar solvent) for the second composition of matter shall preferably be insoluble to the hole injection/transport layer 617a such as cyclohexylbenzene, diydeobenzofuran, trimethylbenzene, tetramethylbenzene, or the like. By using this kind of non-polar solvent as the second composition of matter of the emitting layer 617b, the emitting layer 617b can be formed without dissolving the hole injection/transport layer 617a again.

The emitting layer 617b is so arranged that the holes injected from the hole injection/transport layer 617a and the electron injected from the cathode 604 get bonded again in the emitting layer to thereby emit light.

The cathode 604 is formed in a state to cover the entire surface of the emitting element part 603, and forms a pair with the pixel electrode 613 to thereby cause the electric current to flow through the function layer 617. A sealing member (not illustrated) is disposed on top of this cathode 604.

Now, a description will be made about the manufacturing steps of the display device 600 with reference to FIGS. 29 through 37.

Figure 29:
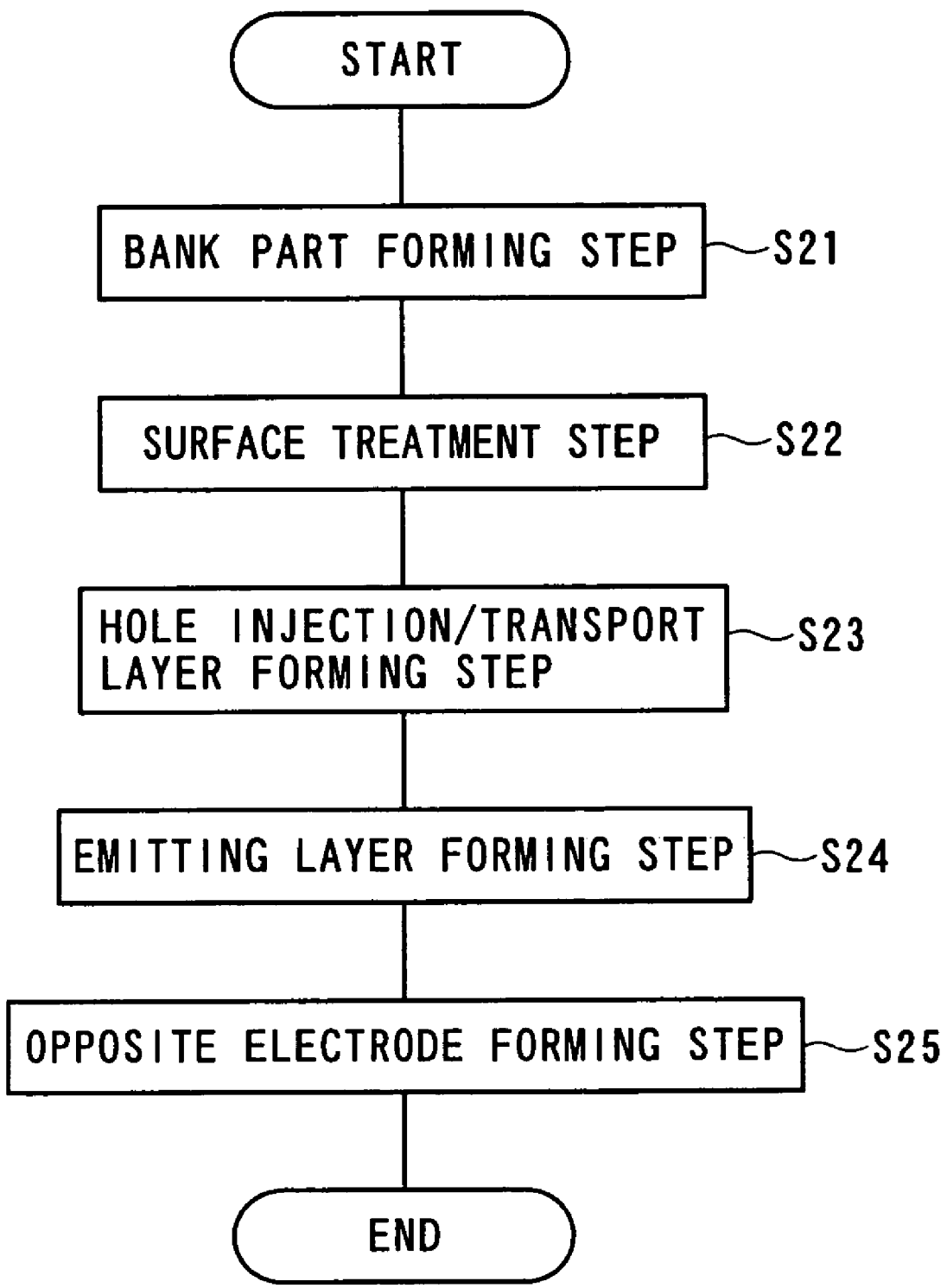
FIG. 29 is a flow chart explaining the manufacturing steps of a display device which is an organic electroluminescence (EL) device of this invention.

As shown in FIG. 29, this display device 600 is manufactured through the following steps, i.e., a bank part forming step (S21), a surface treatment step (S22), a hole injection/transport layer forming step (S23), a emitting layer forming step (S24), and an opposite electrode forming step (S25). The manufacturing steps need not be limited to the illustrated ones; some steps may be omitted or others added if necessary.

Figure 30:
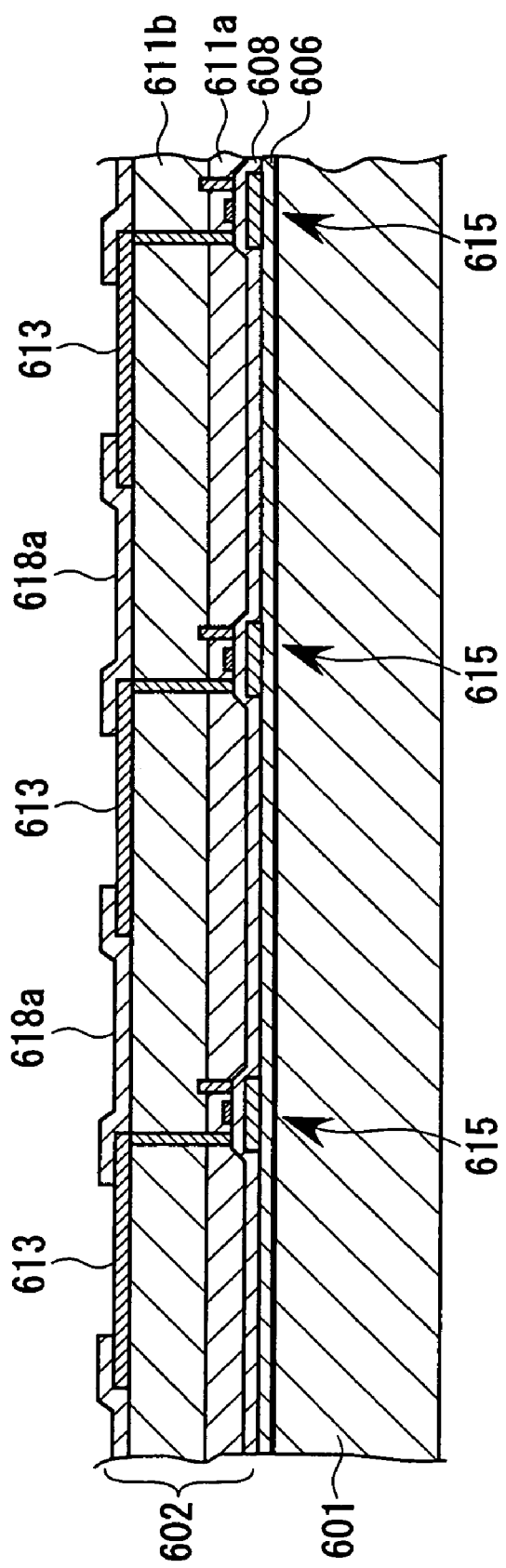
FIG. 30 is a manufacturing step diagram explaining the forming of an inorganic-matter bank layer of this invention.

First, at the bank part forming step (S21), an inorganic-matter bank layer 618a is formed on the second interlayer insulator 611b as shown in FIG. 30. This inorganic-matter bank layer 618a is formed, after having formed an inorganic-matter film on the forming position, by patterning the inorganic-matter film by means of photolithography, or the like. At this time, part of the inorganic-matter bank layer 618a is formed so as to overlap with the peripheral portion of the pixel electrode 613.

Figure 31:
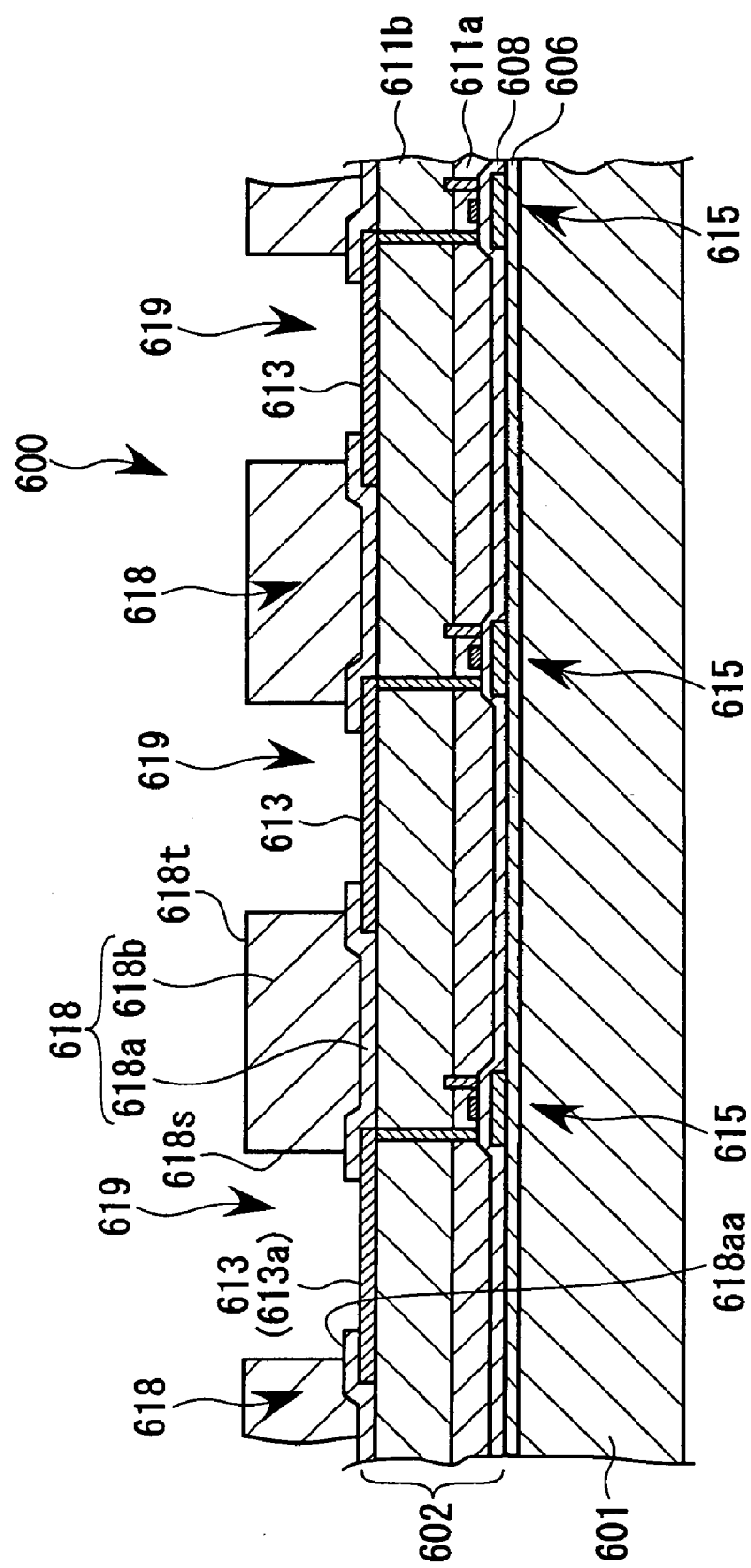
FIG. 31 is a manufacturing step diagram explaining the forming of an organic-matter bank layer of this invention.

Once the inorganic-matter bank layer 618a has been formed, an organic-matter bank layer 618b is formed on top of the inorganic-matter bank layer 618a as shown in FIG. 31. This organic-matter bank layer 618b is formed, as in the case of the inorganic-matter bank layer 618a, by patterning by means of photolithography, or the like.

The bank part 618 is formed as described above. As a result, an opening part 619 which opens upward relative to the pixel electrode 613 is formed. This opening part 619 defines a pixel region.

At the surface treatment step (S22), the liquid-affinity processing (treatment to gain affinity to liquid) and the liquid-repellency processing (treatment to gain repellency to liquid) are performed. The region in which the liquid-affinity processing is to be performed are the first laminated part 618aa of the inorganic-matter bank layer 618a and the electrode surface 613a of the pixel electrode 613. These regions are subjected to surface treatment to obtain liquid affinity by means, e.g., of plasma processing using oxygen as the processing gas. This plasma processing also serves the purpose of cleaning the ITO which is the pixel electrode 613.

The liquid-repellency processing, on the other hand, is performed on the wall surface 618s of the organic-matter bank layer 618b and on the upper surface 618t of the organic-matter bank layer 618b. By means of plasma processing with, e.g., methane tetrafluoride as the processing gas, the surface is subjected to fluoridizing processing (processed to obtain liquid-repellent characteristic).

By performing this surface processing step, it becomes possible for the function liquid droplet to reach (or hit) the pixel region in a surer manner when the function layer 617 is formed by using the function liquid droplet ejection heads 26. It also becomes possible to prevent the function liquid droplet that has hit the pixel region from flowing out of the opening part 619.

By going through the above-described steps, the display device base member 600A can be obtained. This display device base member 600A is mounted on the X-axis table 22 of the imaging apparatus 2 as shown in FIG. 2, and the following hole injection/transport layer forming step (S23) and the emitting layer forming step (S24) are performed.

Figure 32:
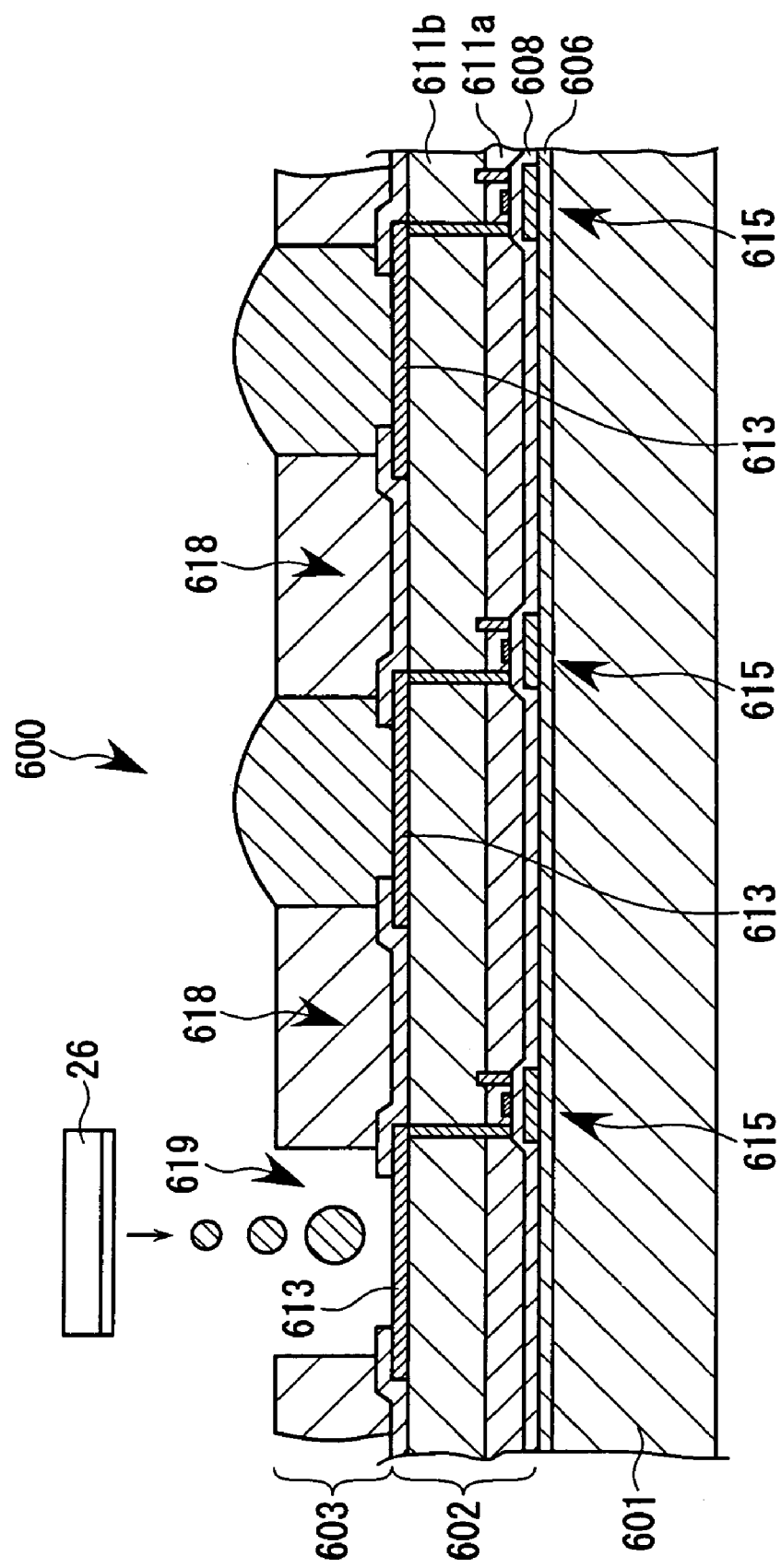
FIG. 32 is a manufacturing step diagram explaining the forming of a hole injection/transport layer of this invention.
Figure 33:
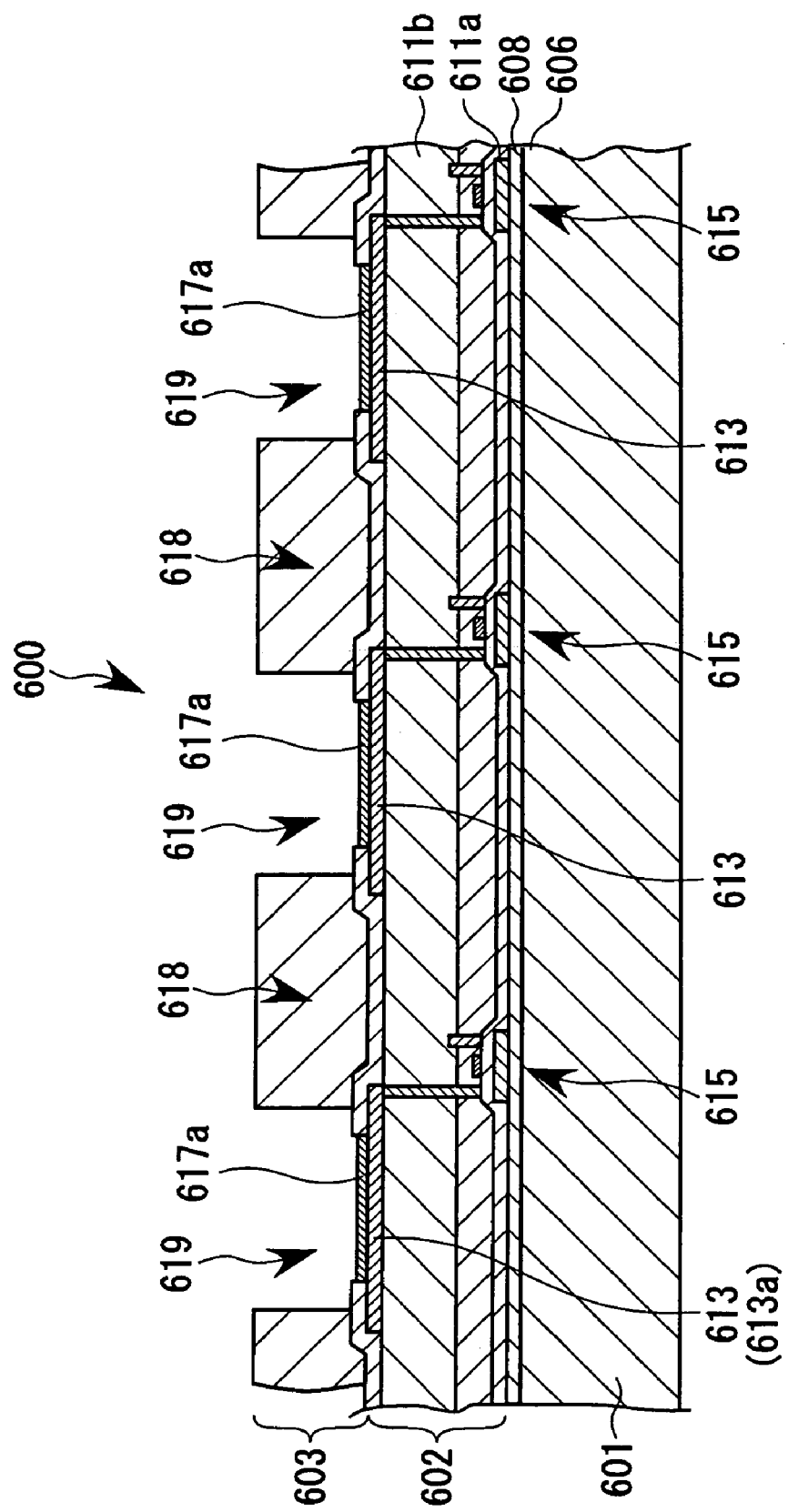
FIG. 33 is a manufacturing step diagram explaining the state in which the hole injection/transport layer has been formed.

As shown in FIG. 32, at the hole injection/transport layer forming step (S23), the first composition of matter containing therein the hole injection/transport layer forming material is ejected from the function liquid droplet ejection heads 26 into each of the opening parts 619. Thereafter, as shown in FIG. 33, drying process and heat-treatment process are performed in order to evaporate the polar solvent contained in the first composition of matter, whereby the hole injection/transport layer 617a is formed on the pixel electrode 613 (electrode surface 613a).

A description will now be made about the emitting layer forming step (S24). At this emitting layer forming step, as described above, in order to prevent the hole injection/transport layer 617a from getting resolved again, there is used a non-polar solvent which is insoluble to the hole injection/transport layer 617a as a solvent for the second composition of matter to be used in forming the emitting layer.

On the other hand, since the hole injection/transport layer 617a is low in affinity to the non-polar solvent, it will be impossible to closely adhere the hole injection/transport layer 617a to the emitting layer 617b or to uniformly coat the emitting layer 617b even if the second composition of matter containing therein the non-polar solvent is ejected onto the hole injection/transport layer 617a.

As a solution, in order to enhance the affinity of the surface of the hole injection/transport layer 617a to the non-polar solvent and to the emitting layer forming material, it is preferable to perform the surface treatment (treatment to improve the quality of the surface) before forming the emitting layer. This surface treatment is performed by coating the hole injection/transport layer 617a with a surface modifying material which is a solvent that is the same as, or similar to, the non-polar solvent of the second composition of matter to be used in forming the emitting layer, and then drying it.

By performing this kind of treatment, the surface of the hole injection/transport layer 617a easily conforms to the non-polar solvent. It becomes thus possible to uniformly coat, at a subsequent step, the hole injection/transport layer 617a with the second composition of matter containing therein the emitting layer forming material.

Figure 34:
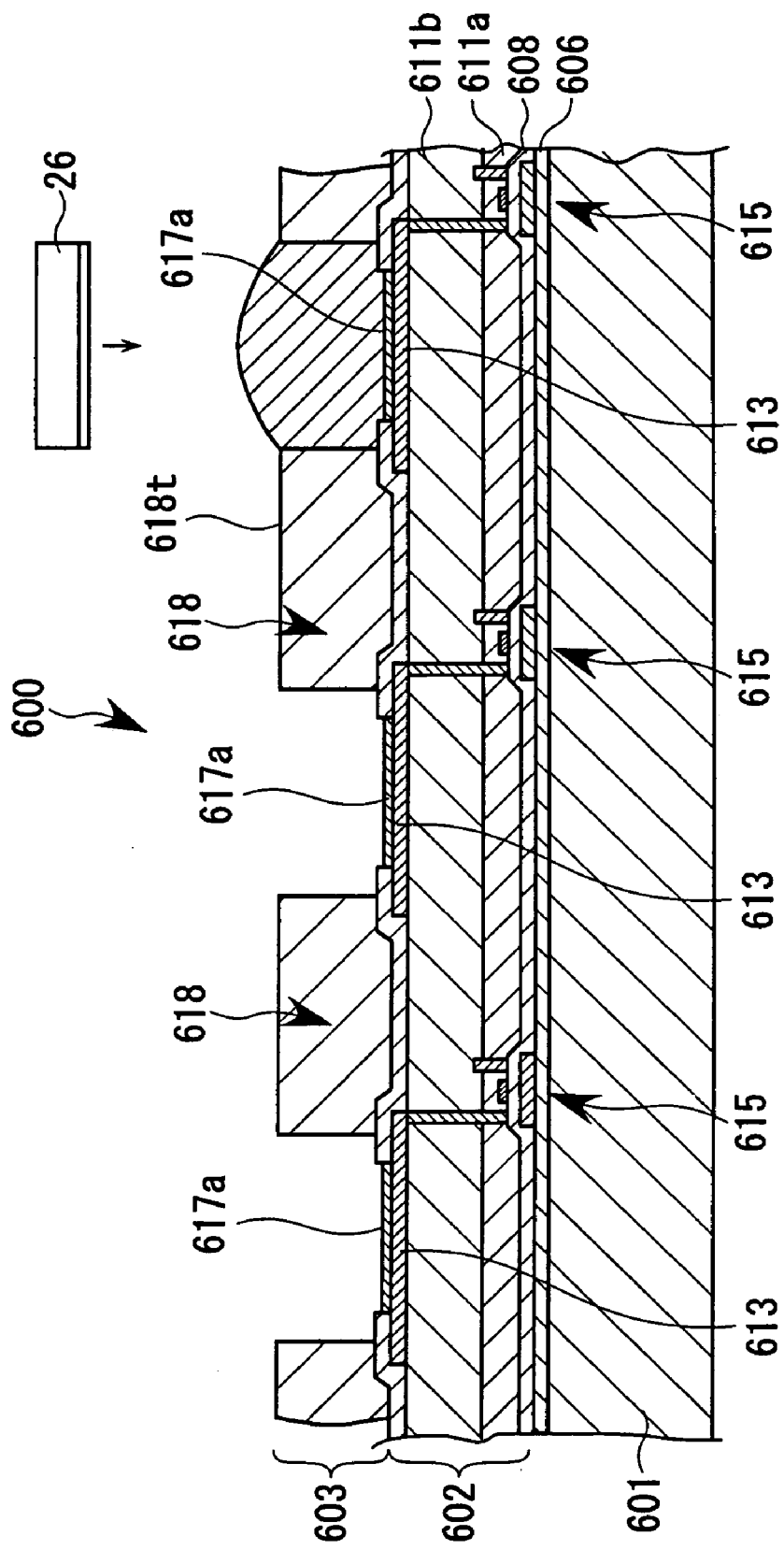
FIG. 34 is a manufacturing step diagram explaining the forming of a blue emitting layer of this invention.
Figure 35:
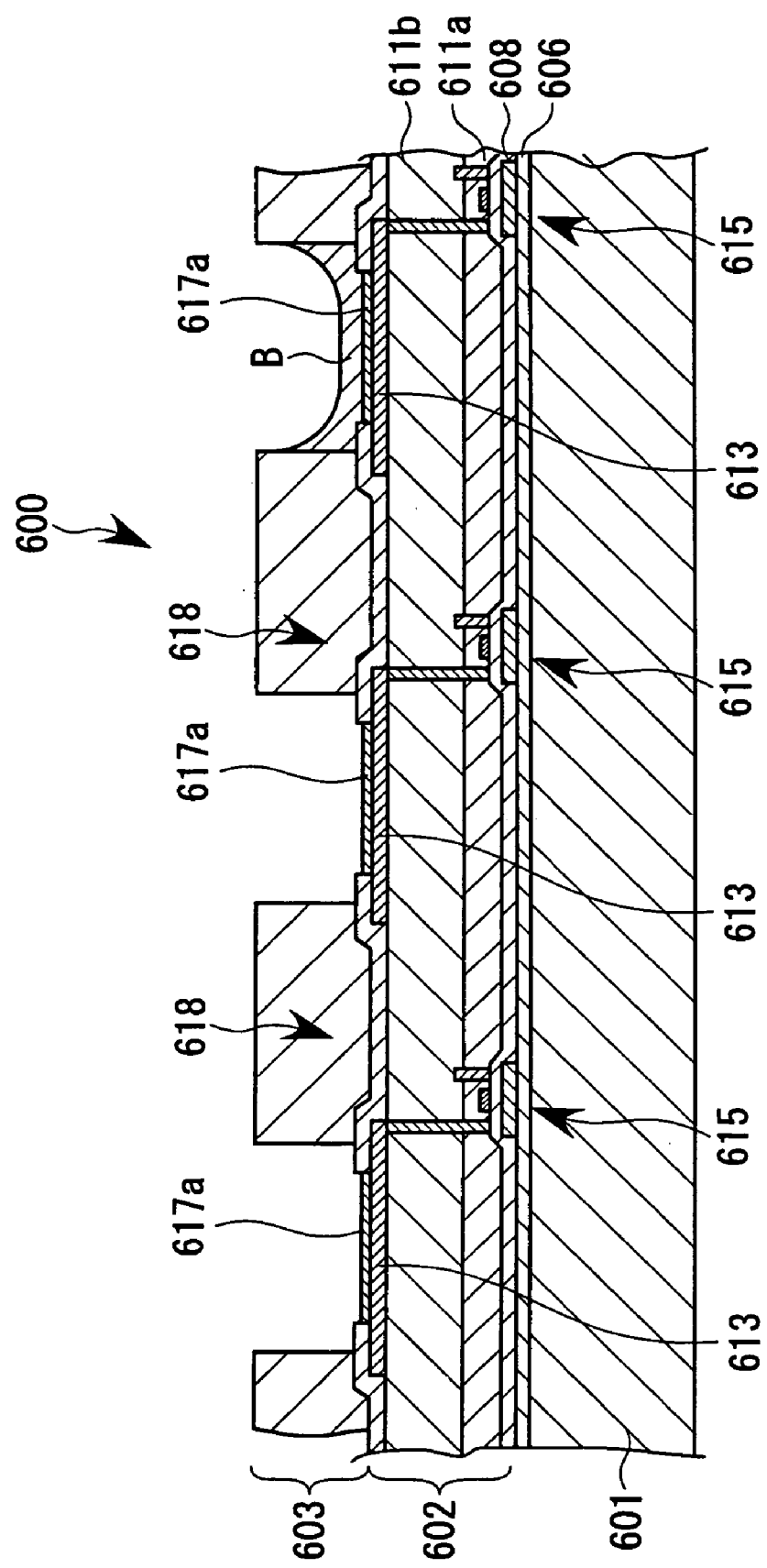
FIG. 35 is a manufacturing step diagram explaining the state in which the blue emitting layer has been formed.

Thereafter, as shown in FIG. 34, the second composition of matter containing therein the emitting layer forming material corresponding to one of the colors (blue in the example in FIG. 34) is implanted into the pixel region (opening part 619) by a predetermined amount. The second composition of matter implanted into the pixel region gets spread over the hole injection/transport layer 617a to thereby fill the opening part 619. Even if the second composition of matter goes out of the pixel region to thereby hit the upper surface 618t of the bank part 618, since this upper surface 618t has been subject to the liquid-repellent treatment as described above, the second composition of matter is likely to be easily rolled into the opening part 619.

Thereafter, by performing the drying step, or the like, the second composition of matter after ejection is processed by drying to thereby evaporate the non-polar solvent contained in the second composition of matter. The emitting layer 617b is thus formed on top of the hole injection/transport layer 617a as shown in FIG. 26. In this example, there is formed an emitting layer 617b corresponding to the blue color (B).

Figure 36:
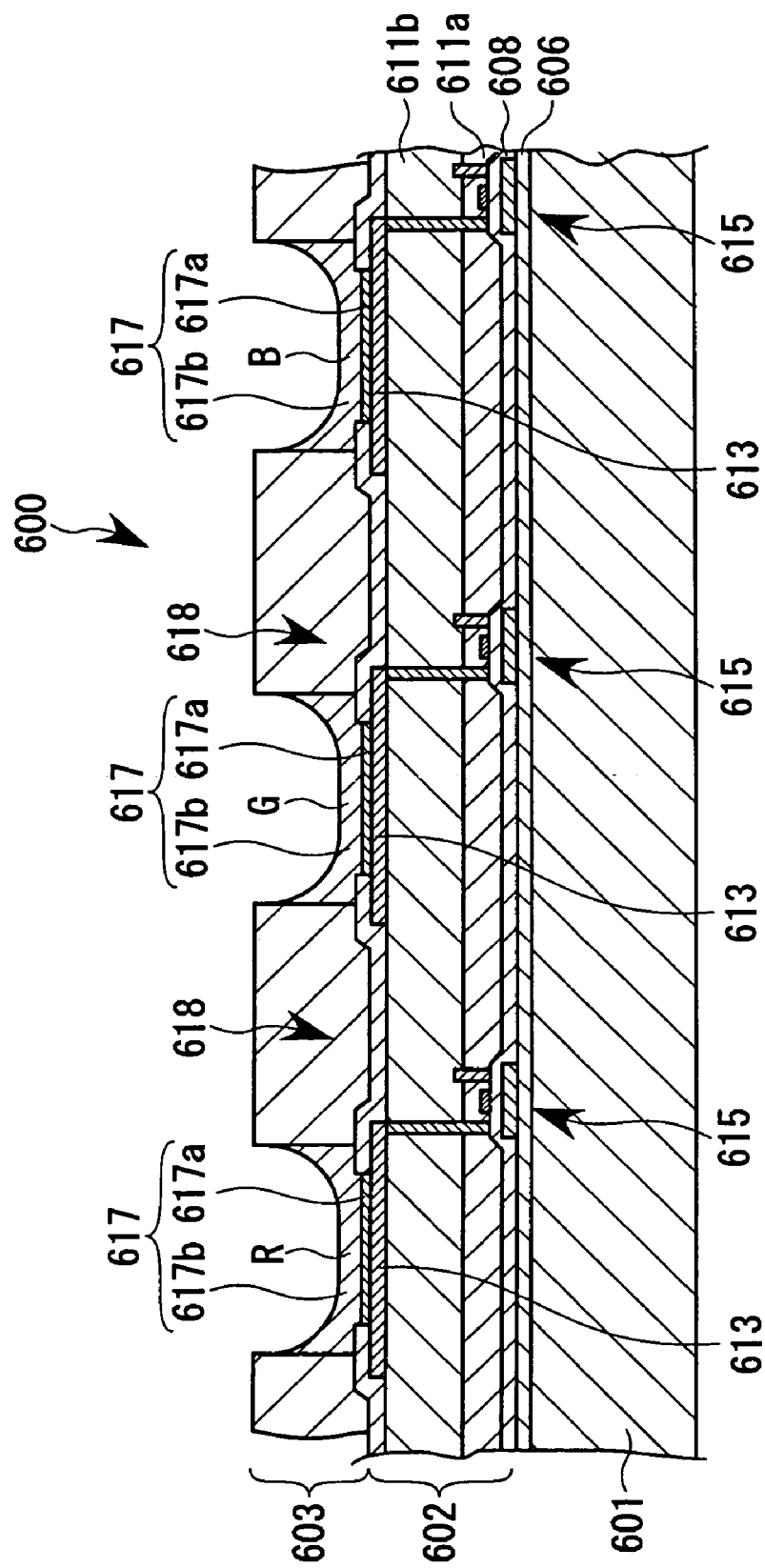
FIG. 36 is a manufacturing step diagram explaining the state in which the emitting layer of each color has been formed.

By using the function liquid droplet ejection head 41, the steps like in the above-described emitting layer 617b corresponding to the blue color (B) are sequentially performed as shown in FIG. 36, whereby the emitting layers 617b corresponding to the other colors of red (R) and green (G) are formed. The order of forming the emitting layer 617b is not limited to the above-described example, but may be arbitrarily determined. For example, it is possible to determine the order of forming depending on the materials to form the emitting layer.

In the manner as described hereinabove, the function layer 617, i.e., the hole injection/transport layer 617a and the emitting layer 617b, is formed on the pixel electrode 613. Then, the process transfers to the opposite electrode forming step (S25).

Figure 37:
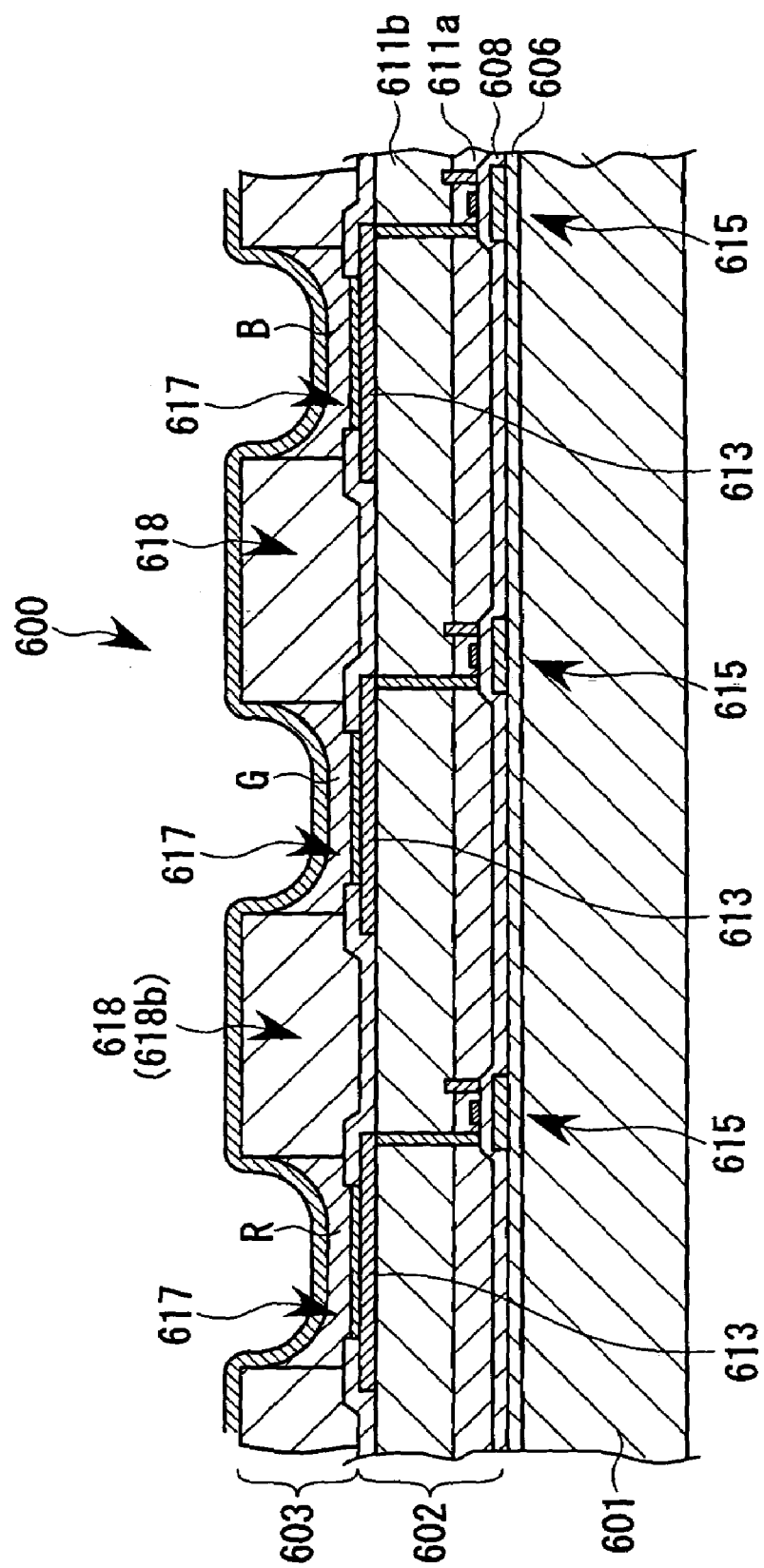
FIG. 37 is a manufacturing step diagram explaining the forming of a cathode of this invention.

At the opposite electrode forming step (S25), as shown in FIG. 37, the cathode 604 (opposite electrode) is formed over the entire surfaces of the emitting layer 617b and the organic matter bank layer 618b by means of a vapor deposition method, sputtering method, chemical vapor deposition (CVD) method, or the like. This cathode 604 is constituted in this embodiment by laminating, e.g., a calcium layer and an aluminum layer.

On an upper part of the cathode 604, there are provided an Al film and an Ag film as electrodes and, on top thereof, a protection film for preventing oxidation such as an $SiO_2$ film, an SiN film, or the like, depending on necessity.

After having formed the cathode 604 as described above, a sealing process for sealing the upper portion of the cathode 604 with a sealing material, a wiring processing, or the like, are performed to thereby obtain the display device 600.

Figure 38:
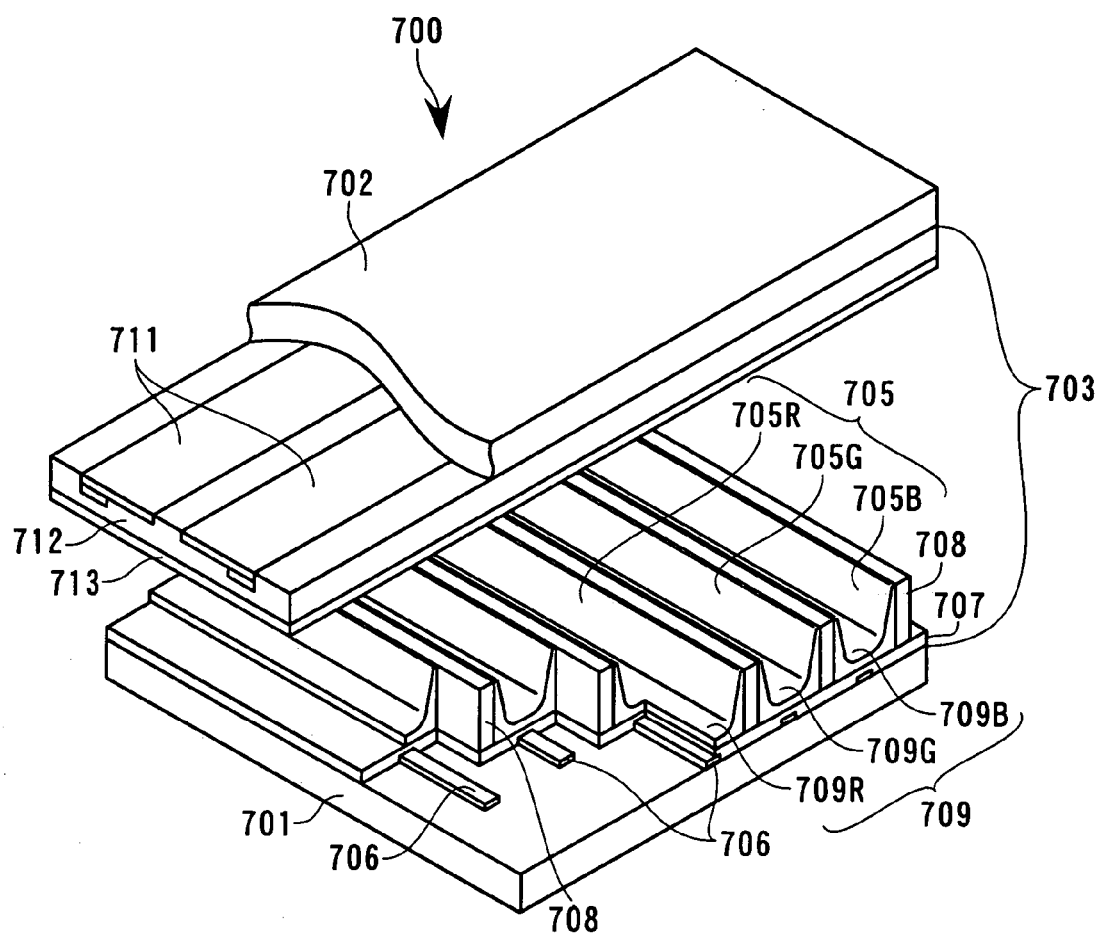
FIG. 38 is an exploded perspective view of an important portion of a display device which is a plasma display panel (PDP) device of this invention.

FIG. 38 is an exploded perspective view showing an important part of the plasma type of display device (PDP device, simply referred to as a display device 700). In the figure, the display device 700 is shown in a partly cut away state.

This display device 700 is made up of a first substrate 701 and a second substrate 702 which are disposed to lie opposite to each other, as well as a discharge display part 703 which is formed therebetween. The discharge display part 703 is constituted by a plurality of discharging chambers 705. Among these plurality of discharging chambers 705, the three chambers 705 of a red discharging chamber 705R, a green discharging chamber 705G, and a blue discharging chamber 705B are disposed as a set to make one pixel.

On an upper surface of the first substrate 701, there are formed address electrodes 706 in a stripe form at a given distance from one another. A dielectric layer 707 is formed to cover these address electrodes 706 and the upper surface of the first substrate 701. On the dielectric layer 707, there are vertically disposed partition walls 708 which are positioned between respective address electrodes 707 in a manner to lie along the respective address electrodes 706. Some of these partition walls 708 extend on both widthwise sides of the address electrodes 706 and others (not illustrated) extend at right angles to the address electrodes 706.

The regions which are partitioned by these partition walls 708 form the discharge chambers 705.

Inside the discharge chambers 705, there are disposed fluorescent bodies 709. The fluorescent bodies 709 emit luminescent light of any one of red (R), green (G) and blue (B). At the bottom of the red discharging chamber 705R, there are disposed red fluorescent bodies 709R, at the bottom of the green discharging chamber 705G, there are disposed green fluorescent bodies 709R, and at the bottom of the blue discharging chamber 705B, there are disposed blue fluorescent bodies 709B, respectively.

On the lower side of the second substrate 702 as seen in the figure, there are formed a plurality of display electrodes 711 in a direction crossing the address electrodes 706 at right angles at a predetermined distance from one another. In a manner to cover them, there are formed a dielectric layer 712 and a protection film 713 which is made of MgO, or the like.

The first substrate 701 and the second substrate 702 are oppositely adhered to each other in a state in which the address electrodes 706 and the display electrodes 711 cross each other at right angles. The address electrodes 706 and the display electrodes 711 are connected to an AC power source (not illustrated).

By charging electricity to each of the electrodes 706, 711, the fluorescent bodies 709 are caused to emit light through excitation, whereby color display becomes possible.

In this embodiment, the address electrodes 706, the display electrodes 711, and the fluorescent bodies 709 can be formed by using the liquid droplet ejection apparatus 1 as shown in FIG. 2. A description will now be made about an example of steps for manufacturing the address electrodes 706 on the first substrate 701.

In this case, the following steps are performed in a state in which the first substrate 126 is placed on the X-axis table 22 of the imaging apparatus 2.

First, by means of the function liquid droplet ejection head 26, the liquid material (function liquid) containing therein a material for forming the conductive film wiring is caused to hit the address electrode forming region as the function liquid droplet. This liquid material is prepared as the electrically conductive film wiring (wiring formed by electrically conductive film) by dispersing electrically conductive fine particles of metals, or the like, into a dispersion medium. As the electrically conductive fine particles, there are used metallic fine particles containing therein gold, silver, copper, palladium, nickel, or the like, or an electrically conductive polymer, or the like.

Once all of the address electrode forming regions in which the liquid material is scheduled to be filled have been filled therewith, the liquid material after ejection is dried to evaporate the dispersion medium contained in the liquid material, whereby the address electrodes 706 are formed.

An example of the address electrodes 706 has been given hereinabove, but the display electrodes 711 and the fluorescent bodies 709 can also be formed by the above-described steps.

In forming the display electrodes 711, a liquid material (function liquid) containing therein the electrically conductive wiring forming material is caused to hit the display electrode forming region, in a similar manner as in the case of the address electrodes 706.

In forming the fluorescent bodies 709, on the other hand, a liquid material (function liquid) containing therein a fluorescent material corresponding to each of the colors (R, G, B) is ejected from the three function liquid droplet ejection heads 10 to thereby cause them to hit the discharge chambers 705 of corresponding colors.

FIG. 39 is a sectional view showing an important part of the electron emission device (FED device, hereinafter simply referred to as a display device 800). In the figure, the display device 800 is partly shown in section.

The display device 800 is substantially made up of a first substrate 801 and a second substrate 802 which are disposed opposite to each other, as well as a field emission display part 803 which is formed therebetween. The field emission display part 803 is constituted by a plurality of electron emission parts 805 which are arranged in matrix.

On an upper surface of the first substrate 801, there are formed first element electrodes 806a and second electrodes 806b which constitute cathode electrodes 806, in a manner to cross each other at right angles. In each of the portions partitioned by the first element electrodes 806a and the second element electrodes 806b, there is formed an element film 807 with a gap 808 formed therein. In other words, a plurality of electron emission parts 805 are constituted by the first element electrodes 806a, the second element electrodes 806b and the element film 807. The element film 807 is made, e.g., of palladium oxide (PdO), or the like, and the gap 808 is formed by the work called forming, or the like, after having formed the element film 807.

On a lower surface of the second substrate 802, there is formed an anode electrode 809 which lies opposite to the cathode electrode 806. On a lower surface of the anode electrode 809, there is formed a lattice-shaped bank part 811. In each of the downward-looking openings 812 enclosed by the bank part 811, there is disposed a fluorescent body 813 in a manner to correspond to the electron emission part 805. The fluorescent body 813 emits light of either red (R), green (G), and blue (B). In each of the opening parts 812, there is disposed a red fluorescent body 813R, a green fluorescent body 813G, and a blue fluorescent body 813B in a predetermined pattern.

The first substrate 801 and the second substrate 802 constituted as described above are adhered to each other at a very small gap therebetween. In this display device 800, the electrons to be emitted from the first element electrode 806a and the second element electrode 806b as the cathode are excited and caused to emit light through the element film (gap 808) 807 by causing them to hit the fluorescent body 813 formed on the anode electrode 809 which is the anode. Color display is thus possible.

In this case, too, as in the other embodiments, the first element electrode 806a, the second element electrode 806b, and the anode electrode 809 can be formed by using the image forming apparatus 2. Fluorescent bodies 813R, 813G, 813B of each color can be formed by using the imaging apparatus 2.

Figure 40A:
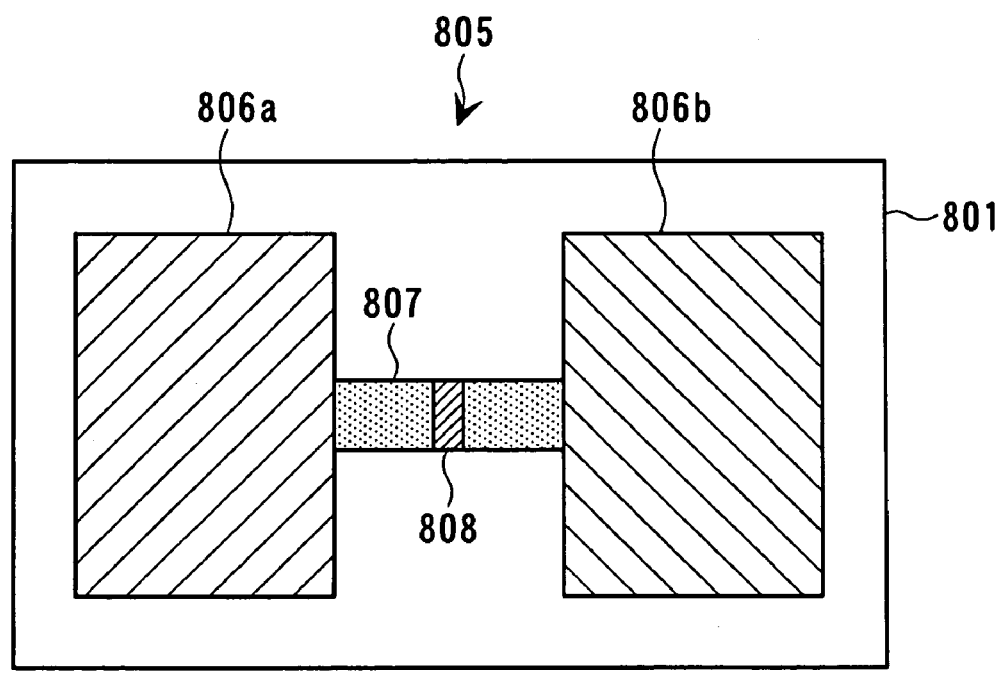
FIG. 40A is a plan view around an electron emission part of the display device of this invention and FIG. 40B is a plan view thereof.
Figure 40B:
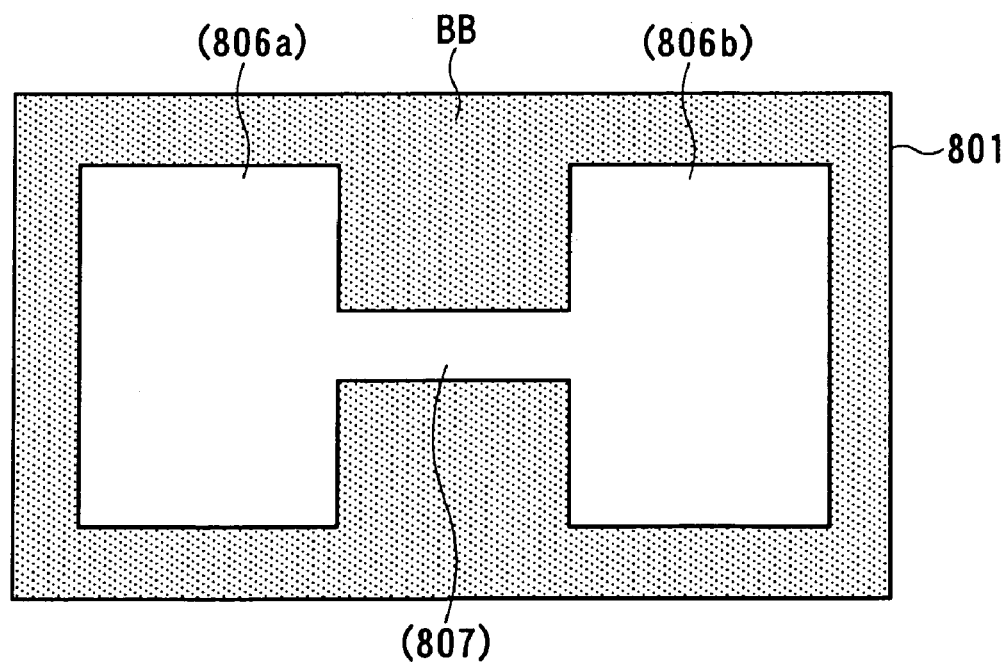

The first element electrode 806a, the second element electrode 806b and the electrically conductive film 807 has a flat shape as shown in FIG. 40A. In forming this film, as shown in FIG. 40B, the bank portion BB is formed by photolithographic method while leaving the portions in which the first element electrode 806a, the second element electrode 806b, and the electrically conductive film 807 are formed. Then, in the groove portion which is constituted by the bank portion BB, the first element electrode 806a and the second element electrode 806b are formed (by ink jet method with the imaging apparatus 2). After the solvent is dried and the film is formed, the electrically conductive film 807 is formed (in the ink jet method with the imaging apparatus 2). Then, after having formed the electrically conductive film 807, the bank portion BB is removed (peeling by the processing called ashing), and the process proceeds to the above-described forming processing. In the same manner as in the above-described organic EL device, it is preferable to perform the liquid-affinity processing to the first substrate 801 and the second substrate 802, as well as the liquid-repellency processing to the bank portion 811, BB.

As the other eletrooptic apparatus, there can be considered an apparatus for forming a metallic wire, for forming a lens, for forming a resist, for forming a light diffusion body, or the like.

As is clear from the above-described descriptions, according to this invention, a ventilation flow can be caused to flow through the clearance between the hot plates vertically disposed in a plurality of stages inside the drying furnace. The solvent, or the like, to be evaporated during drying can be quickly discharged out of the furnace. Therefore, the small and simple drying furnace can dry the plurality of workpieces efficiently at the same time.

The entire disclosure of Japanese Patent Application Nos. 2002-334315 filed Nov. 18, 2002 and 2003-204392 filed Jul. 31, 2003 are incorporated by reference.

What is claimed is:

1. A drying apparatus comprising:
a drying furnace containing therein hot plates, disposed in a plurality of stages in a vertical direction, on each of which is seated a plate workpiece;
a gateway for the workpiece, said gateway being disposed on a front side of said drying furnace and being normally left open to face said plurality of stages of hot plates;
a chamber casing disposed on a rear side of said drying furnace: and
an exhaust chamber defined in said chamber casing, said exhaust chamber comprising a flow dividing plate fixed relative to said exhaust chamber and having formed therein a plurality of ventilation holes each facing a gap between said plurality of stages of hot plates, said exhaust chamber being forcibly exhausted by exhaust means, wherein said chamber casing is mounted on a rear side of said drying furnace so as to be capable of opening and closing such that each of said hot plates can be replaced through a rear opening of said drying furnace to be opened by opening said chamber casing.

2. The drying apparatus according to claim 1, further comprising rail members fixed, in a plurality of vertical stages, to an inside of side walls of said drying furnace, said rail members being engageable with side edges of each of said hot plates such that said hot plates are slidable in a back and forth direction.

3. A drying apparatus comprising:
a drying furnace containing therein hot plates, disposed in a plurality of stages in a vertical direction, on each of which is seated a plate workpiece;
a gateway for the workpiece, said gateway being disposed on a front side of said drying furnace and being normally left open to face said plurality of stages of hot plates;
a chamber casing disposed on a rear side of said drying furnace;
an exhaust chamber defined in said chamber casing, said exhaust chamber comprising a flow dividing plate fixed relative to said exhaust chamber and having formed therein a plurality of ventilation holes each facing a gap between said plurality of stages of hot plates, said exhaust chamber being forcibly exhausted by exhaust means; and
a lifting mechanism for supporting said plural stages of hot plates by selectively lifting a workpiece off from said plural stages of hot plates, said lifting mechanism comprising:
a vertically elongated lifting member which is disposed on an outside of a side wall of said drying furnace so as to be movable up and down;
engaging members which are disposed in a plurality of vertical stages on an inside of said side wall so as to be engageable with a lower surface of side edges of the workpiece, said side edges being protruding beyond a workpiece seating surface of each of said hot plates; and
a reciprocating mechanism which connects said engaging members to said lifting member so as to be independently movable back and forth between an operating position falling inside a vertical projected area of said side edges of the workpiece and a retracted position outside of said projected area.

4. A workpiece processing apparatus comprising a plurality of processing units each comprising:
an imaging apparatus for coating a plate workpiece with liquid droplets by using a liquid droplet ejection head;
a drying apparatus for drying the liquid droplets coated on the workpiece; and
a workpiece transport apparatus interposed between respective pair of said processing units so that the workpiece processed in each of said processing units is sequentially sent to a subsequent processing unit through said workpiece transport apparatus,
wherein the drying apparatus comprises:
a drying furnace containing therein hot plates, disposed in a plurality of stages in a vertical direction, on each of which is seated a plate workpiece;
a gateway for the workpiece, said gateway being disposed on a front side of said drying furnace and being normally left open to face said plurality of stages of hot plates;
a chamber casing disposed on a rear side of said dry furnace; and
an exhaust chamber defined in said chamber casing, said exhaust chamber comprising a flow dividing plate fixed relative to said exhaust chamber and having formed therein a plurality of ventilation holes each facing a gap between said plurality of stages of hot plates, said exhaust chamber being forcibly exhausted by exhaust means.

5. The workpiece processing apparatus according to claim 4, wherein the workpiece is a substrate for a color filter, and wherein said imaging apparatus introduces a function liquid containing therein a filter material into said liquid droplet ejection head and coats a multiplicity of pixel element regions on the substrate with function liquid droplets which form filter elements.

6. The workpiece processing apparatus according to claim 4, wherein the workpiece is a substrate for an organic EL device, and wherein said imaging apparatus introduces a function liquid containing therein an emitting function material into said liquid droplet ejection head and coats a multiplicity of pixel element regions on the substrate with function liquid droplets which form EL function layers.

7. The workpiece processing apparatus according to claim 4, wherein the workpiece is a substrate for a plasma display device, and wherein said imaging apparatus introduces a function liquid containing therein a metallic wiring material into said liquid droplet ejection head and coats a multiplicity of pixel element regions on the substrate with function liquid droplets which form element electrode function layers.

8. The workpiece processing apparatus according to claim 4, wherein the workpiece is a substrate for a plasma display device, and wherein said imaging apparatus introduces a function liquid containing therein a fluorescent function material into said liquid droplet ejection head and coats a multiplicity of pixel element regions on the substrate with function liquid droplets which form fluorescent function layers.

9. The workpiece processing apparatus according to claim 4, wherein the workpiece is a substrate for an electron emission device, and wherein said imaging apparatus introduces a function liquid containing therein an electrically conductive function material into said liquid droplet ejection head and coats a multiplicity of pixel element regions on the substrate with function liquid droplets which form electrically conductive function layers.

10. The workpiece processing apparatus according to claim 4, further comprising buffer means for temporarily keeping in stock the workpieces in said workpiece transport apparatus, wherein the workpiece is discharged from said drying apparatus when the drying time in said drying apparatus for the workpiece has lapsed a predetermined time.

* * * * *